US012676129B2

(12) United States Patent
Cardozo

(10) Patent No.: US 12,676,129 B2
(45) Date of Patent: Jul. 7, 2026

(54) LOCKING STRING TUNER

(71) Applicant: William B. Cardozo, Sun Valley, ID (US)

(72) Inventor: William B. Cardozo, Sun Valley, ID (US)

( * ) Notice: Subject to any disclaimer, the term of this patent is extended or adjusted under 35 U.S.C. 154(b) by 641 days.

(21) Appl. No.: 18/104,649

(22) Filed: Feb. 1, 2023

(65) Prior Publication Data

US 2024/0257789 A1 Aug. 1, 2024

(51) Int. Cl.
*G10D 3/14* (2020.01)

(52) U.S. Cl.
CPC .................................... *G10D 3/14* (2013.01)

(58) Field of Classification Search
CPC ............... G10D 3/01; G10D 3/00; G10G 5/00
See application file for complete search history.

(56) References Cited

U.S. PATENT DOCUMENTS

| | | | | |
|---|---|---|---|---|
| 2,029,134 | A | 1/1936 | Stanley et al. | |
| 4,014,239 | A | 3/1977 | Spercel | |
| D256,471 | S | 8/1980 | Spercel | |
| 4,353,280 | A | 10/1982 | Spercel | |
| 4,625,614 | A | 12/1986 | Spercel | |
| 4,827,825 | A | 5/1989 | Goto et al. | |
| D311,414 | S | 10/1990 | Smith et al. | |
| 5,097,736 | A | 3/1992 | Turner | |
| 5,381,715 | A | 1/1995 | Spercel | |
| 5,589,653 | A | 12/1996 | Rose | |
| 6,078,001 | A | 6/2000 | Kang | |
| 6,608,248 | B1 | 8/2003 | Sperzel | |
| 7,659,465 | B1 | 2/2010 | McEwen | |
| 8,093,475 | B1 | 1/2012 | Sperzel | |
| 8,859,868 | B2 | 10/2014 | Dunwoodie | |
| 9,330,636 | B1 | 5/2016 | Chang | |
| 9,489,929 | B1 | 11/2016 | Armstrong | |
| 9,564,110 | B2 | 2/2017 | Steinberger | |
| 9,799,310 | B2 | 10/2017 | Damaschke et al. | |
| 2006/0016317 | A1 | 1/2006 | Wilkinson | |
| 2009/0211427 | A1 * | 8/2009 | Box ......................... | G10D 3/14 84/304 |
| 2012/0222538 | A1 * | 9/2012 | Booth ...................... | G10D 3/14 84/304 |
| 2017/0365239 | A1 | 12/2017 | Peterson | |
| 2022/0293070 | A1 | 9/2022 | Cardozo | |

FOREIGN PATENT DOCUMENTS

| | | |
|---|---|---|
| JP | H05119768 A | 5/1993 |
| WO | 2020006623 A1 | 1/2020 |

* cited by examiner

*Primary Examiner* — Kimberly R Lockett
(74) *Attorney, Agent, or Firm* — Milord Law Group, P.C.

(57) ABSTRACT

A locking string tuner that is comprised of a string post and an engagement member that is moveably associated with the string post. The engagement member has an engagement side that includes a grip surface and a relief surface, and has a reeling side.

21 Claims, 65 Drawing Sheets

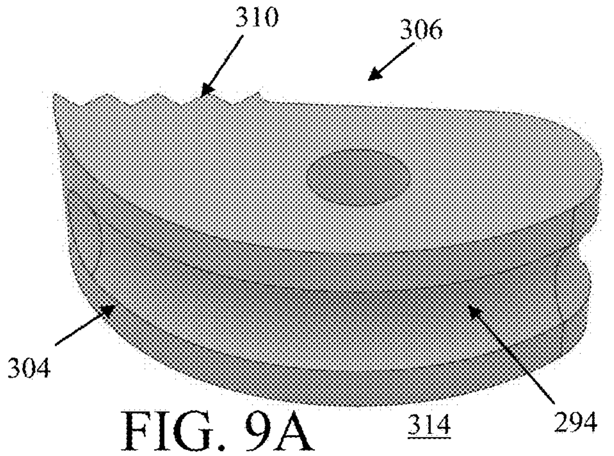
FIG. 9A
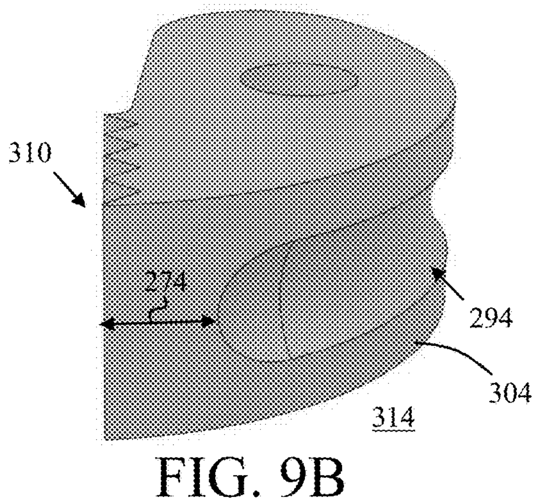
FIG. 9B
FIG. 9C
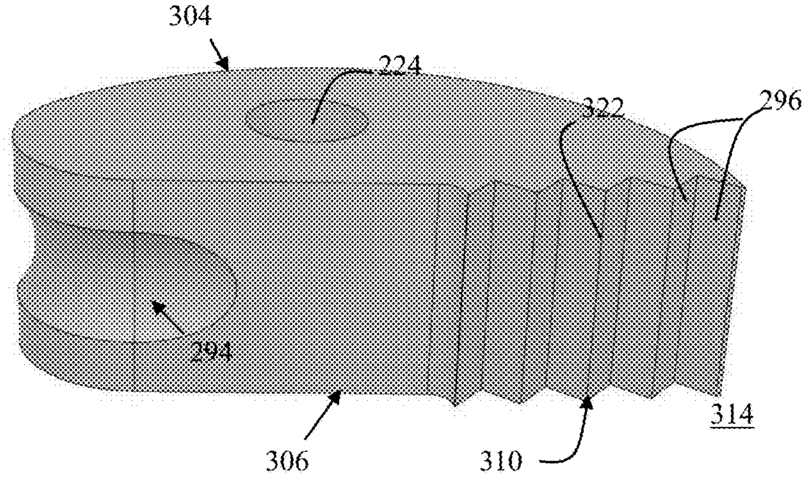
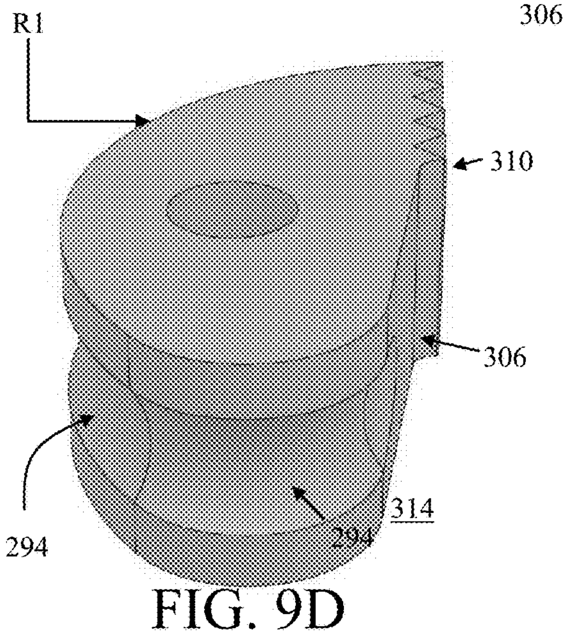
FIG. 9D
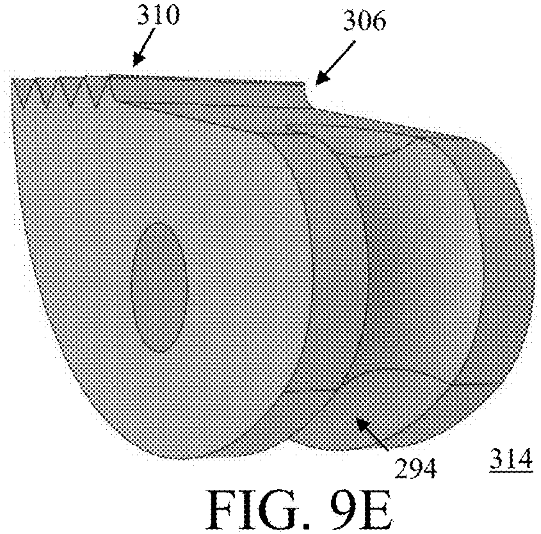
FIG. 9E

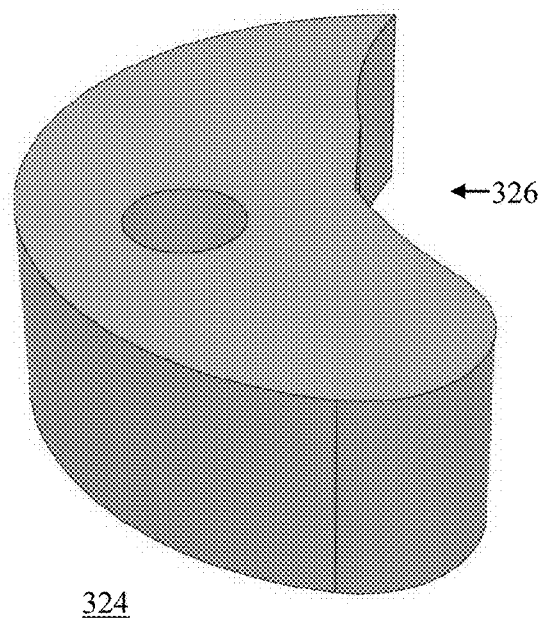
FIG. 13A
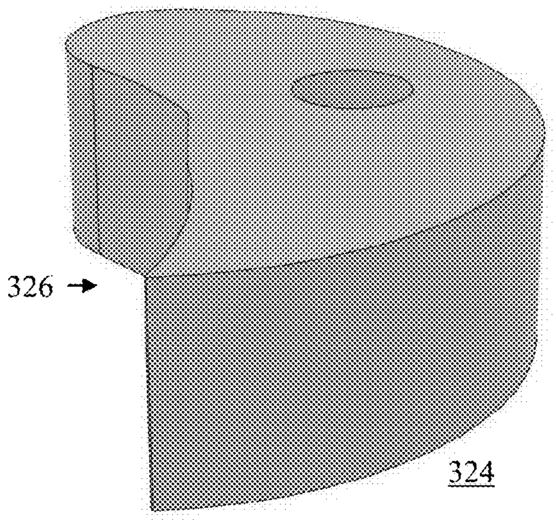
FIG. 13B
FIG. 13C
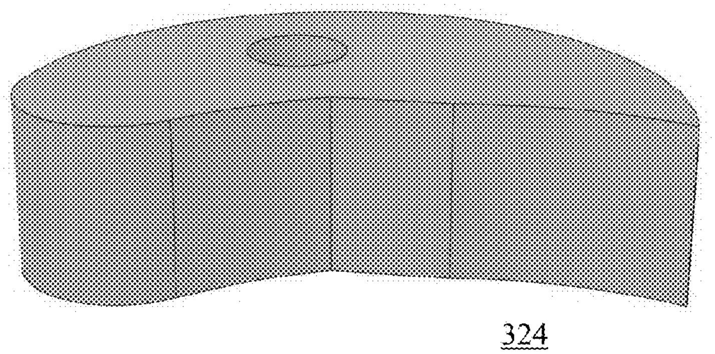
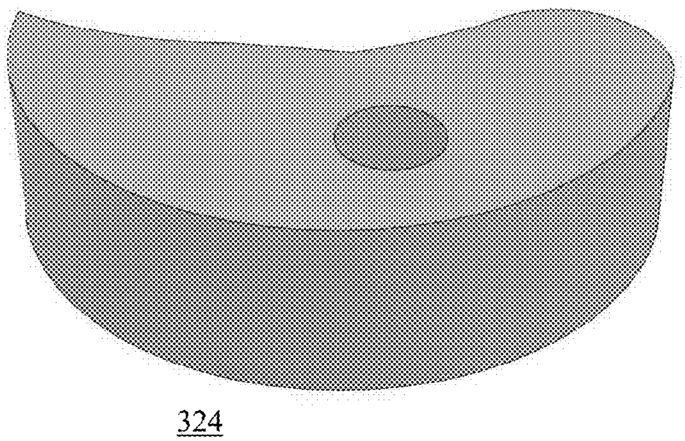
FIG. 13D

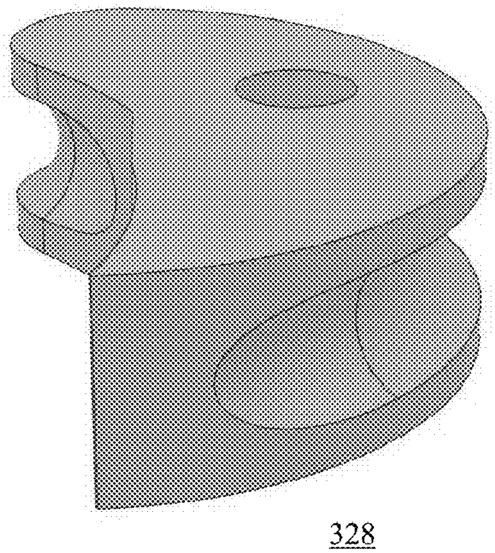
FIG. 14A
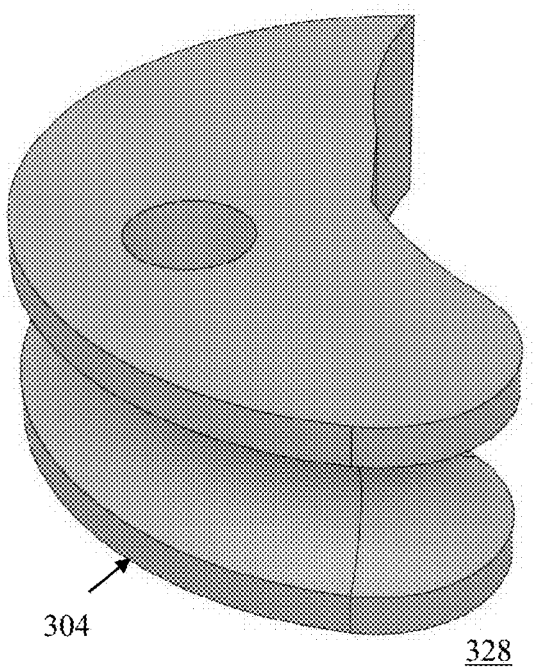
FIG. 14B
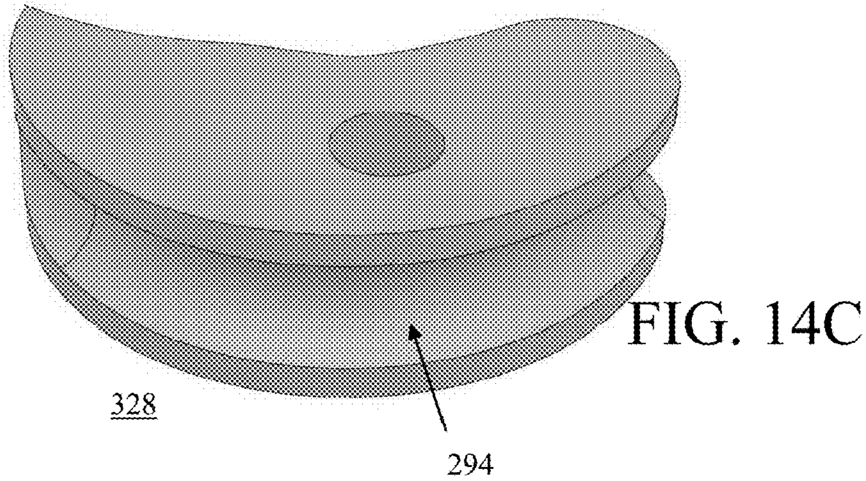
FIG. 14C
FIG. 14D
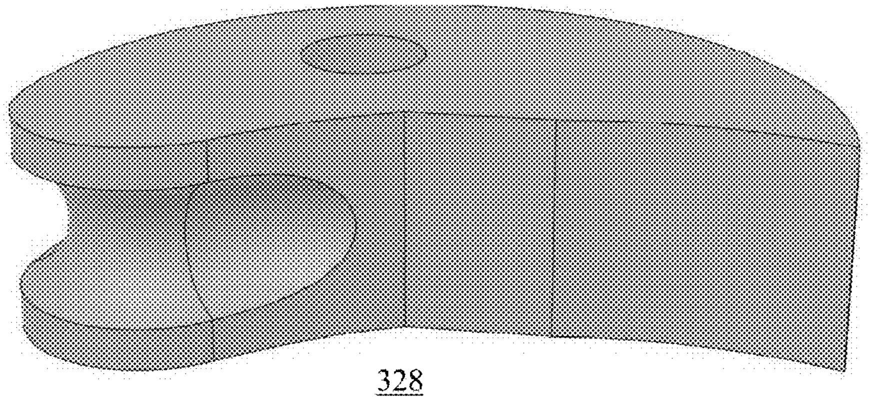

LOCKING STRING TUNER

CROSS-REFERENCE TO RELATED APPLICATIONS

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relate in general to a locking string tuner for a stringed instrument.

Description of Related Art

Conventional locking string tuners are well known and have been in use for several years. A drawback with existing conventional locking string tuners is that they are complex in terms of both components used and operations of the components to load, secure, and or remove the string. Further, they are comprised of large number of moving parts. A non-limiting example of such a conventional locking string tuner is disclosed in U.S. patent application Ser. No. 17/197,119 to Cardozo (also the current inventor of the present application). The entire disclosure of U.S. patent application Ser. No. 17/197,119 is incorporated by reference in its entirety herein.

Accordingly, in light of the current state of the art and the drawbacks to current locking string tuners mentioned above a need exists for a simple locking string tuner that would allow for easy loading and securing of a string for tuning. As importantly, a need exists for a simple locking string tuner that would allow a secured string to self-disengage from the locking string tuner for removal of the string.

BRIEF SUMMARY OF THE INVENTION

A non-limiting, exemplary aspect of an embodiment of the present invention provides a locking string tuner, comprising:

- a string post; and
- an engagement member that is moveably associated with the string post.

Another non-limiting, exemplary aspect of an embodiment of the present invention provides a locking string tuner, comprising:

- an engagement member having an ingress end and an egress end;
- the engagement member has:
- an engagement side that includes a grip surface and a relief surface; and
- a reeling side.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 9A to 9E are non-limiting, exemplary illustrations of an engagement member in accordance with another embodiment of the present invention;

FIGS. 13A to 13D are non-limiting, exemplary illustrations of an engagement member in accordance with another embodiment of the present invention; and FIGS. 14A to 14D are non-limiting, exemplary illustrations of an engagement member in accordance with another embodiment of the present invention.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

FIGS. 1A to 1E are non-limiting, exemplary illustrations of a musical instrument that includes a locking string tuner in accordance with one or more embodiments of the present invention.

Figure 10A:
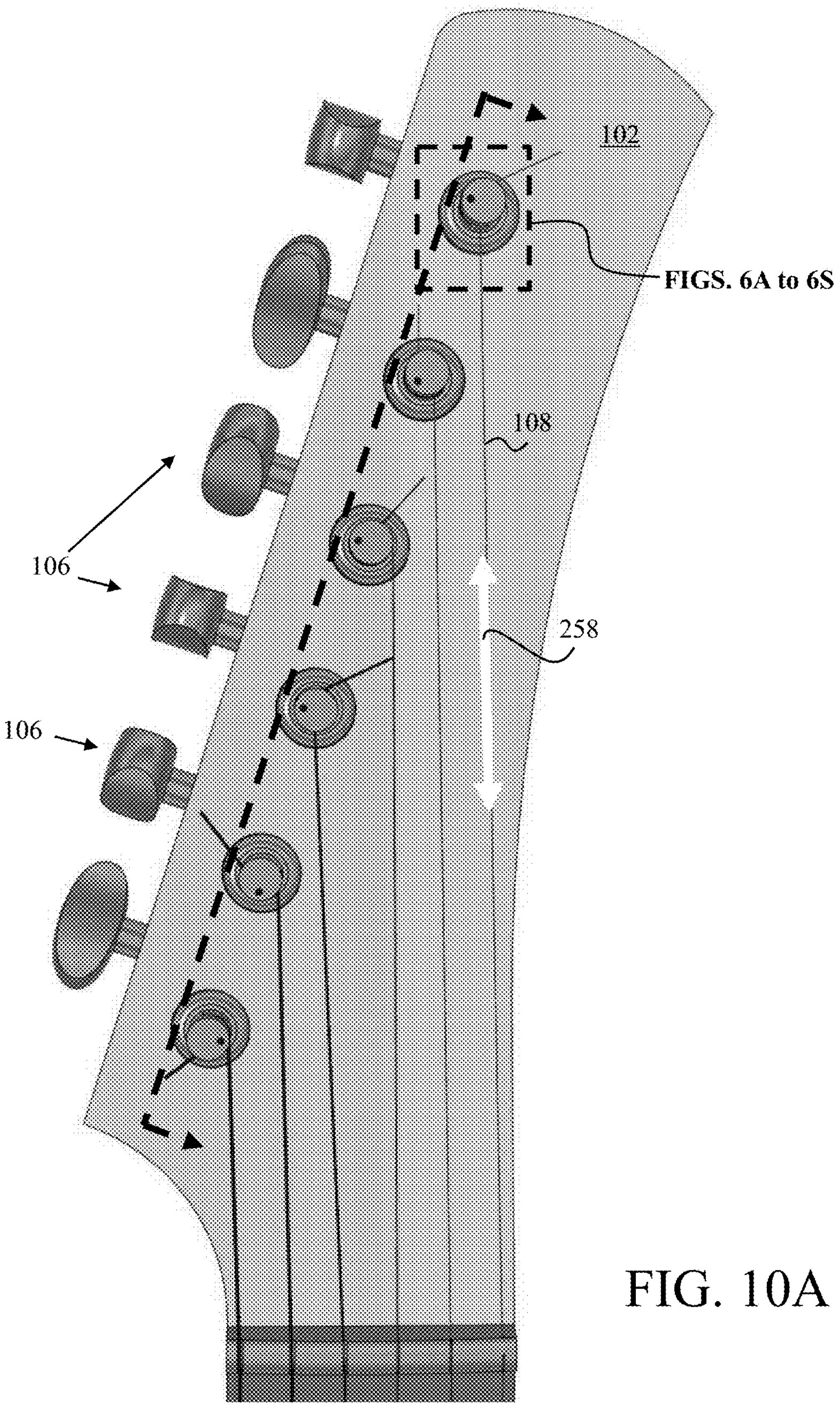
FIGS. 10A to 12W are non-limiting, exemplary illustrations of locking string tuner in accordance with another embodiment of the present invention.
Figure 10B:
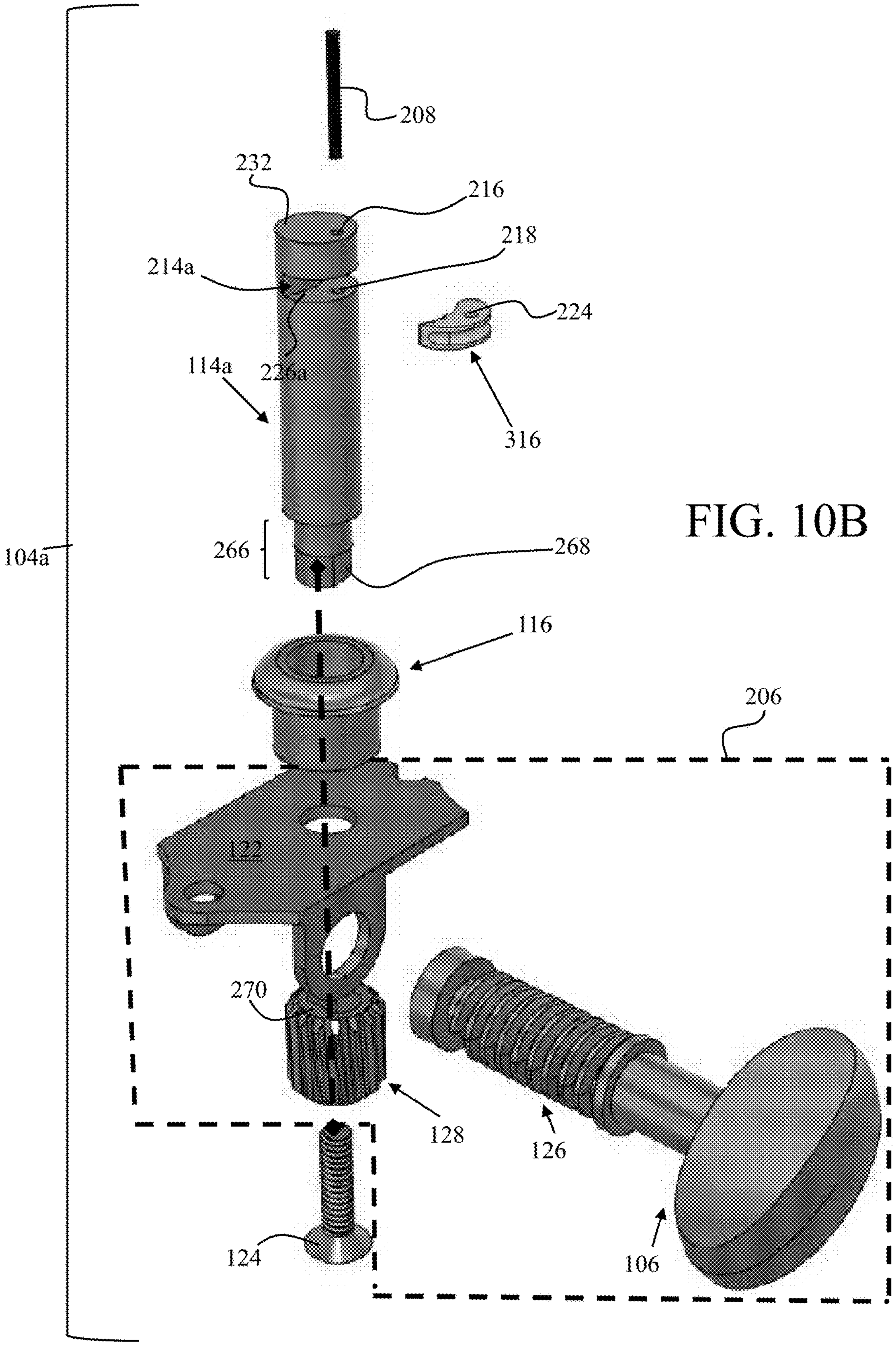
Figure 10C:
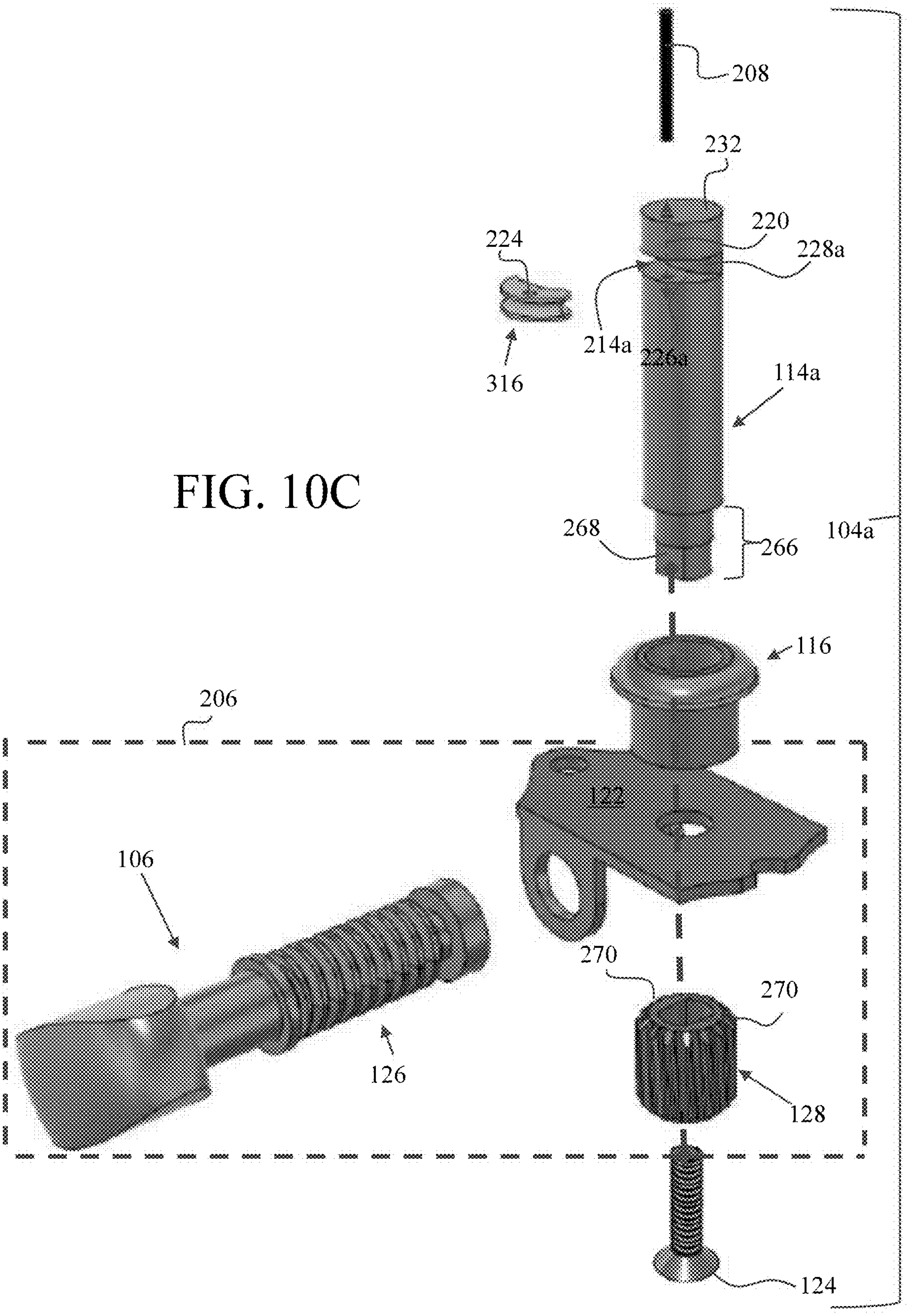
Figure 10D:
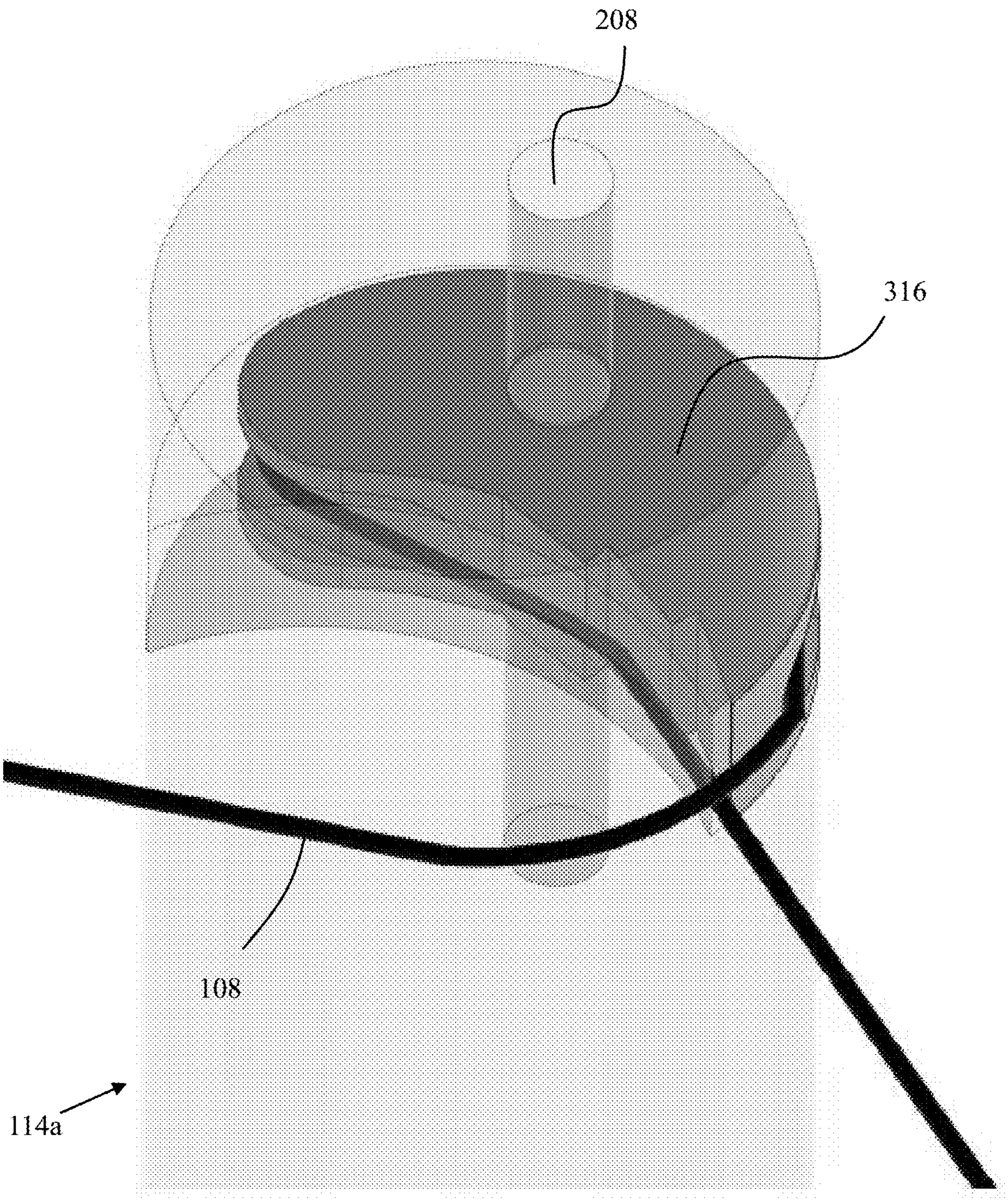
Figure 10E:
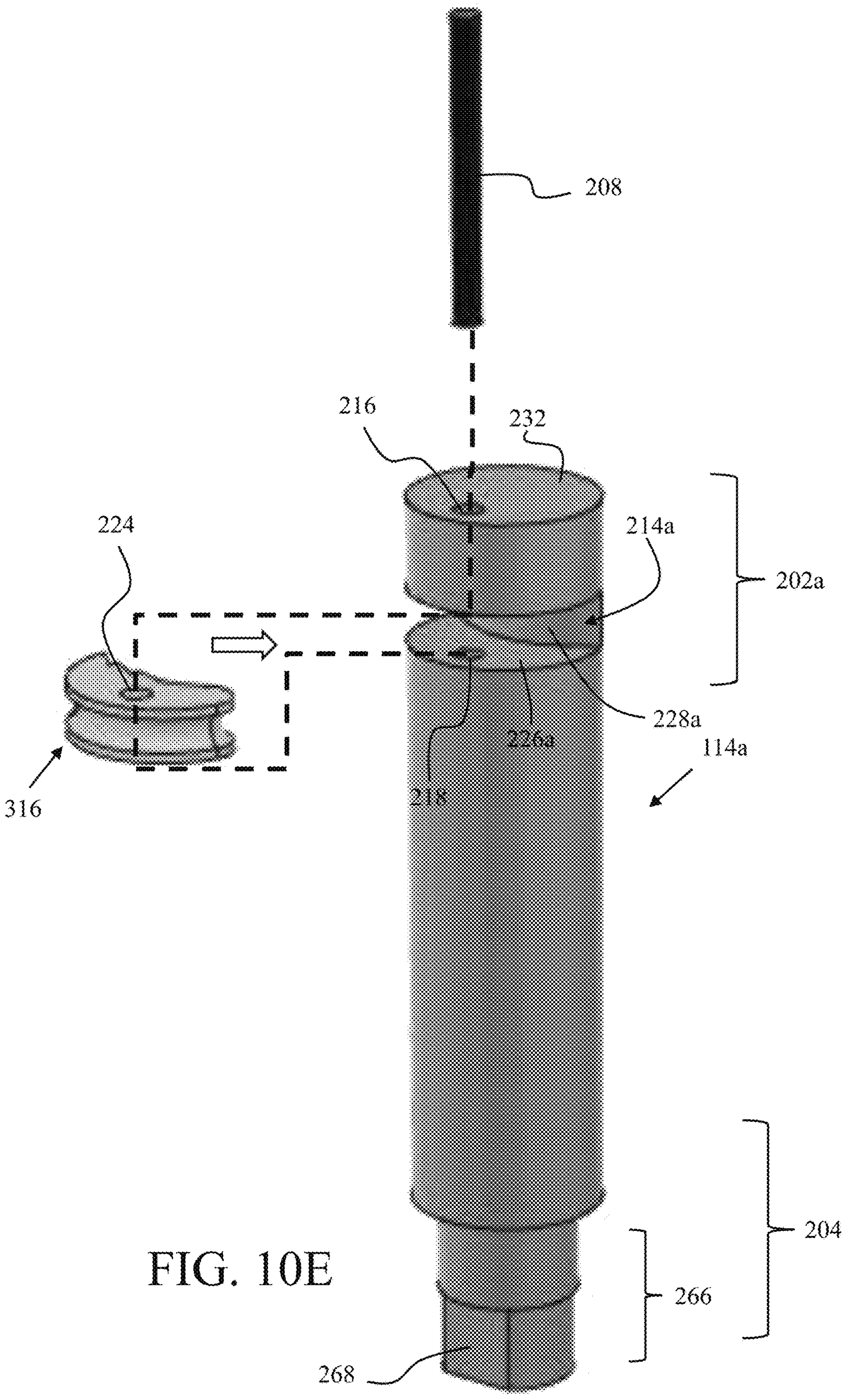
Figure 10F:
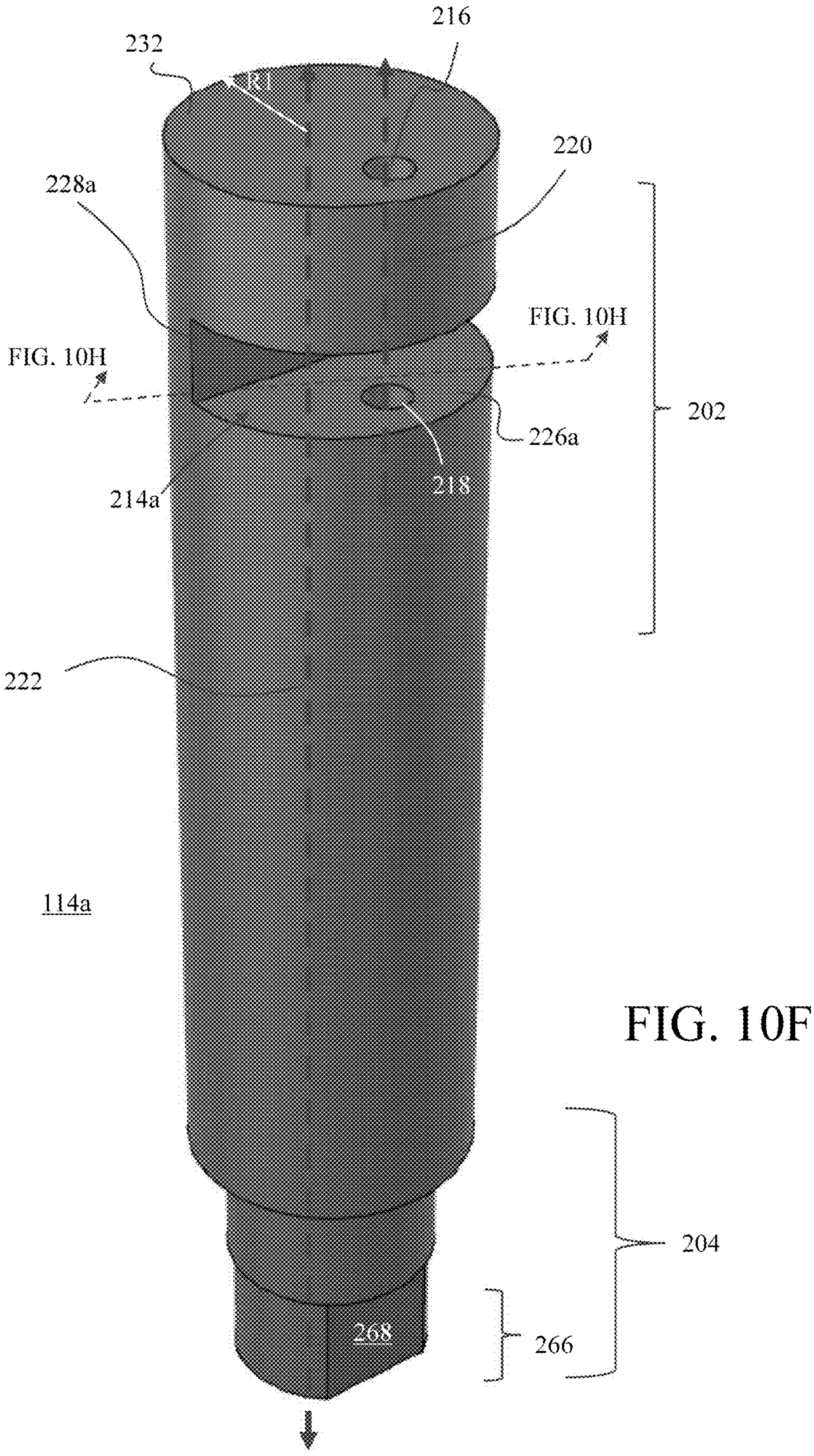
Figure 10G:
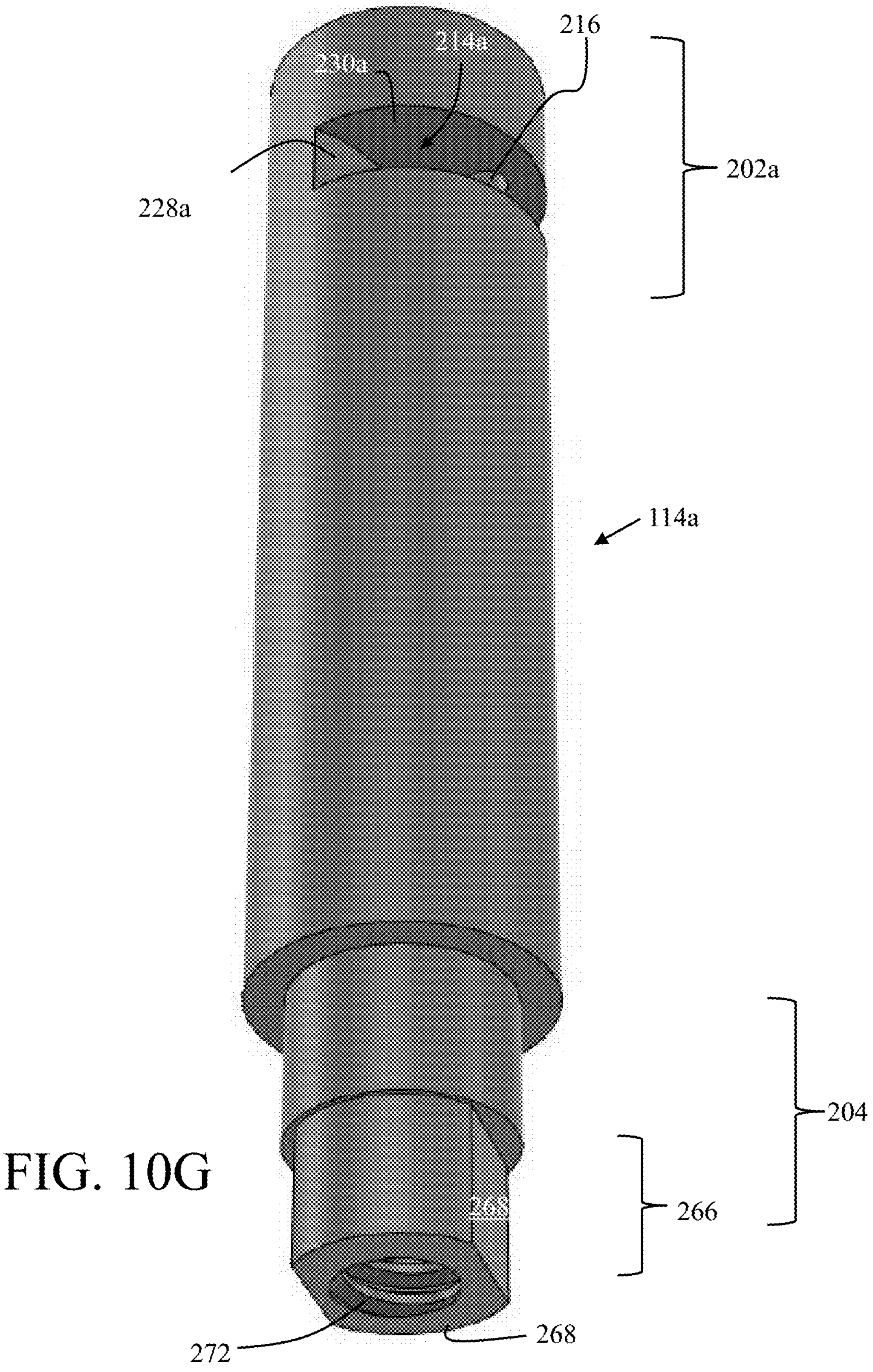

The illustrated string instrument 10 (FIG. 10A) includes a headstock 102 that accommodates a set of locking string tuners 104 in accordance with one or more embodiments of the present invention. A tuning knob 106 of locking string tuner 104 may be rotated (FIG. 1C) along path 110, which, in turn, would rotate a string post 114 along path 112 to thereby vary the application of tensile force 258 on string 108 to tune string 108.

Figure 1A:
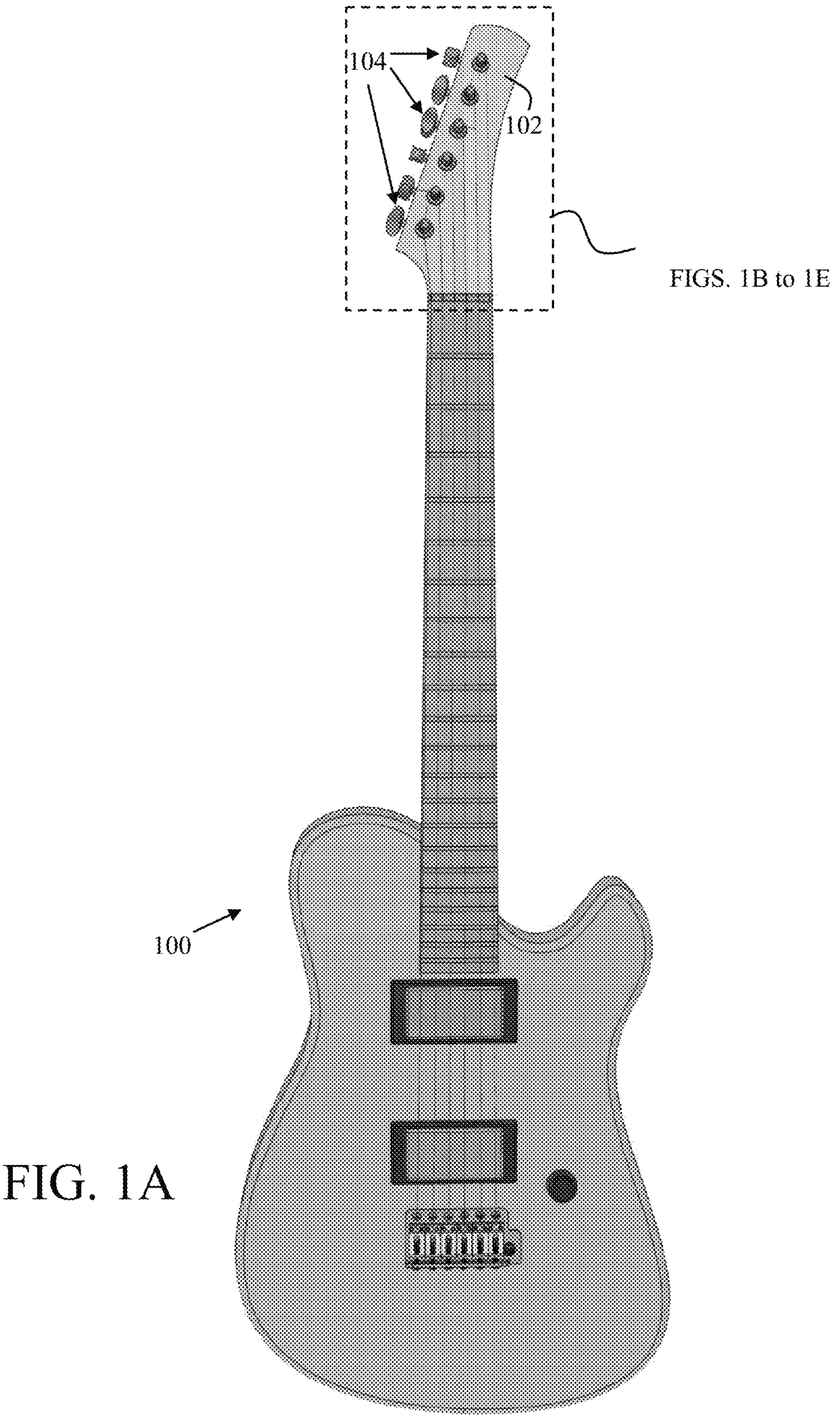
FIGS. 1A to 1E are non-limiting, exemplary illustrations of a musical instrument that includes a locking string tuner in accordance with one or more embodiments of the present invention.
Figure 1B:
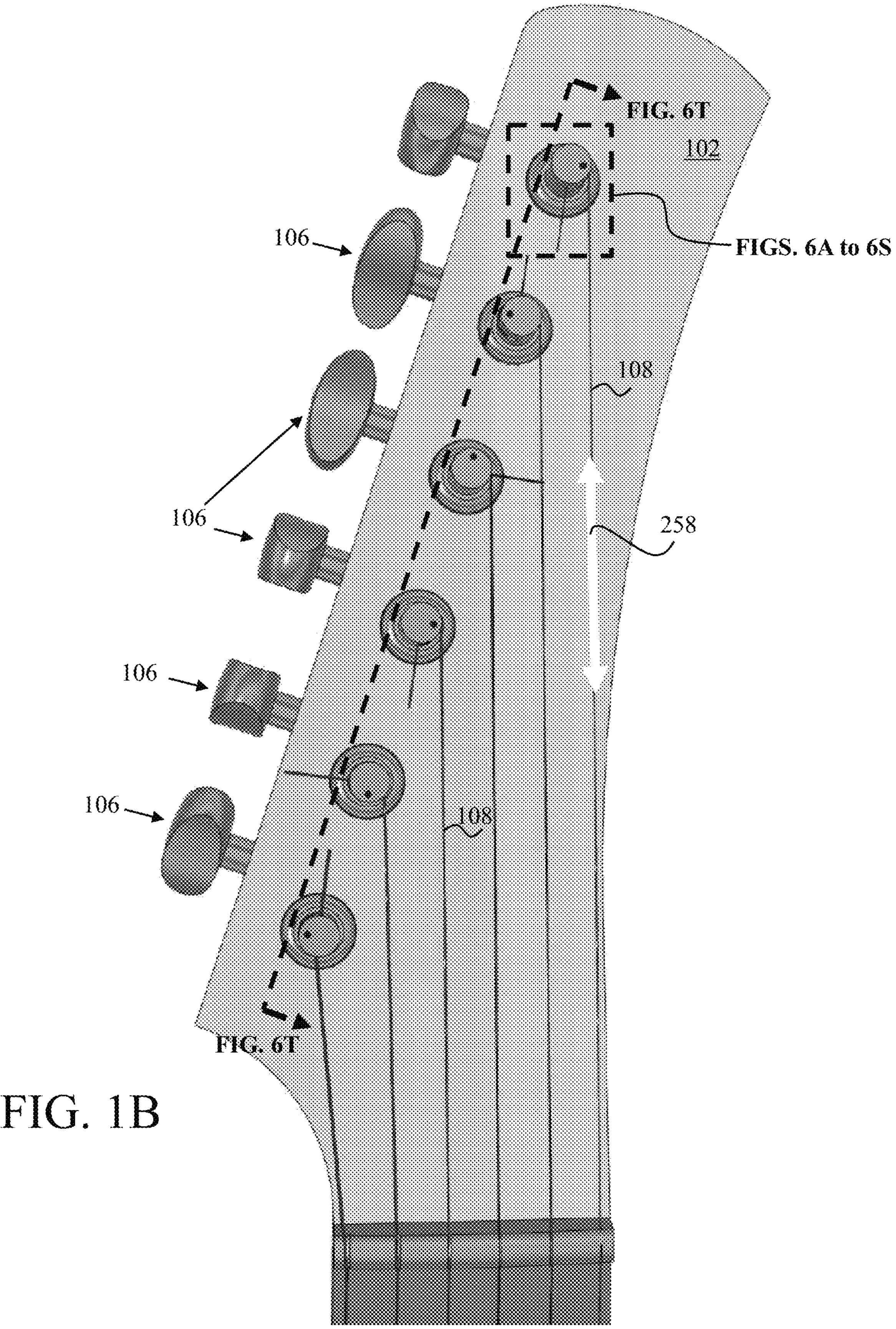
Figure 1C:
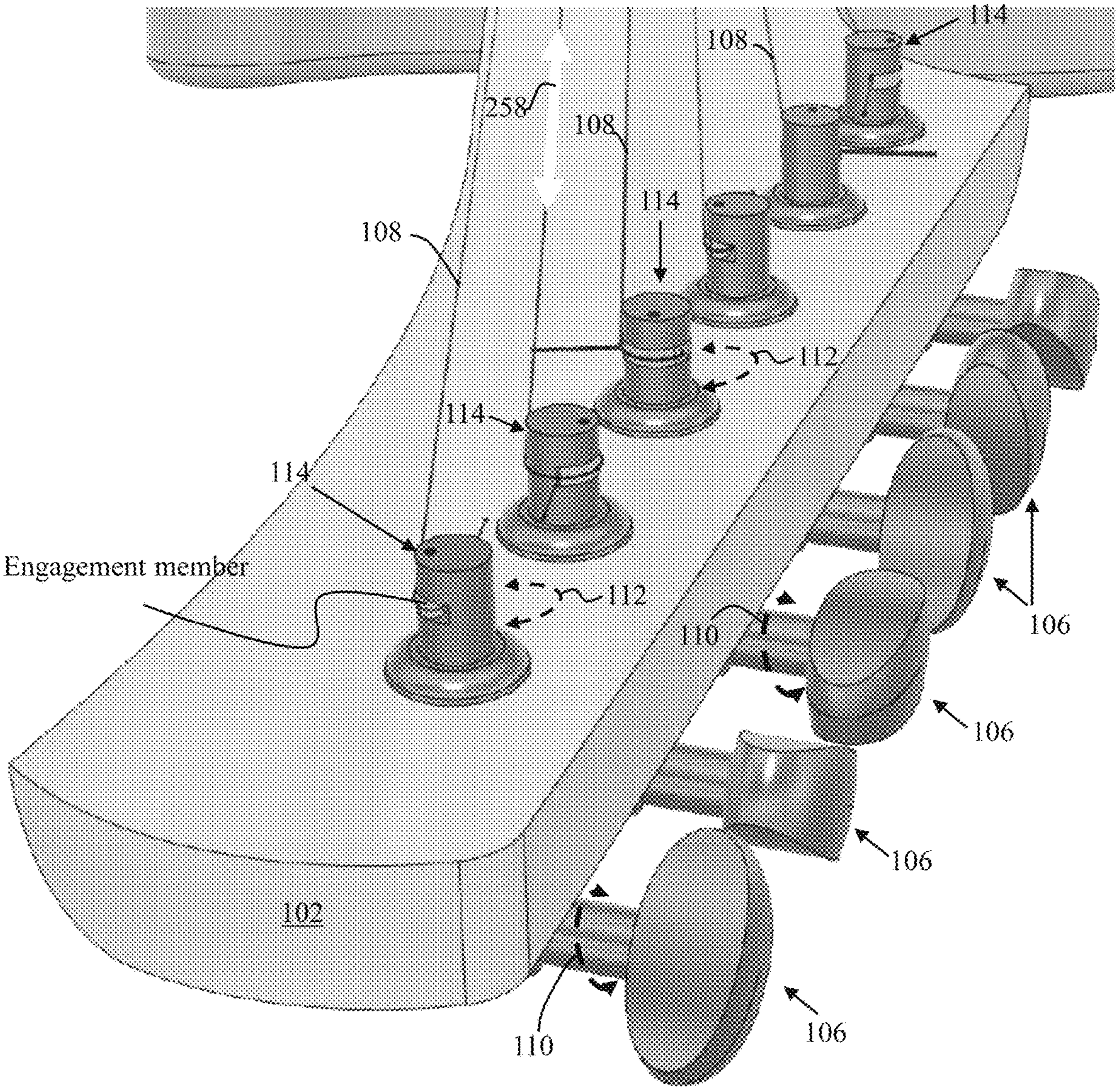
Figure 1D:
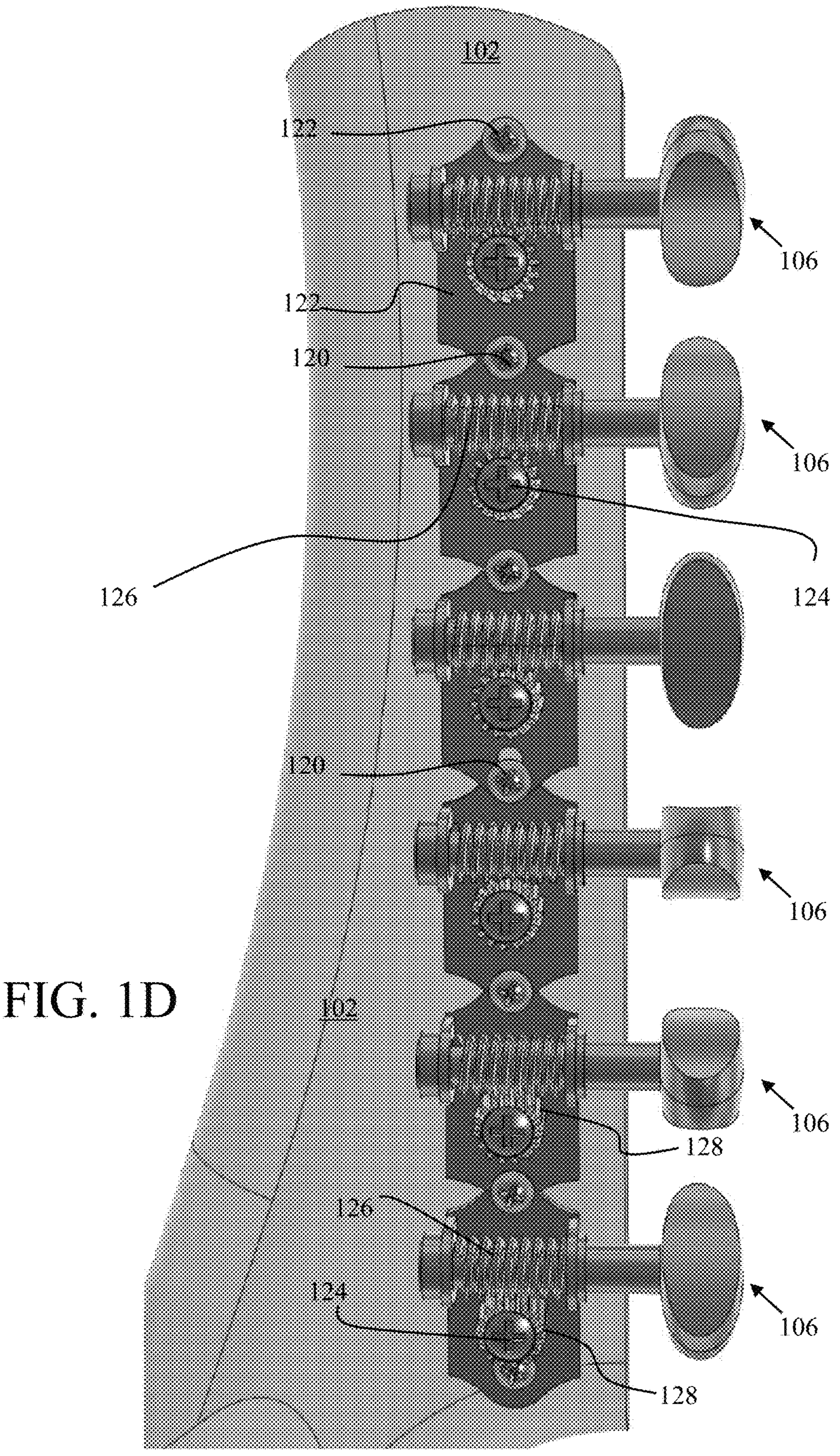
Figure 1E:
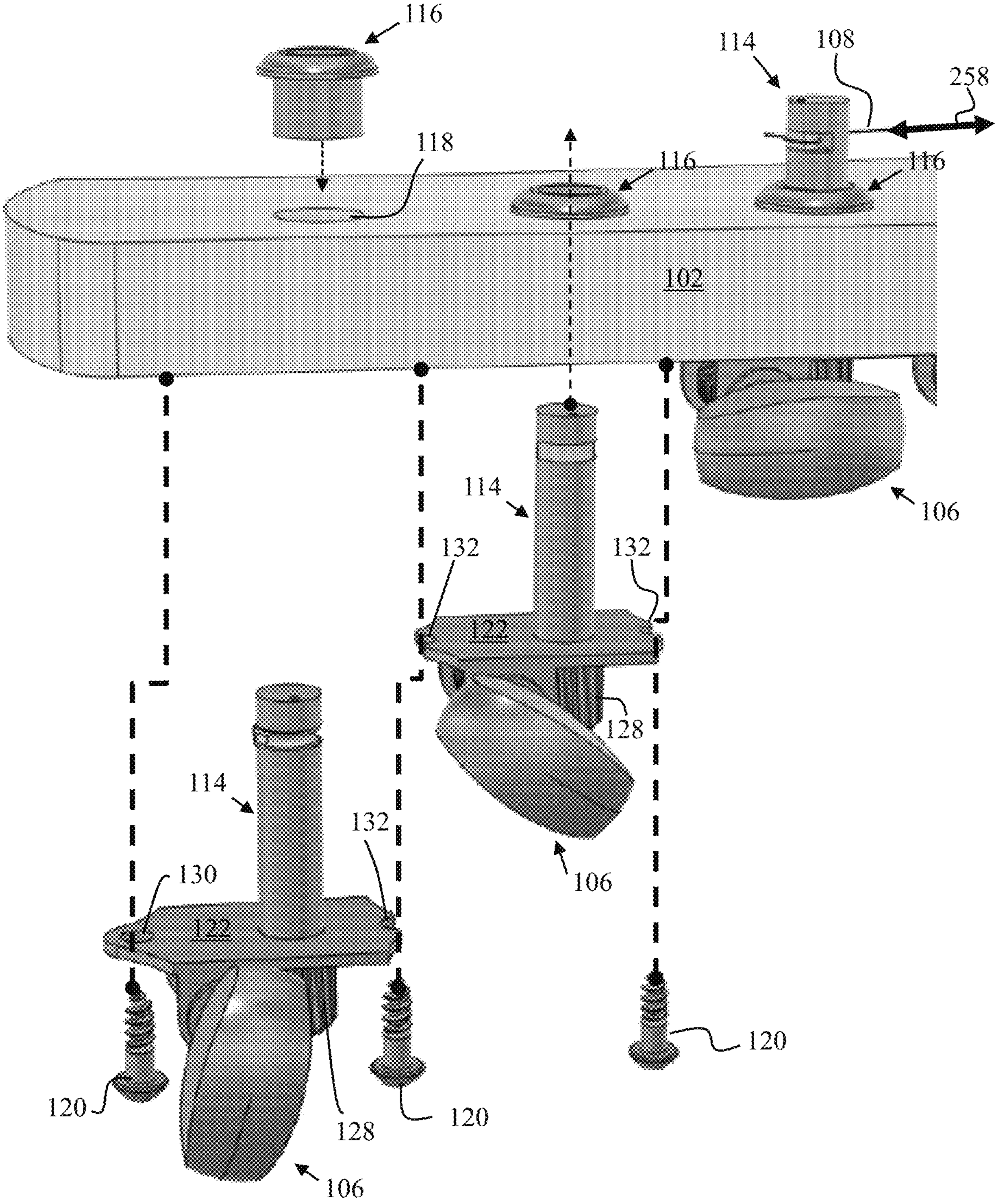

As best illustrated in FIG. 1E, and further detailed below, a locking string tuner 104 may be mounted and secured onto headstock 102 in a well-known and conventional manner. Depending on the string instrument, the mounting orientation, and or the desired handedness (left- or right-handed mounting), the size of locking string tuner 104 and its components may be varied. Variations in string diameter may also be a factor to vary the size of locking string tuner 104 and its components.

A conventional ferrule (or annular metal band) 116 may be pressed fit (i.e., friction fit) into a headstock through-opening 118, after which, the rest of the components of locking string tuner 104 of the present invention may be secured onto headstock 102 in a well-known conventional manner using securing fasteners 120. A base plate 122 of locking string tuner 104 may include mounting or securing openings 130 (and or notches 132), which receive securing fasteners 120 for securing locking string tuner 104 to headstock 102.

As is well known, a ferrule 116 functions as a brace to support string post 114 of the present invention to counter tensile forces 258 of string 108 experienced by string post 114. That is, as tensional force 258 is applied to string 108, ferrule 116 carries the load (tensile force 258) of string 108 to support string post 114.

As best illustrated in FIGS. 1D and 1E and further detailed below, string post 114 is secured to base plate 122 of locking string tuner 104 using string post retaining members 124. In this non-limiting, exemplary instance, string post retaining members 124 are shown as conventional fasteners. As string post retaining members 124 are tightened, they pull string post 114 towards base plate 122 and retain a worm gear (i.e., pinion) 128 in place in contact with worm (i.e., gear) 126.

FIGS. 2A to 2D are non-limiting, exemplary illustrations of the various views of the locking string tuner illustrated in FIGS. 1A to 1E (but without the musical instrument) in accordance with one or more embodiments of the present invention.

As illustrated in FIGS. 2A to 2D, locking string tuner 104 may be comprised of a well-known, conventional gearing mechanism 206 (delineated by dashed lines in FIGS. 3A to 3C) that may include a conventional base plate 122, tuning knob 106, worm gear 128, and worm 126. As indicated above, ferrule 116 is also well known.

As further detailed below, locking string tuner 104 further includes string post 114 and engagement member 200. A conventional string 108 may be loaded onto locking string tuner 104 by insertion of string 108 through an opening (or gap) 210 between engagement member 200 and string post 114.

Figure 2A:
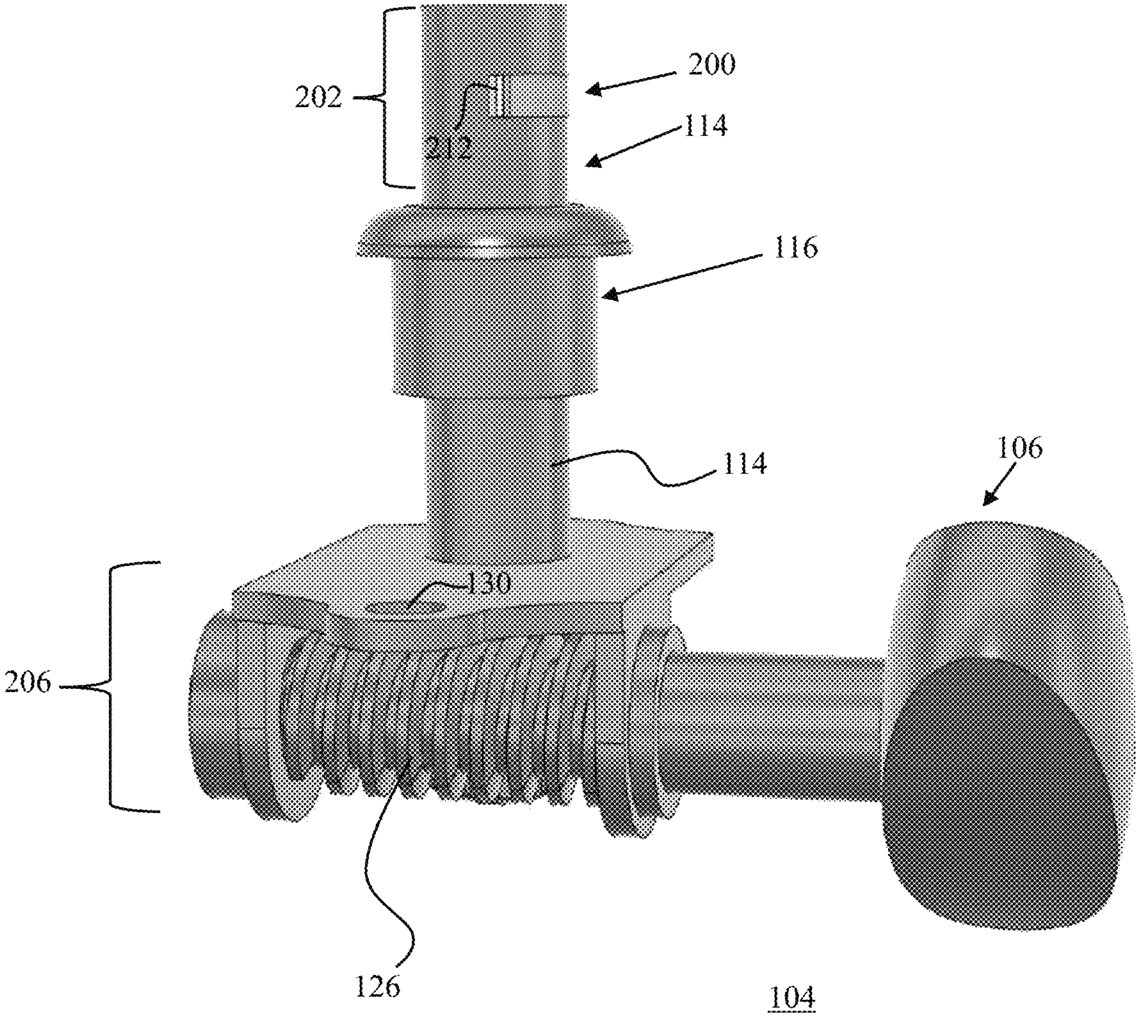
FIGS. 2A to 2D are non-limiting, exemplary illustrations of the various views of the locking string tuner illustrated in FIGS. 1A to 1E (but without the musical instrument) in accordance with one or more embodiments of the present invention.
Figure 2B:
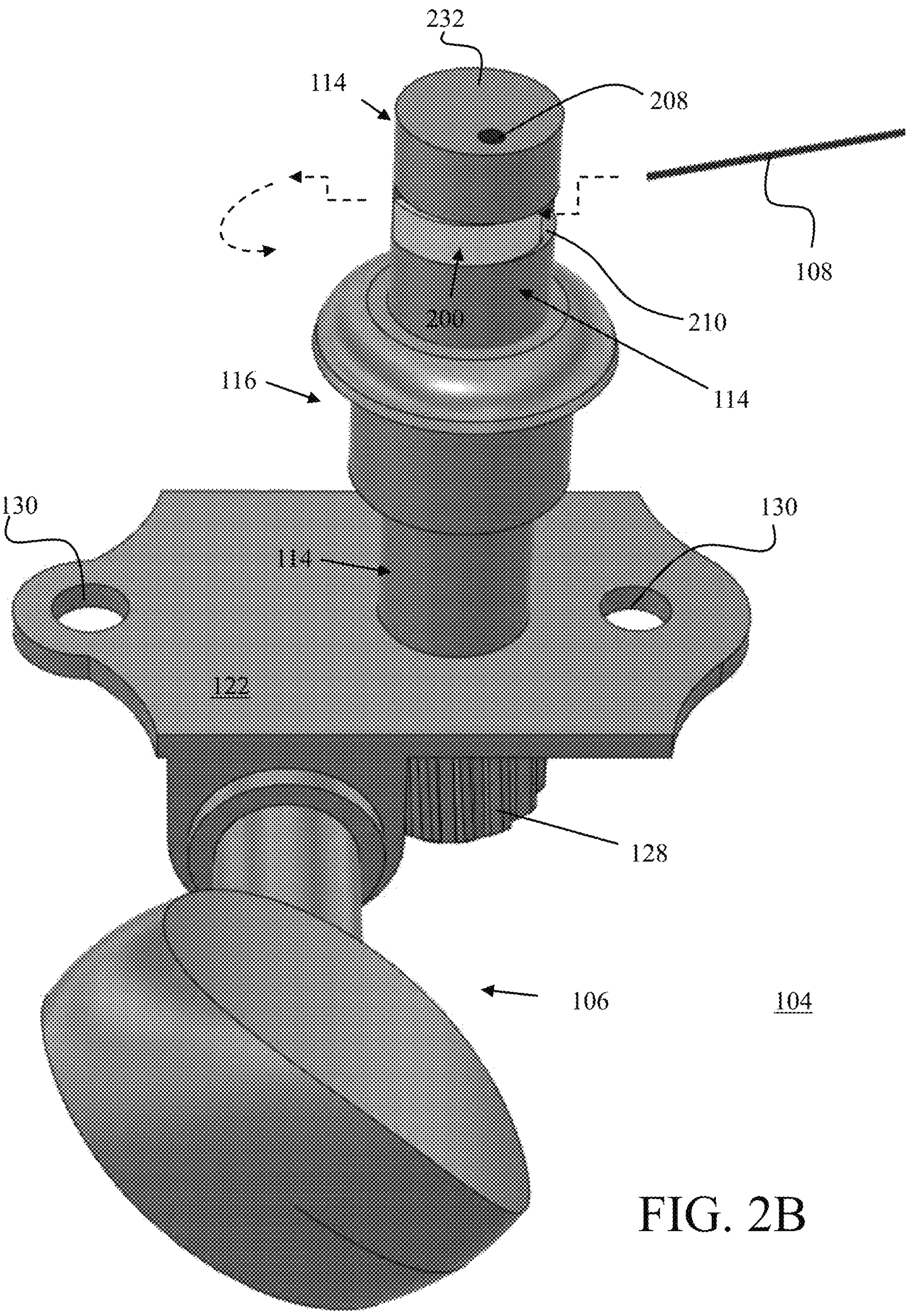
Figure 2C:
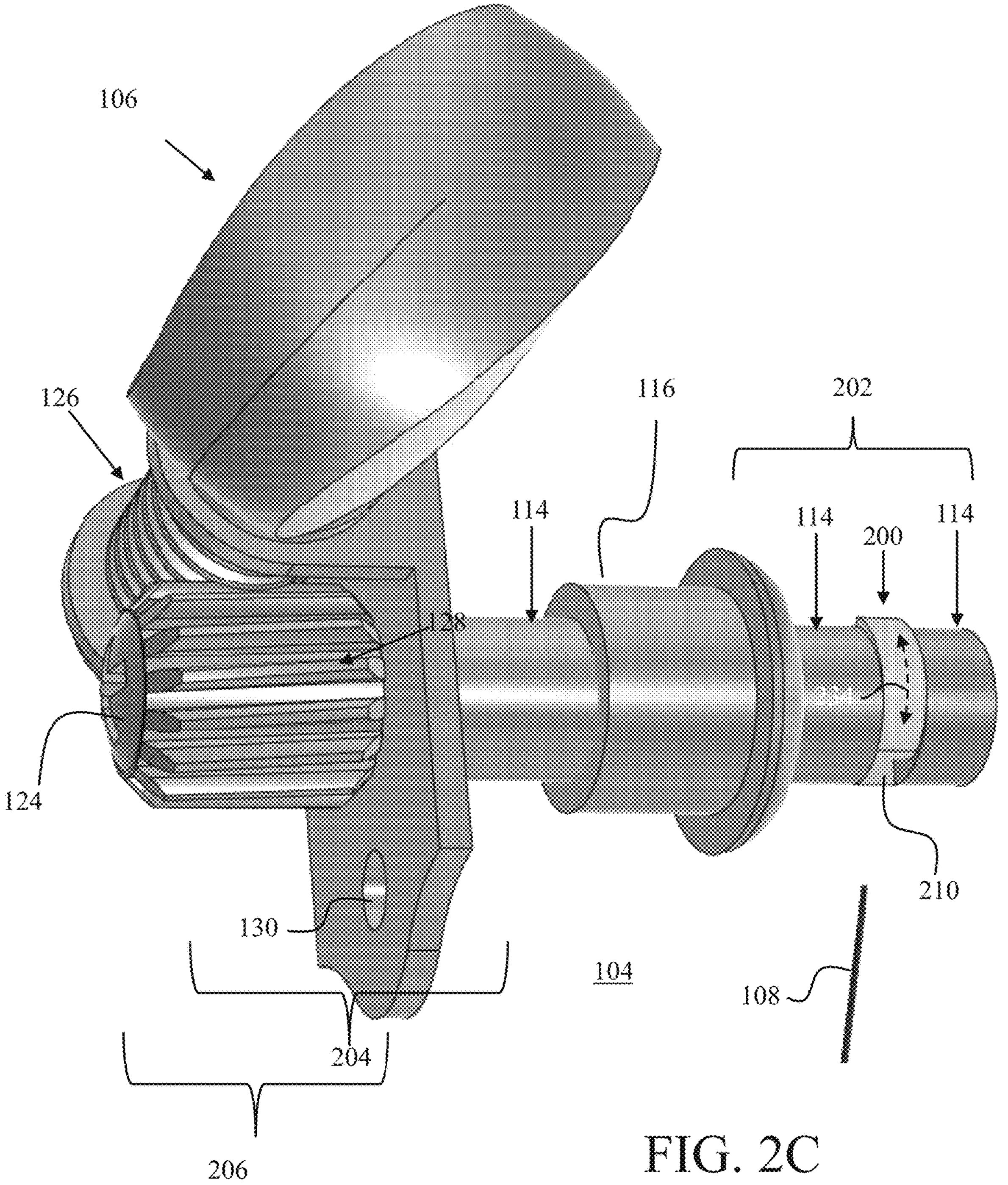
Figure 2D:
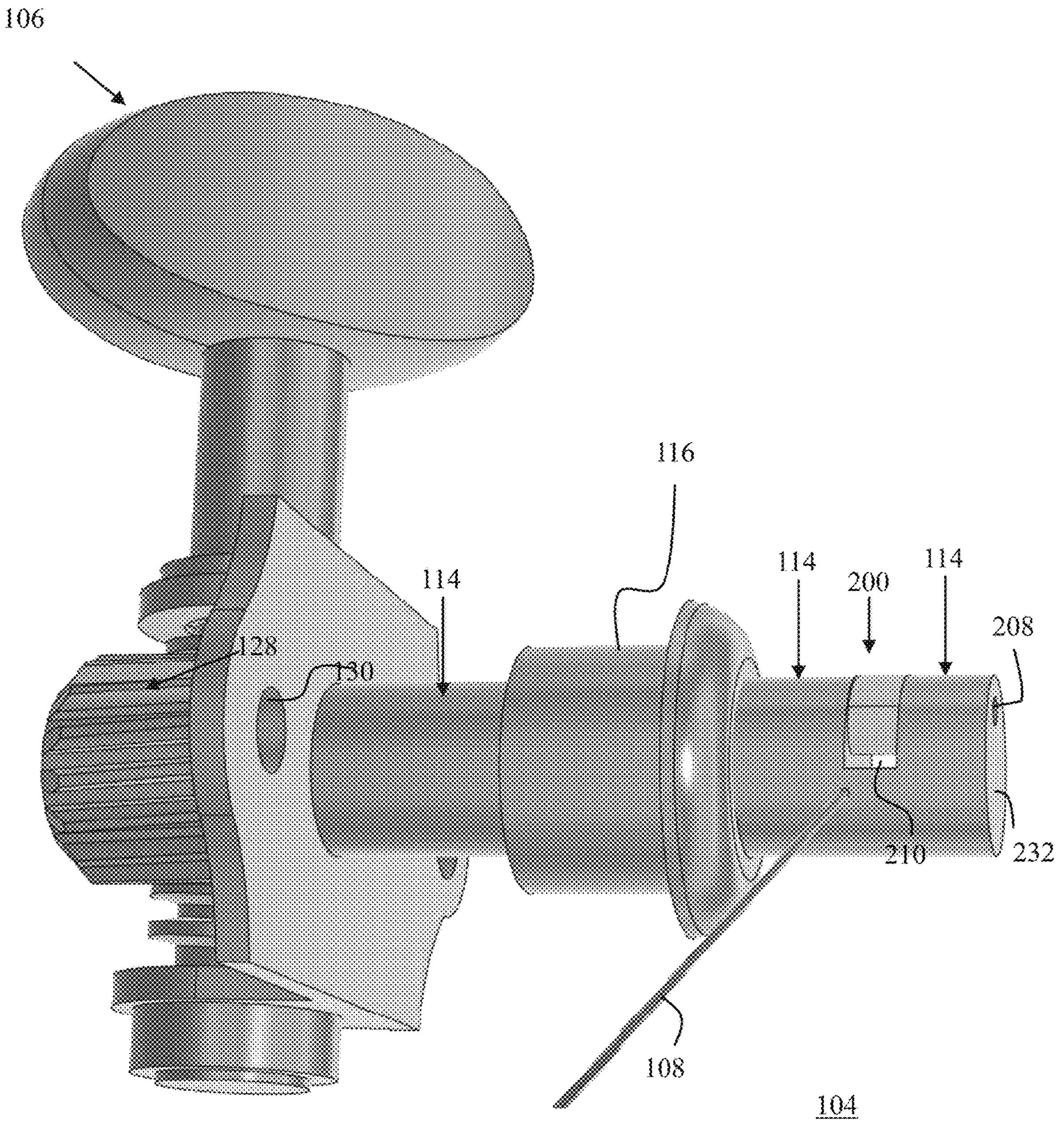
Figure 3A:
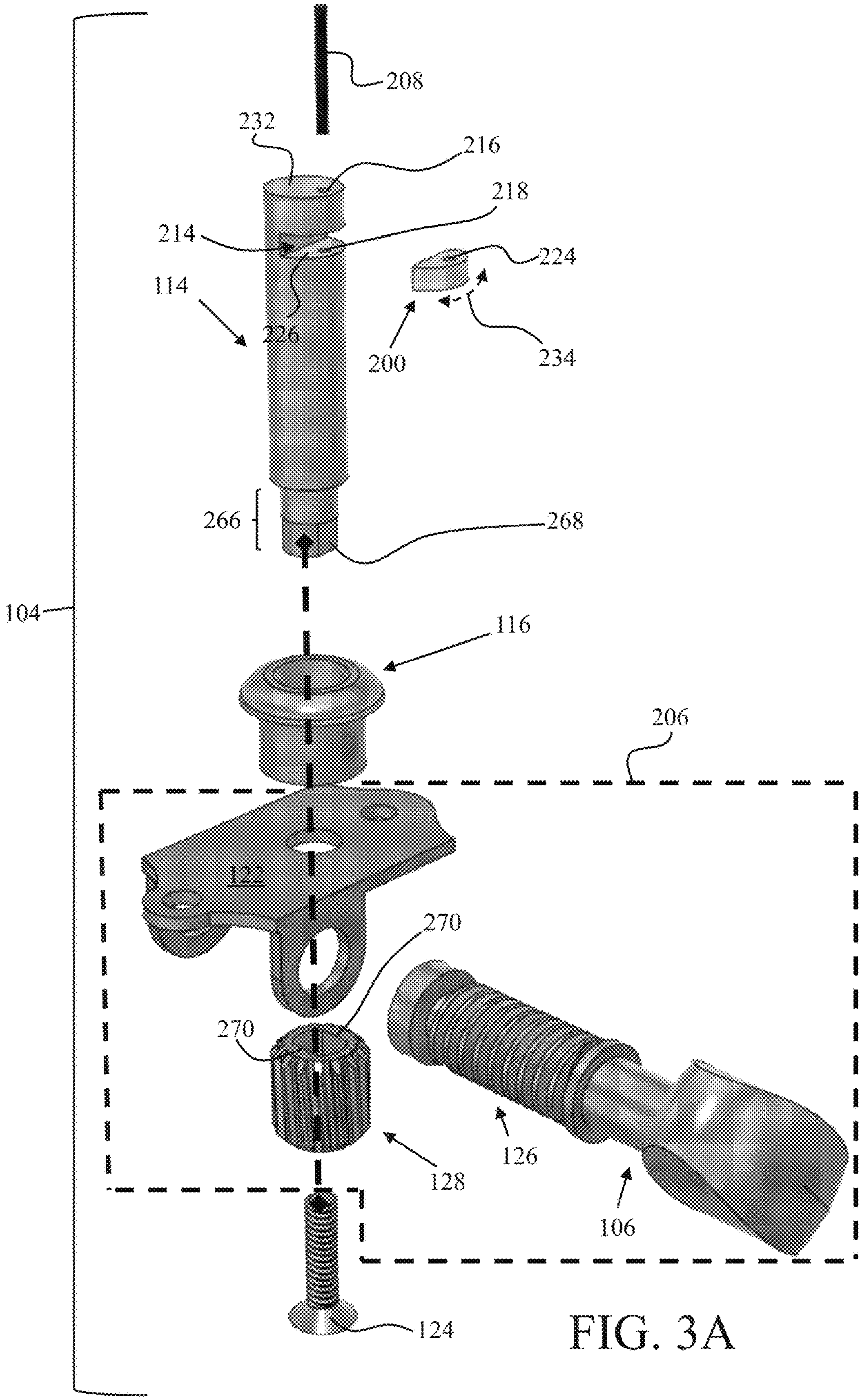
FIGS. 3A to 3D are non-limiting, exemplary illustrations of the exploded views of the locking string tuner illustrated in FIGS. 1A to 2D in accordance with one or more embodiments of the present invention, with FIG. 3D illustrating an enlarged view of the string post and the engagement member of the locking string tuner illustrated in FIGS. 1A to 3C, and FIG. 3E illustrating the positional and cooperative working relationship of engagement member and string post.
Figure 3B:
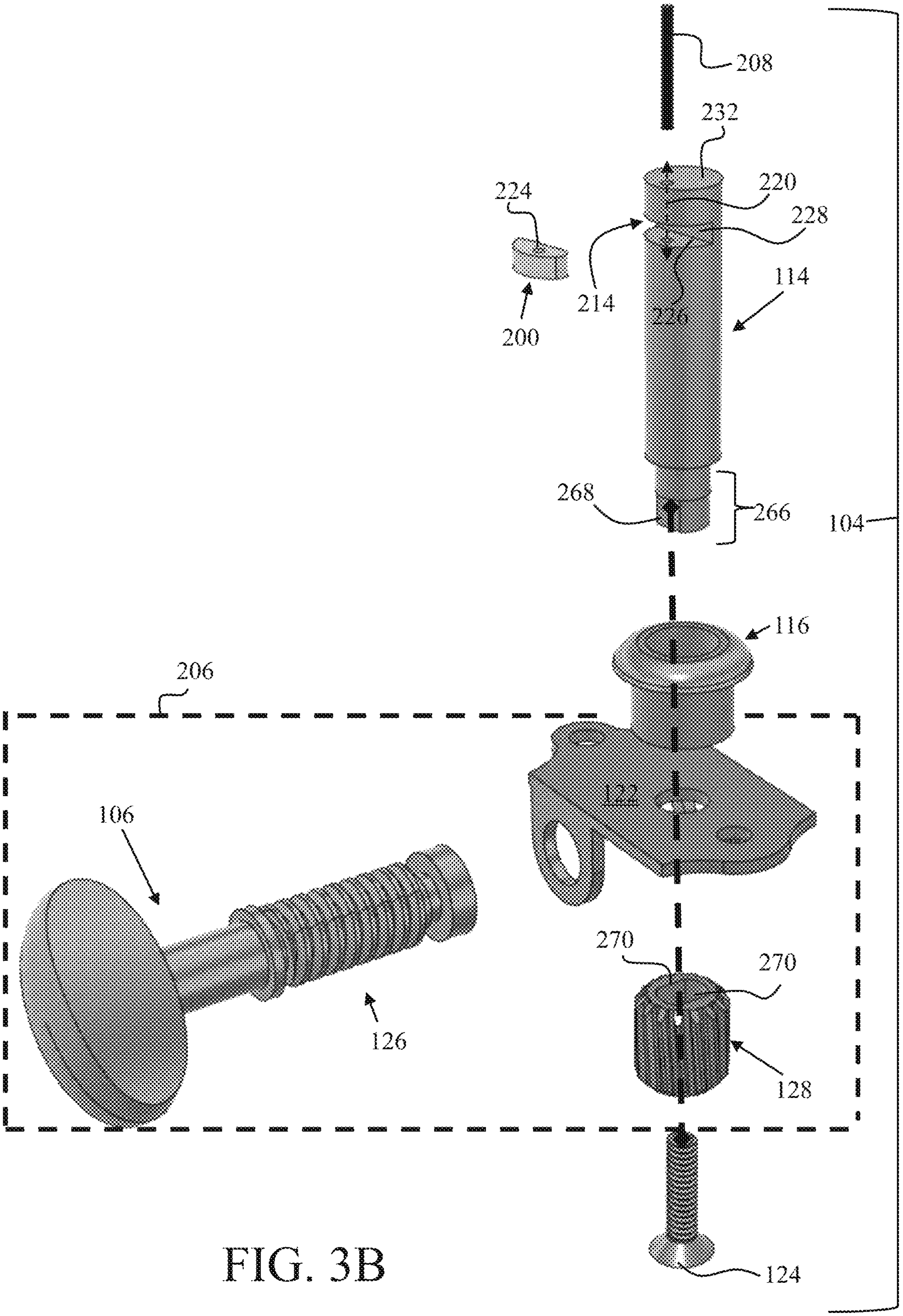
Figure 3C:
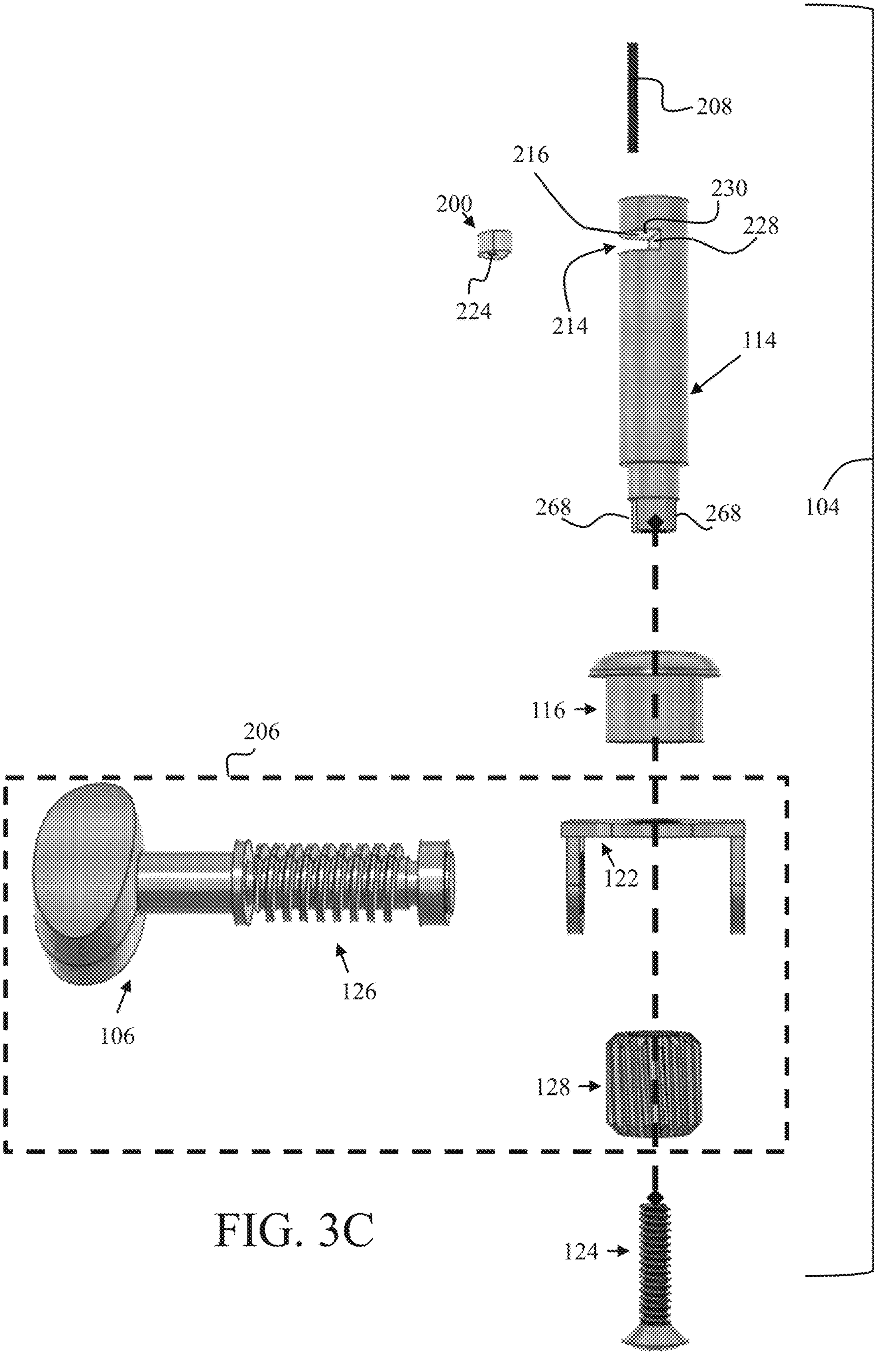
Figure 3D:
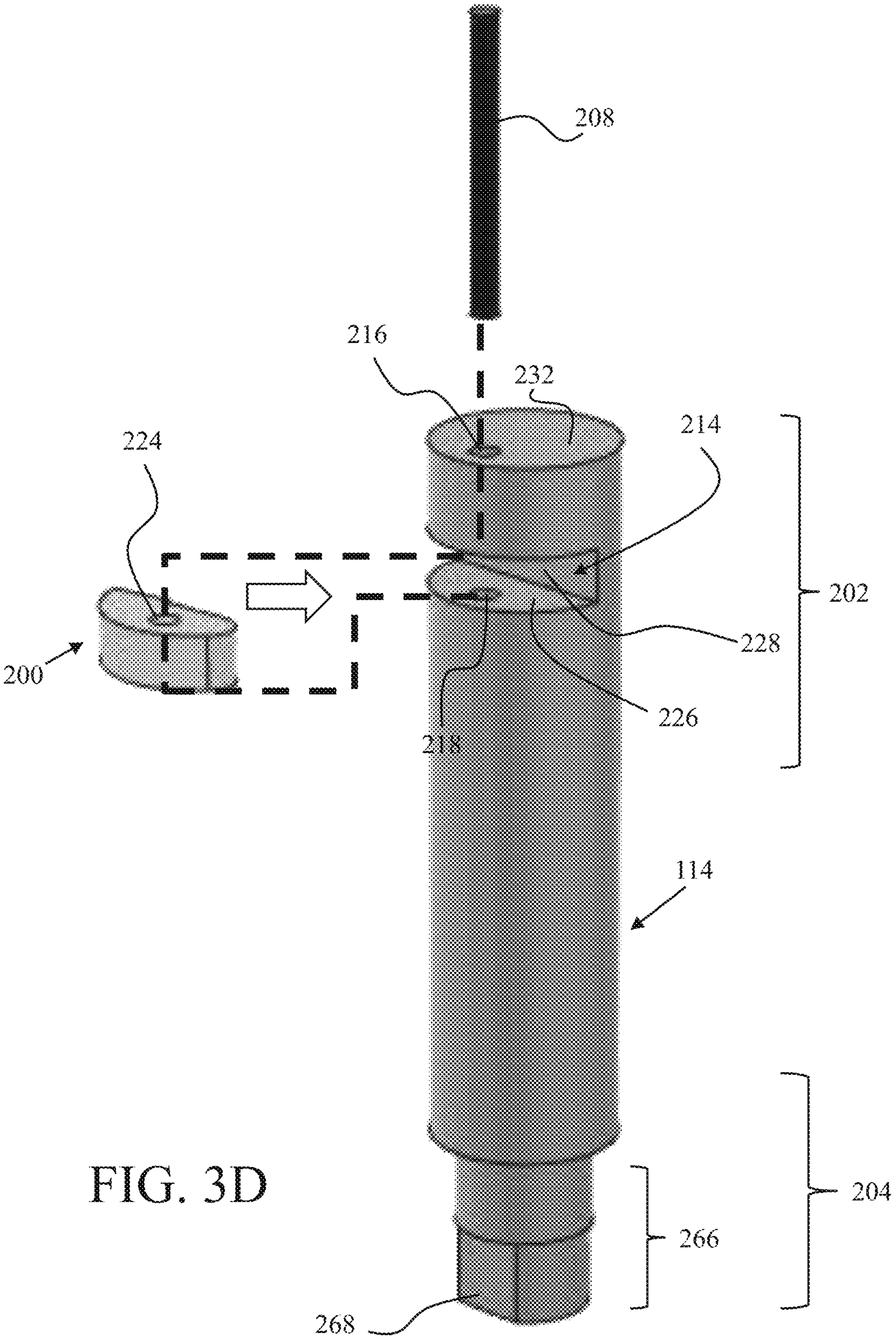
Figure 3E:
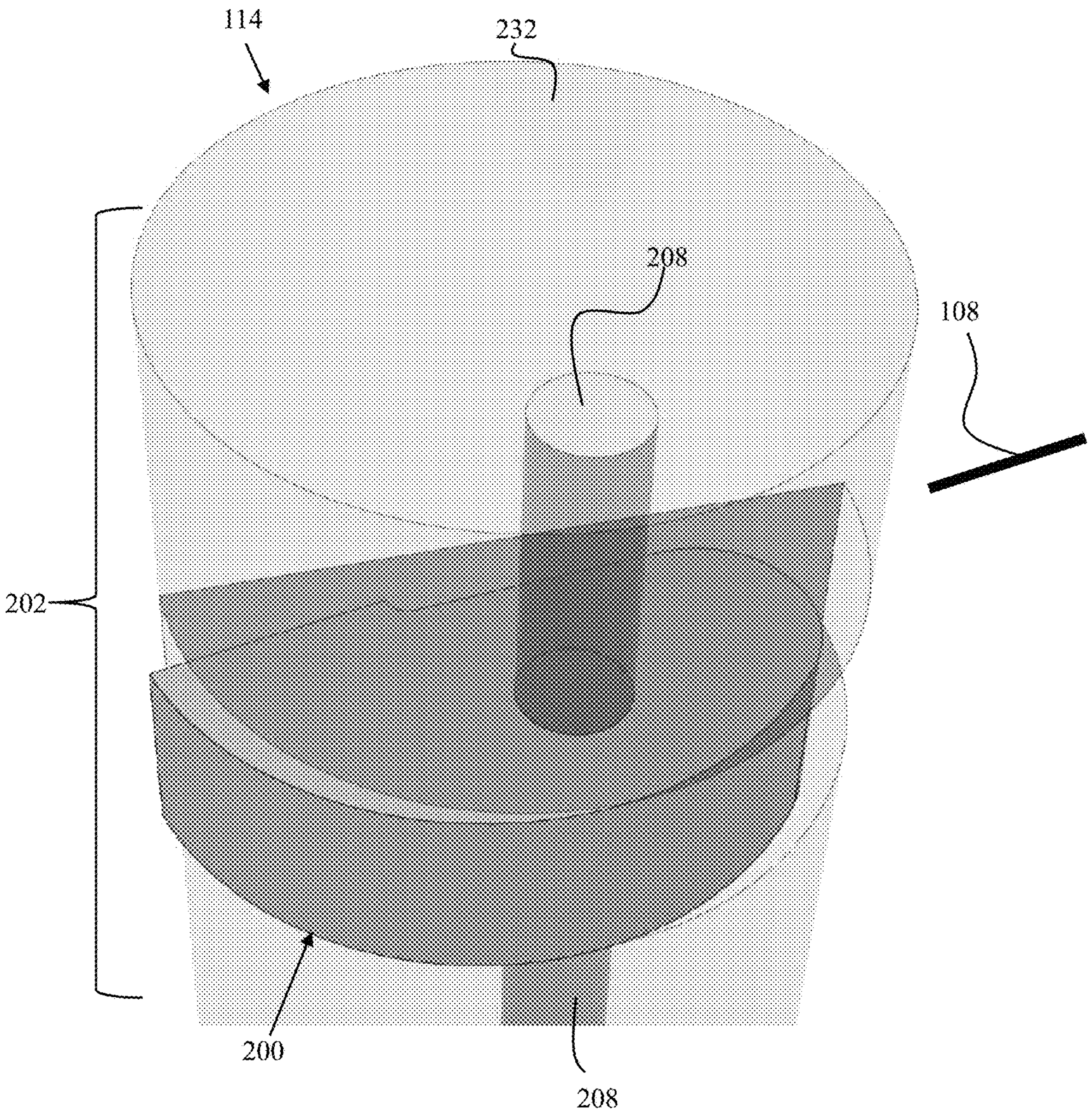

FIGS. 3A to 3D are non-limiting, exemplary illustrations of the exploded views of the locking string tuner illustrated in FIGS. 1A to 2D in accordance with one or more embodiments of the present invention, with FIG. 3D illustrating an enlarged view of the string post and the engagement member of the locking string tuner illustrated in FIGS. 1A to 3C, and FIG. 3E illustrating the positional and cooperative working relationship of engagement member 200 and string post 114.

The exploded views shown in FIGS. 3A to 3D illustrate disassembled, separated components that show the cooperative working relationship, orientation, positioning, and exemplary manner of assembly of the various components of locking string tuner 104 in accordance with one or more embodiments of the present invention, with string post 114 and engagement member 200 further detailed below.

Locking string tuner 104 is comprised of string post 114 and engagement member 200 that is moveably associated with string post 114 by pivot pin 208 that operates as a fulcrum member. Engagement member 200 is moveably housed within recessed-slot 214 by pivot pin 208 to allow engagement member 200 to operate as a freely moveable lever with an in-plane rotational motion 234 (FIGS. 2C and 3A). Engagement member 200 has minimal out of plane motion due to tight tolerances of the size of engagement member 200 in relation to the size of recessed-slot 214.

FIGS. 4A to 4E are non-limiting, exemplary illustrations of the various views of a string post of the locking string tuner illustrated in FIGS. 1A to 3E in accordance with one or more embodiments of the present invention.

As illustrated in FIGS. 1A to 4E, in the non-limiting, exemplary illustrations shown, string post 114 may have a generally cylindrical configuration and may be comprised of a single piece unit. String post 114 may include a string engagement section 202 that accommodates engagement member 200, and a gearing engagement section 204 that is associated with gearing mechanism 206 of locking string tuner 104.

Gearing engagement section 204 of string post 114 is adapted to be compatible with well-known conventional gearing mechanism 206. In this non-limiting, exemplary instance, gearing engagement section 204 includes a distal end section 266 with flat, outer mating surfaces 268, which are compatible with flat, inner mating surfaces 270 of worm gear (i.e., pinion) 128 to facilitate turning string post 114 as worm gear 128 is rotated when worm 126 is rotated by knob 106. It should be noted that gearing engagement section 204 may easily be modified to engage and mate with other types of existing conventional gearing mechanisms 206. Gearing engagement section 204 further includes an inner diameter threading 272 to receive string post retaining member 124.

As further illustrated in FIGS. 1A to 4E, string engagement section 202 of string post 114 may comprise of a recessed-slot 214 for moveably housing engagement member 200 by a pivot pin 208.

Recessed-slot 214 may comprise of a bottom surface 226, an engagement surface 228, and a top surface 230. Recessed-slot 214 is of sufficient size to accommodate both the engagement member 200 and different sized strings 108 while maintaining the structural integrity of string engagement section 202 of string post 114 and engagement member 200.

Figure 4A:
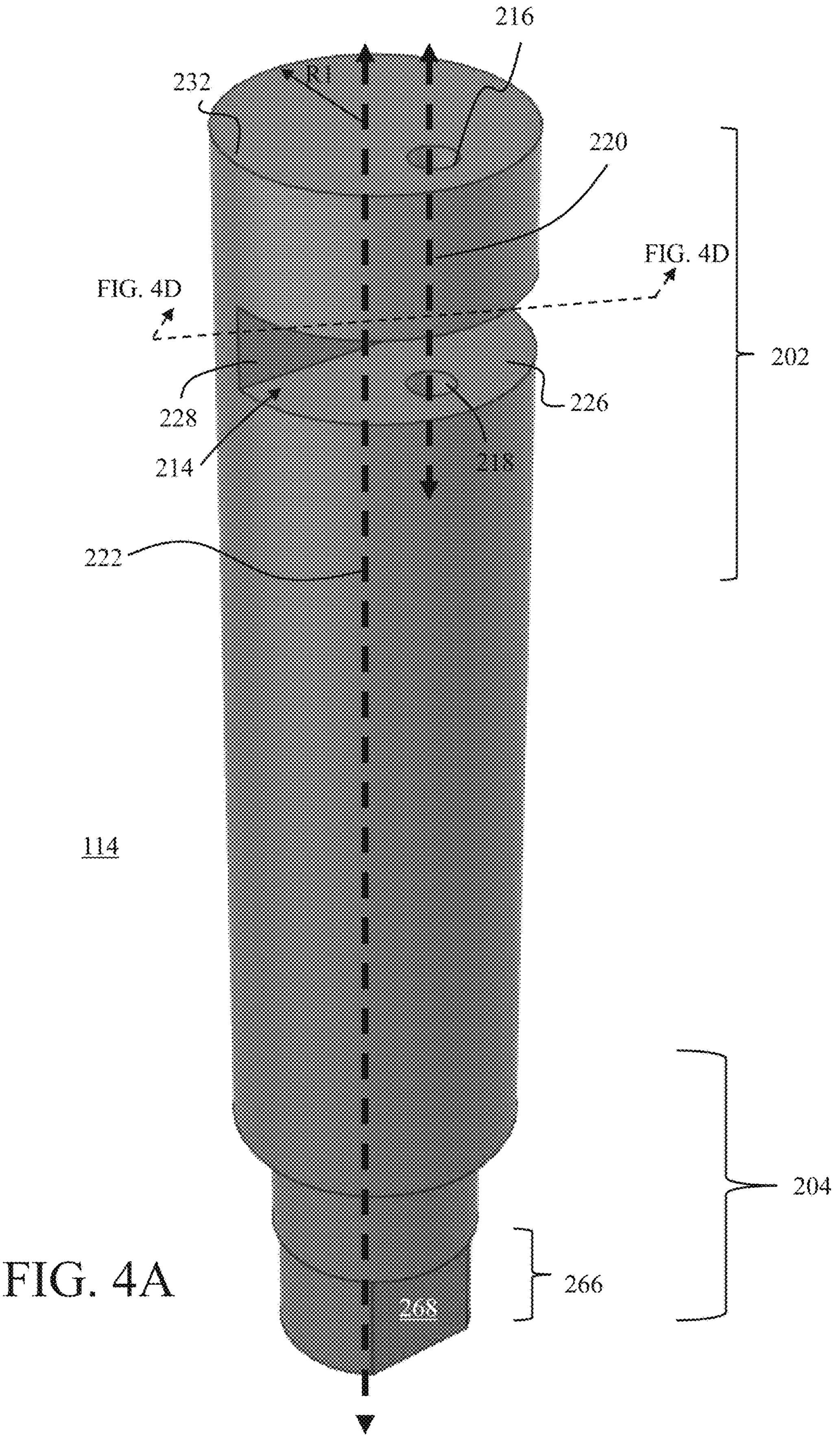
FIGS. 4A to 4E are non-limiting, exemplary illustrations of the various views of a string post of the locking string tuner illustrated in FIGS. 1A to 3E in accordance with one or more embodiments of the present invention.
Figure 4B:
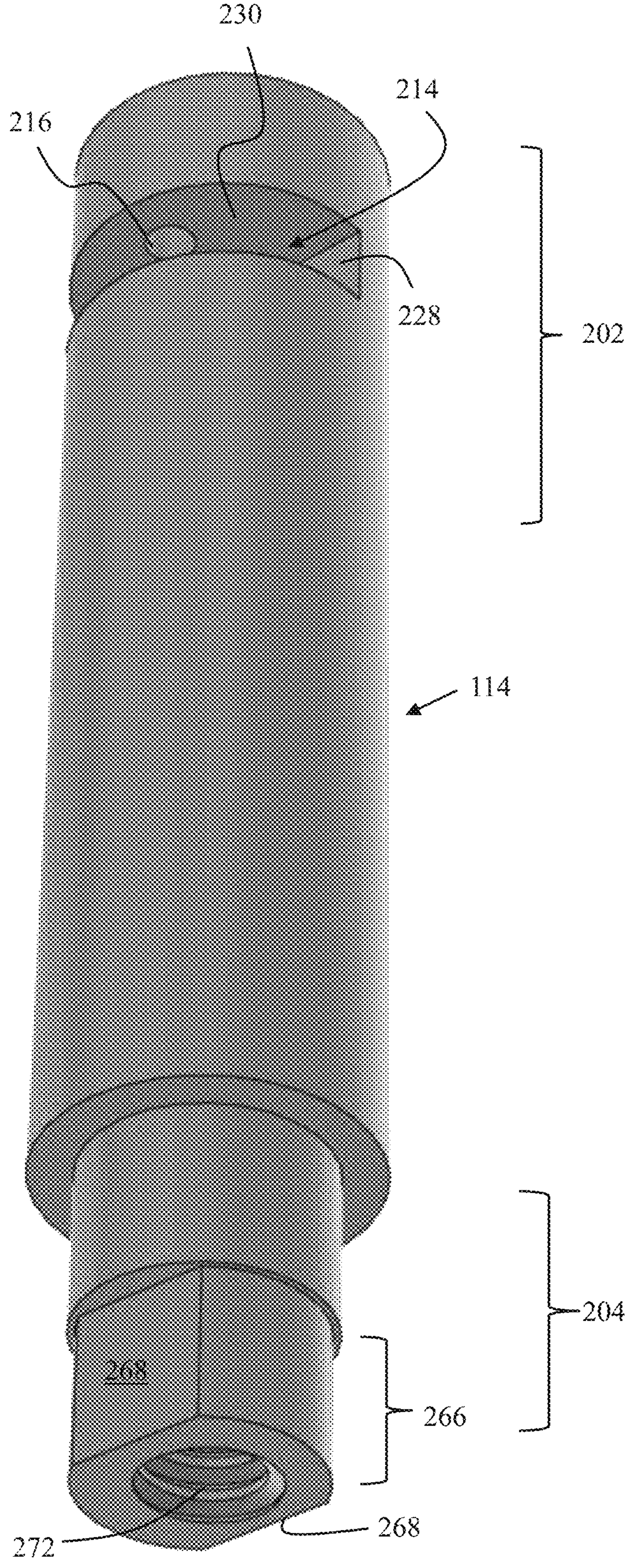
Figure 4C:
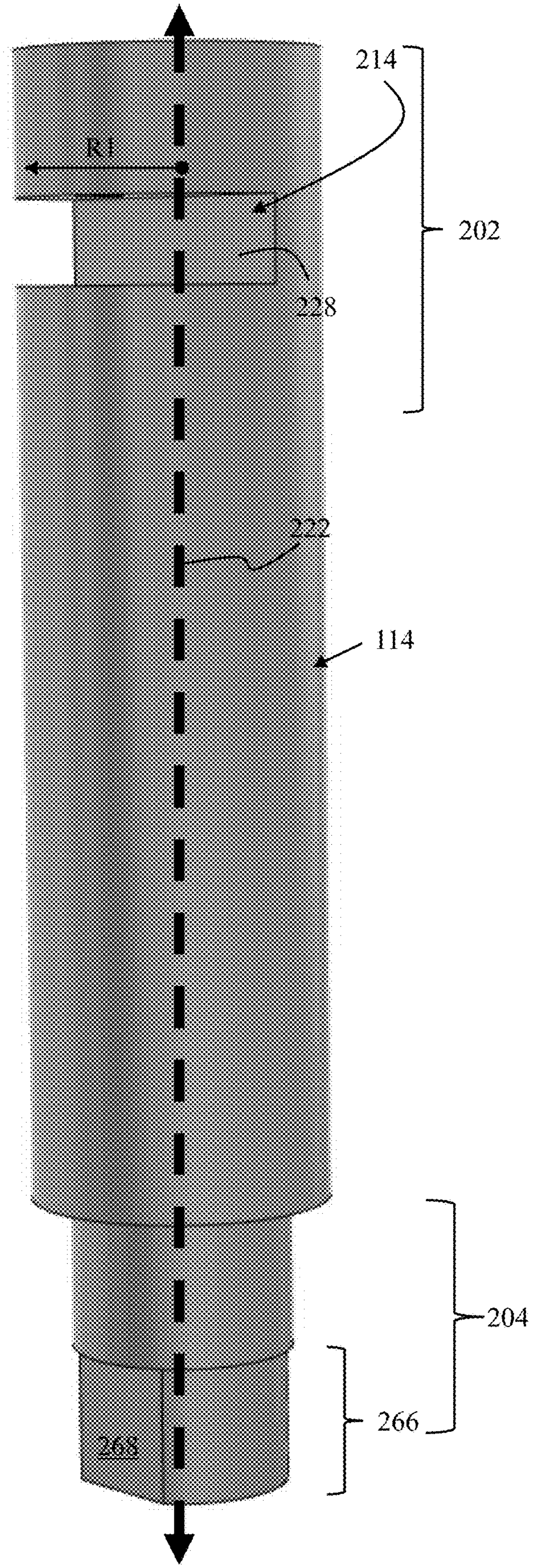
Figure 4D:
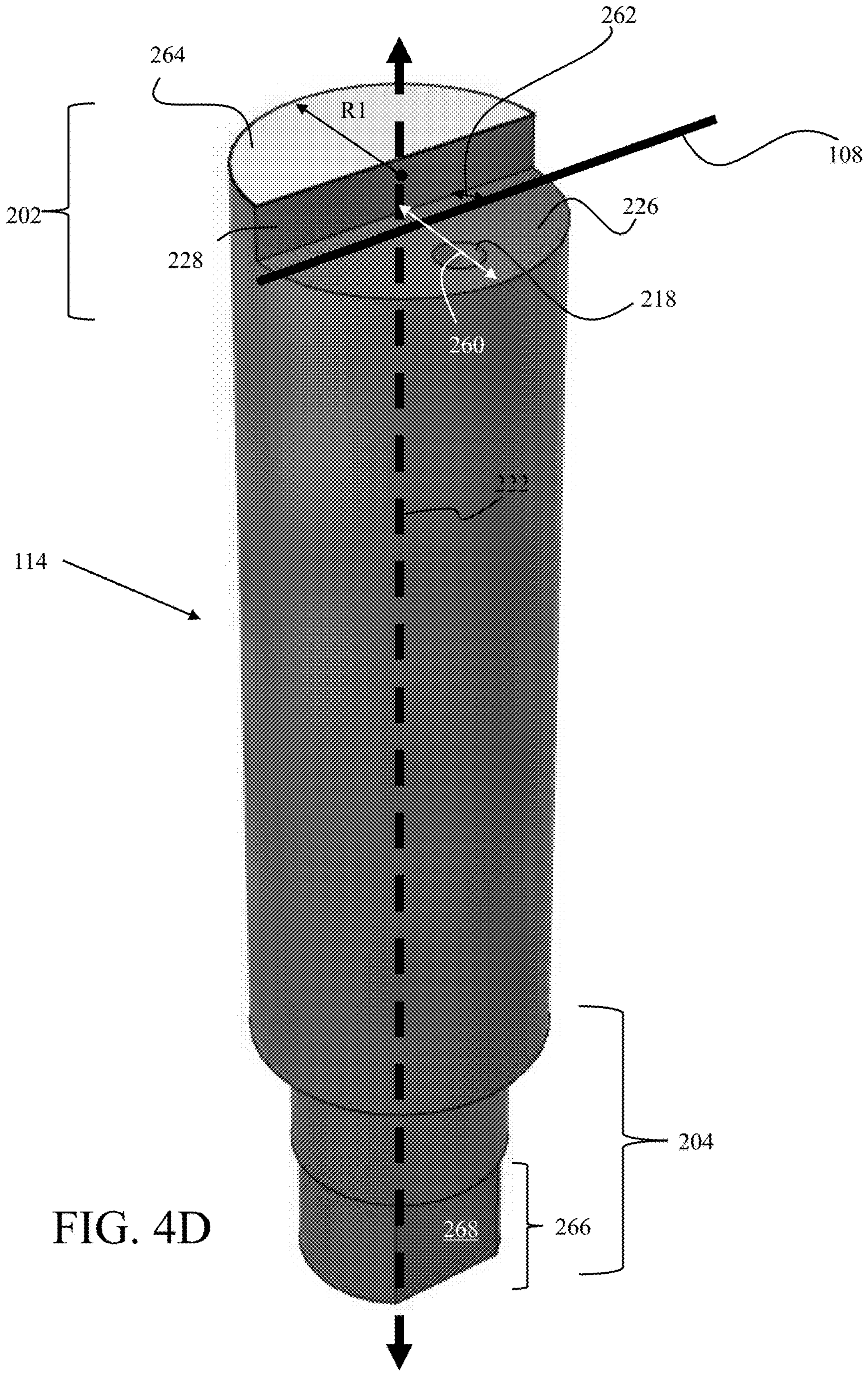
Figure 4E:
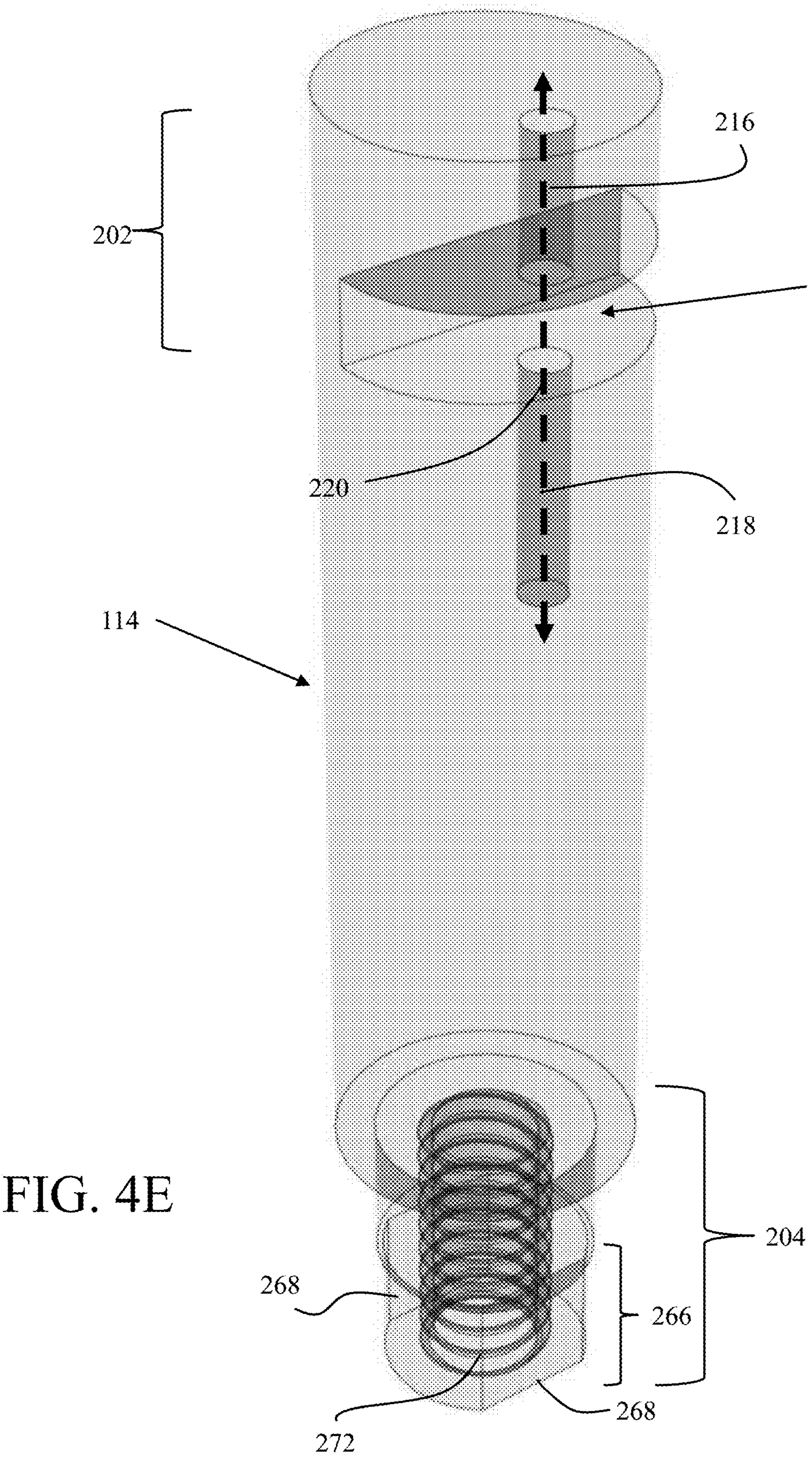
Figure 5A:
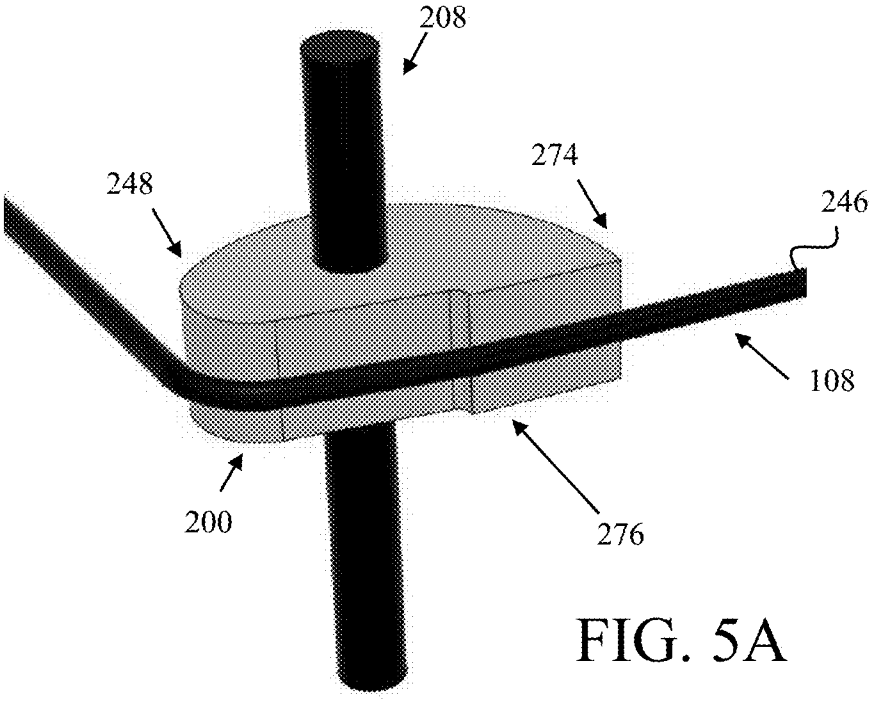
FIGS. 5A to 5F are non-limiting, exemplary illustrations of the various views of an engagement member of the locking string tuner illustrated in FIGS. 1A to 4E in accordance with one or more embodiments of the present invention.
Figure 5B:
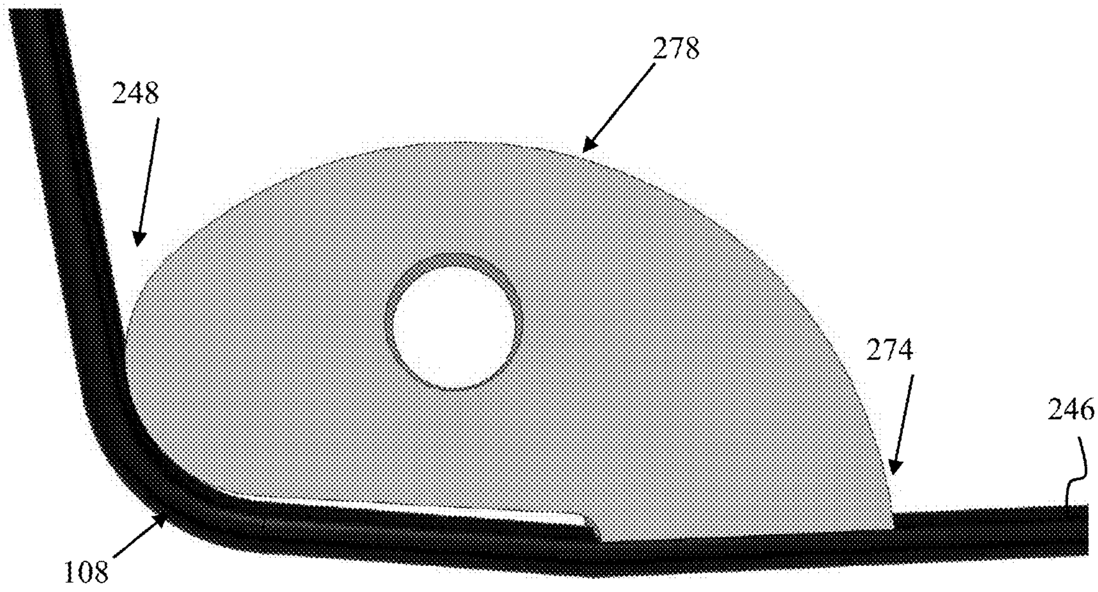
Figure 5C:
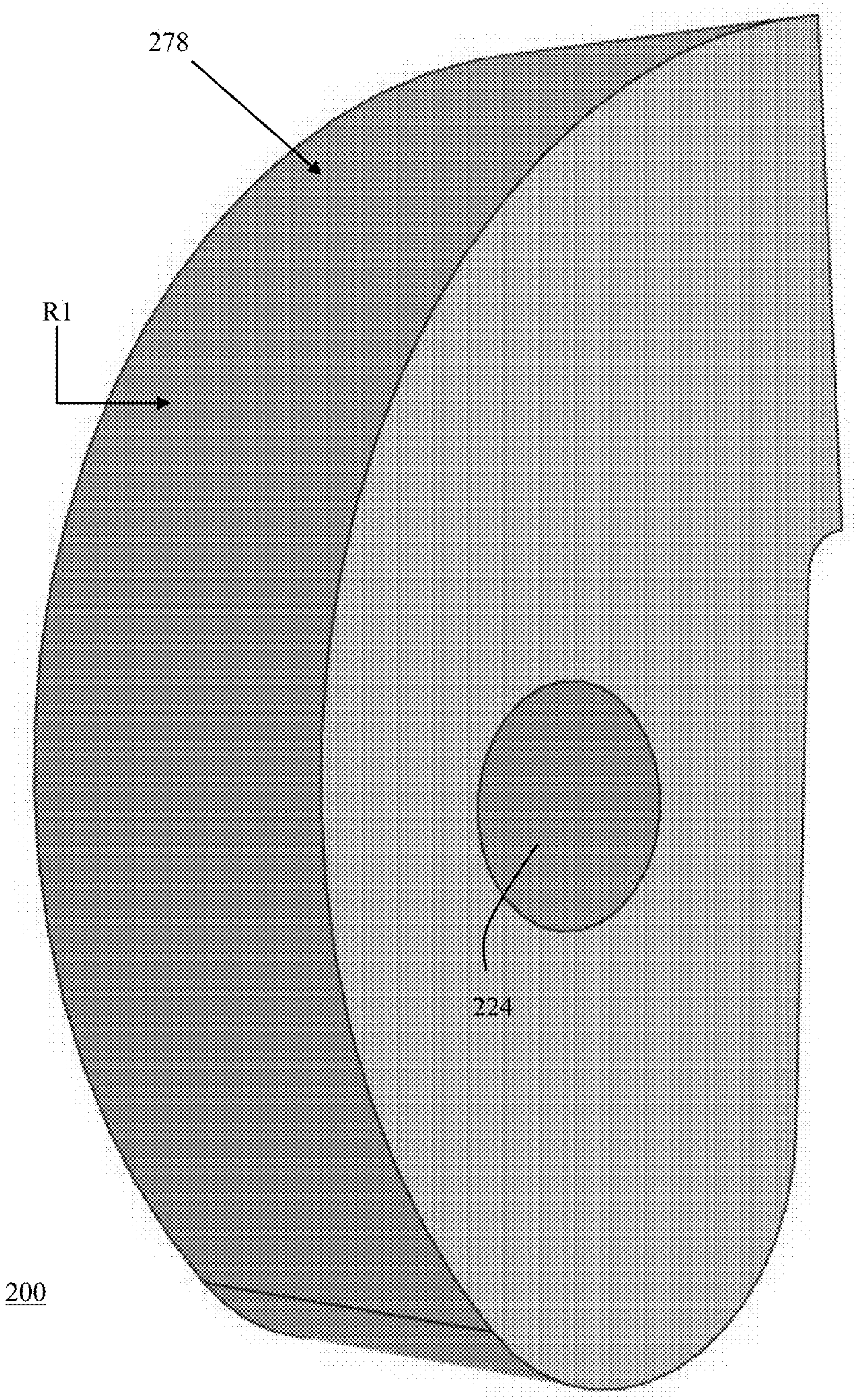
Figure 5D:
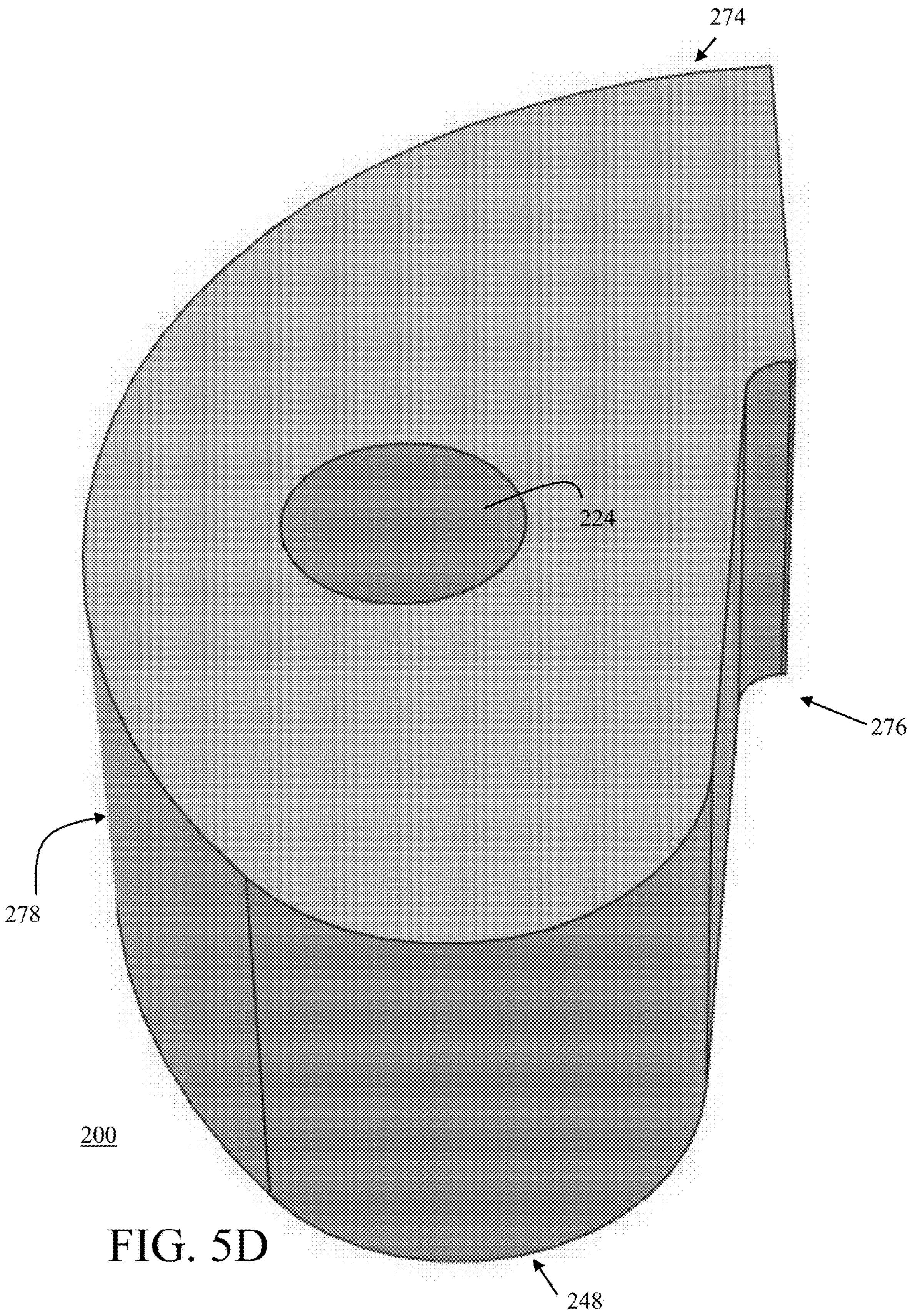
Figure 5E:
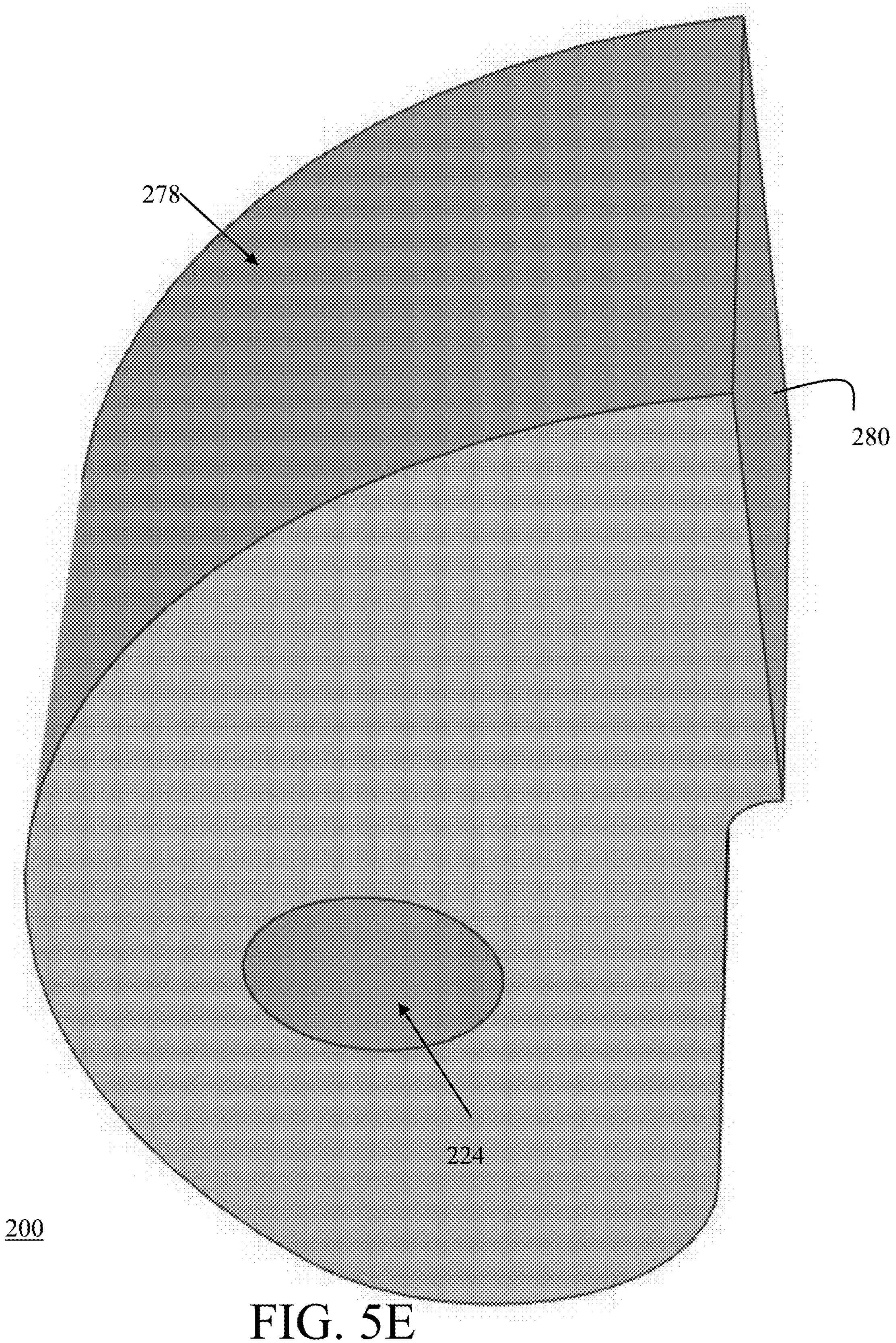
Figure 5F:
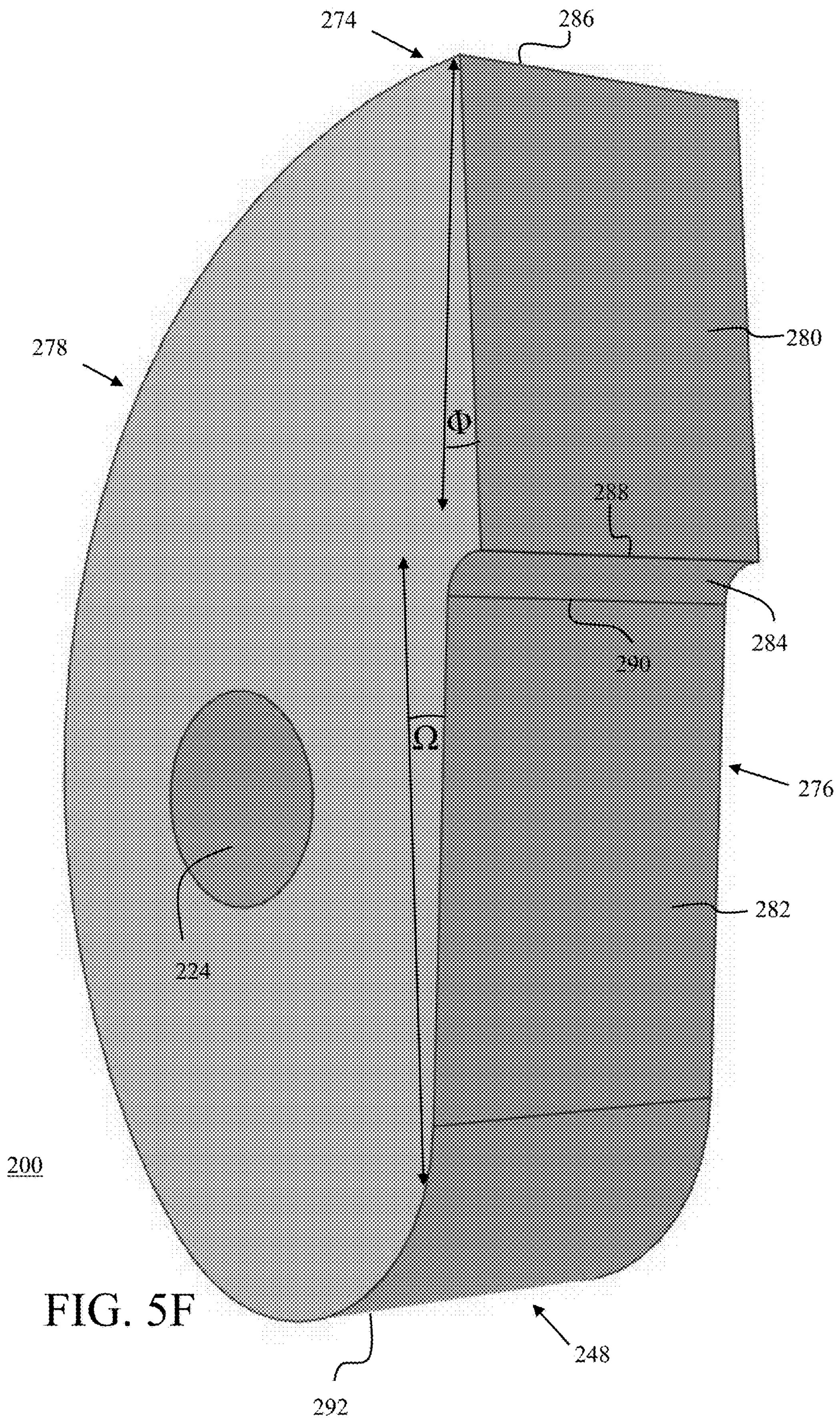

As best illustrated in FIG. 4D, in this non-limiting, exemplary instance, distance 260 by which engagement surface 228 is carved out and set back is greater than radius R1 (measured from central longitudinal axis 222) of the string post by an offset 262. This arrangement makes the area of bottom surface 226 larger than the remaining surface area 264 to accommodate both engagement member 200 and different sized strings 108. The relationship of surface areas 264 and 226 may be varied depending on many factors, including the sizes of string 108 and or engagement member 200 used.

A top distal end 232 of string engagement section 202 of string post 114 includes an eccentrically positioned upper through-hole 216 that is oriented parallel to central longitudinal axis 222 of string post 114, with the upper through-hole 216 leading into recessed-slot 214 via top surface 230 of recessed-slot 214.

Bottom surface 226 of recessed-slot 214 of string engagement section 202 of string post 114 includes an eccentrically positioned, lower blind-hole 218 that is oriented parallel to central longitudinal axis 222 of string post 114. Lower blind-hole 218 is aligned with the upper through-hole 216. That is, upper through-hole 216 and lower blind-hole 218 have aligned central longitudinal axes 220.

As further illustrated in FIGS. 1A to 4E, pivot pin 208 may be inserted through upper through-hole 216 (FIG. 3D), an eccentrically positioned through-hole 224 of engagement member 200, and into lower blind-hole 218 to moveably secure engagement member 200 within recessed-slot 214. In this non-limiting, exemplary instance, engagement surface 228 of recessed-slot 214 of string engagement section 202 of string post 114 is flat.

FIGS. 5A to 5F are non-limiting, exemplary illustrations of the various views of an engagement member of the locking string tuner illustrated in FIGS. 1A to 4E in accordance with one or more embodiments of the present invention.

As illustrated in FIGS. 1A to 5F, engagement member 200 may comprise of an ingress end 248 from where string 108 is loaded (e.g., inserted) and an egress end 274 from where a free end 246 of string 108 extends out of locking string tuner 104.

Engagement member 200 further includes an engagement side 276, and a reeling side 278. Reeling side 278 may generally be of similar radius R1 as that of the radius R1 of recessed-slot 214 so that reeling side 278 of engagement member 200 is generally flush with outer circumference of string post 114.

Engagement side 276 of engagement member 200 may comprise of a grip (or clamp) surface 280 and a relief surface 282. In general, grip surface 280 of engagement side 276 is offset by a rise 284, forming relief surface 282 of engagement side 200.

For clearance to permit easy loading (or insertion) of different sized strings 108, grip surface 280 is sloped at an angle Φ, slanted, and tapered towards a transverse egress edge 286 of grip surface 280, with a transverse rise edge 288 of rise 284 at grip surface 280 at a higher level than transverse egress edge 286.

Relief surface 282 is sloped at an angle Ω, slanted, and tapered towards ingress end 248 of engagement member 200, with a transverse run-edge 290 of rise 284 of relief surface 282 at a higher level than ingress end 248.

Transverse egress edge 286 is at a higher level than ingress end 248 of engagement member 200, which facilitates use of different size strings 108 while allowing reeling side 278 of engagement member 200 to remain generally flush with string post 114 when assembled. It should be noted that alternatively, grip surface 280 and relief surface 282 may form parallel, but offset planes.

Ingress end 248 of engagement member 200 has reduced mass configuration, forming a fillet edge 292 that forms a part of relief surface 282 to facilitate insertion of string 108. Fillet edge 292 of ingress end 248 has a rounded convex curved configuration that facilitates winding of string 108 around reeling side 278 of engagement member 200 to thereby prevent severing of the wound string.

As further illustrated, engagement member 200 further includes an eccentrically positioned through-hole 224. The general location of through-hole 224 is dictated by many factors, non-limiting, non-exhaustive examples of which may include the desired size of gap 210 (FIG. 6C) between engagement side 276 and engagement surface 228 needed to easily mount or load different diameter sized strings 108. Other factors may include material from which engagement member 200 is made so that relocation of through-hole 224 would have no impact on the structural integrity of engagement member 200, the amount of effort or input force 250 (FIG. 6F) needed to tune or grip string 108, etc.

Figure 6A:
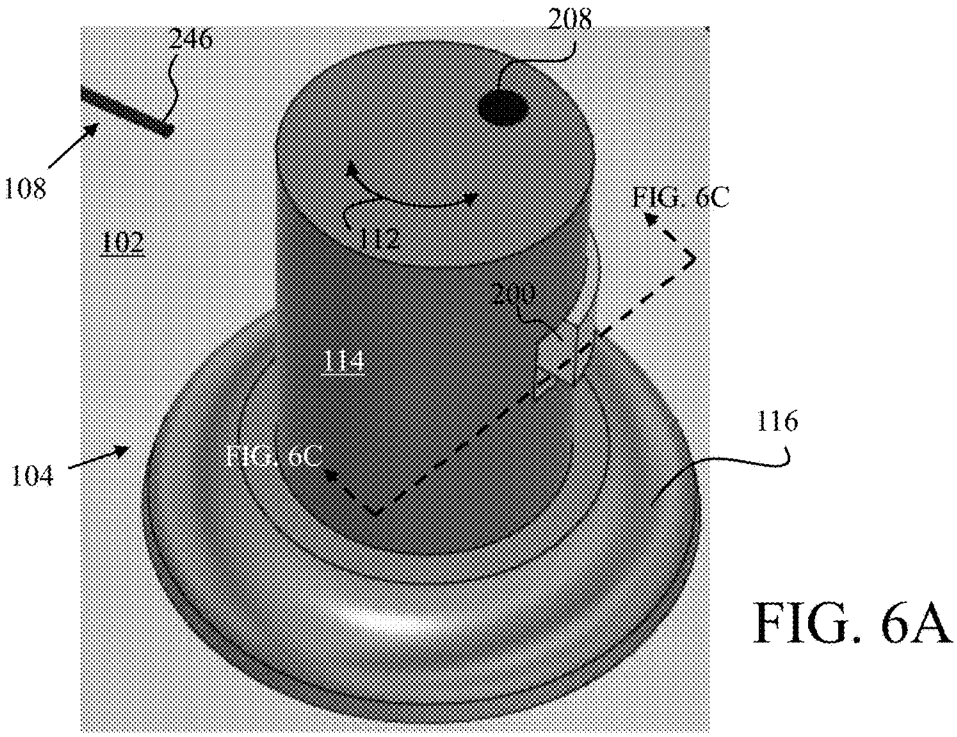
FIGS. 6A to 6T are non-limiting, exemplary illustrations progressively illustrating a non-limiting, exemplary method of loading and tuning a string using the locking string tuner illustrated in FIGS. 1A to 5F in accordance with one or more embodiments of the present invention.
Figure 6B:
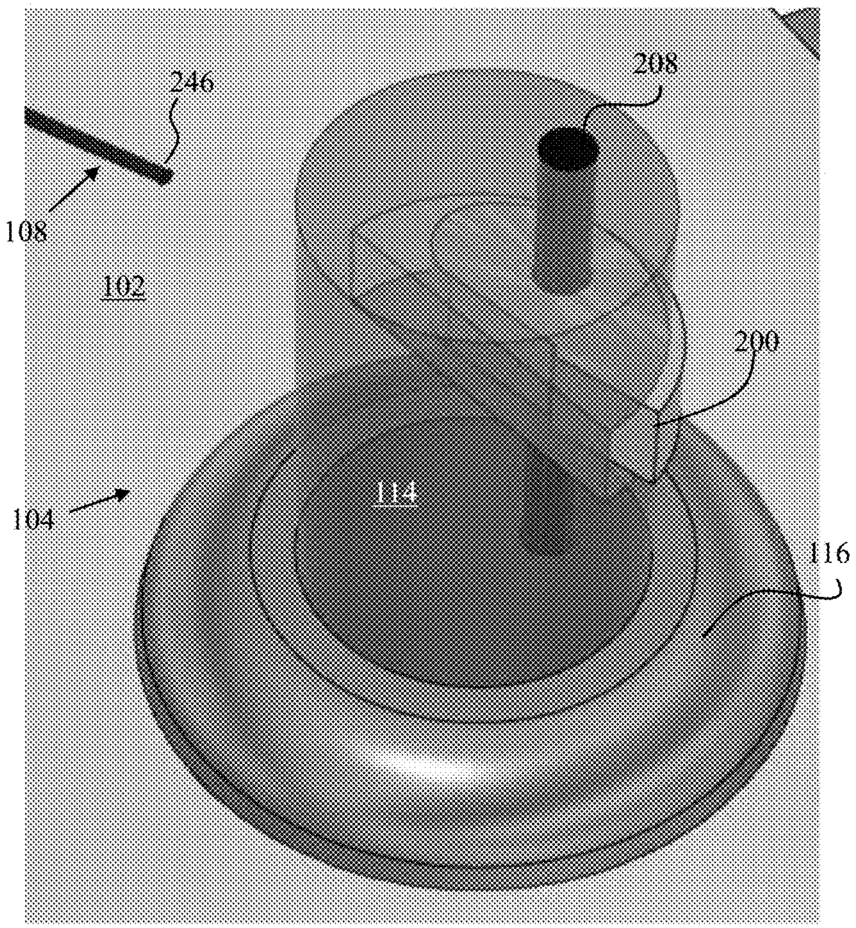
Figure 6C:
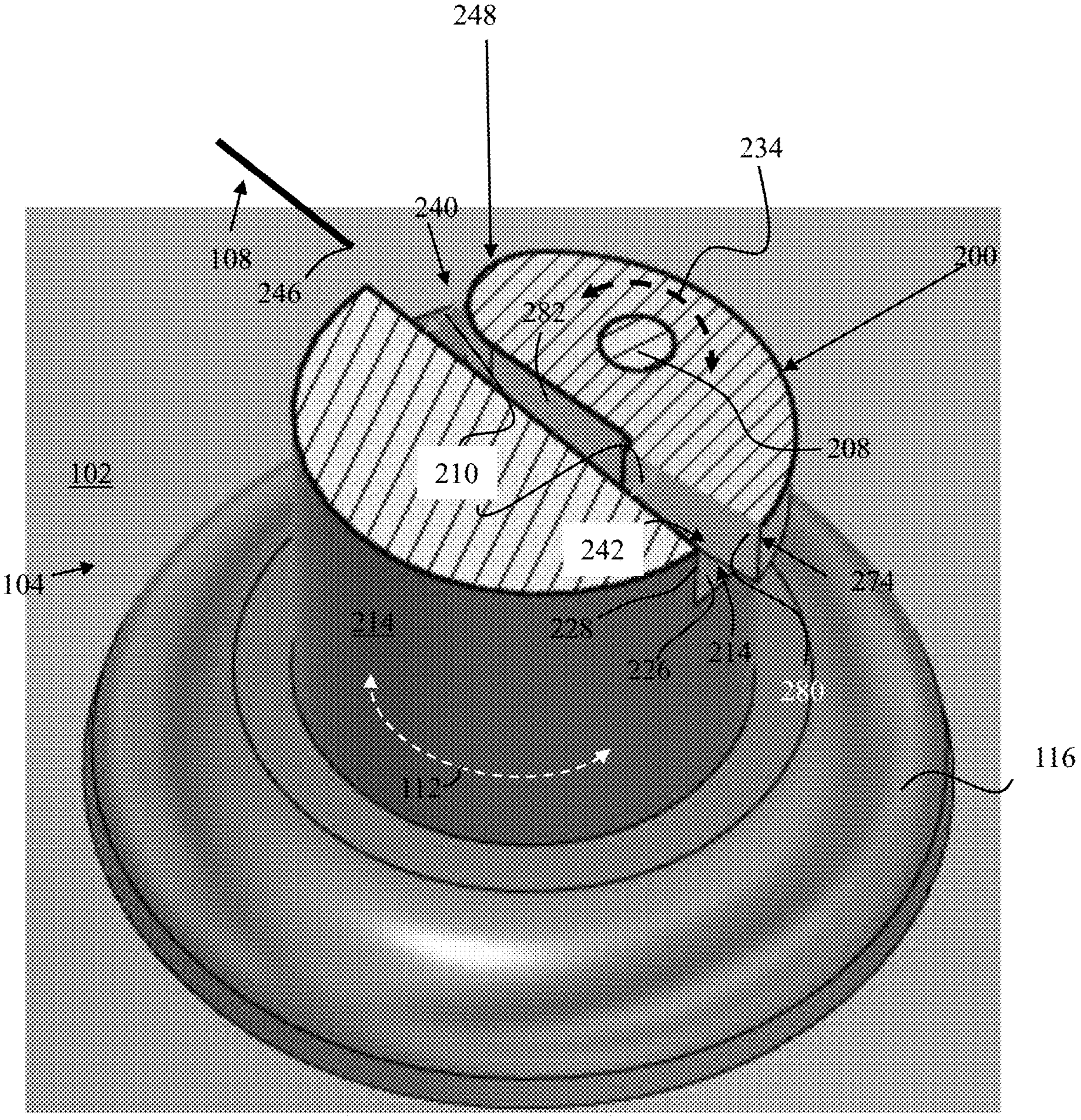
Figure 6D:
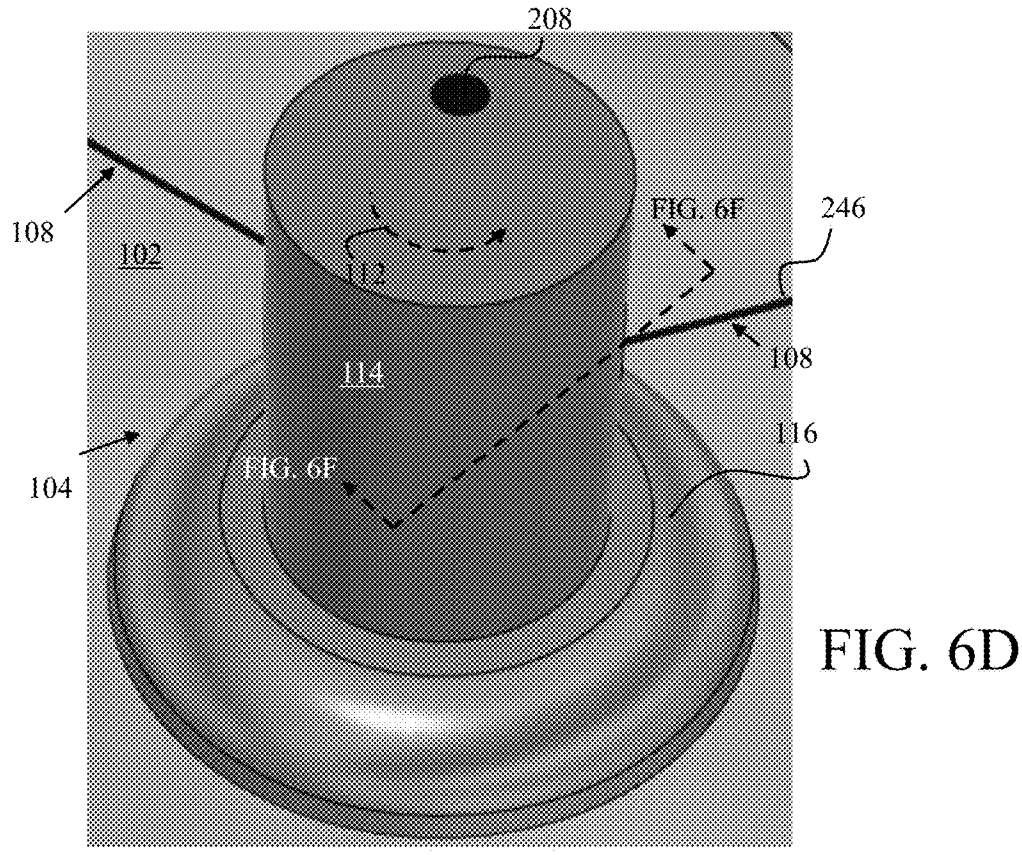
Figure 6E:
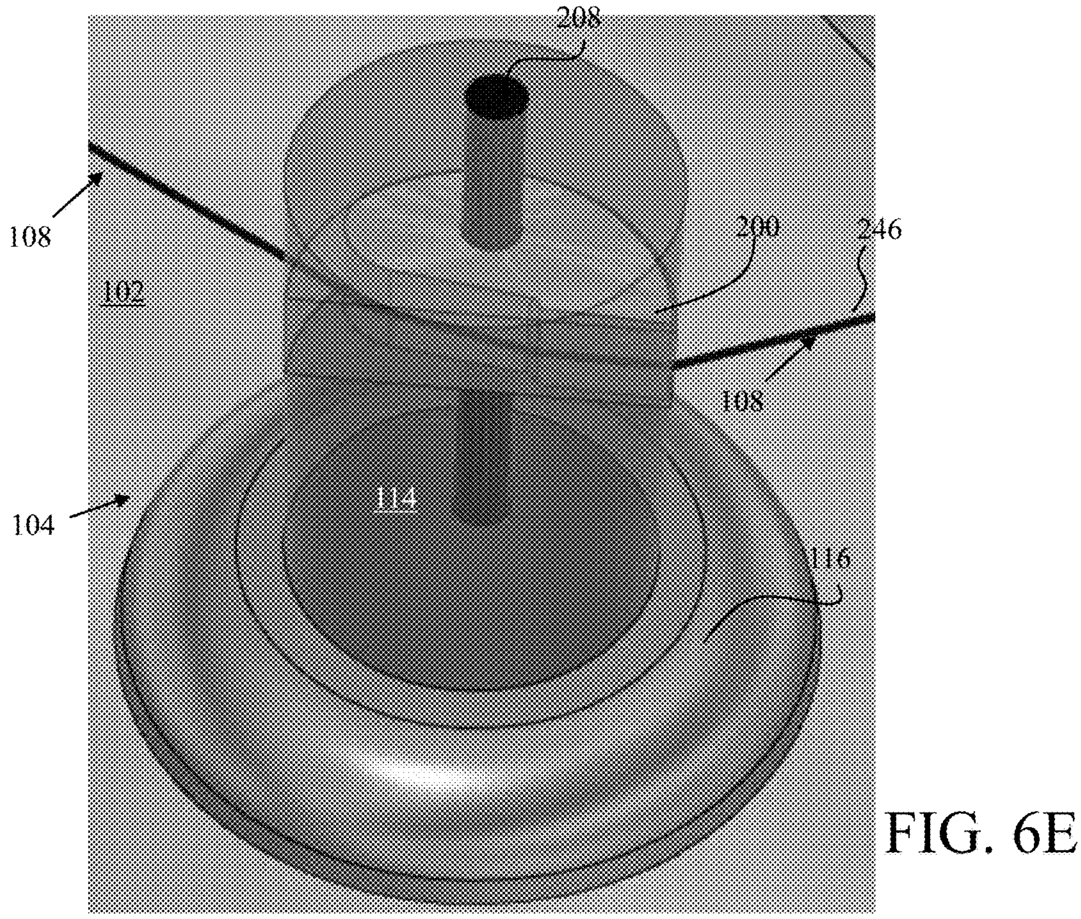
Figure 6F:
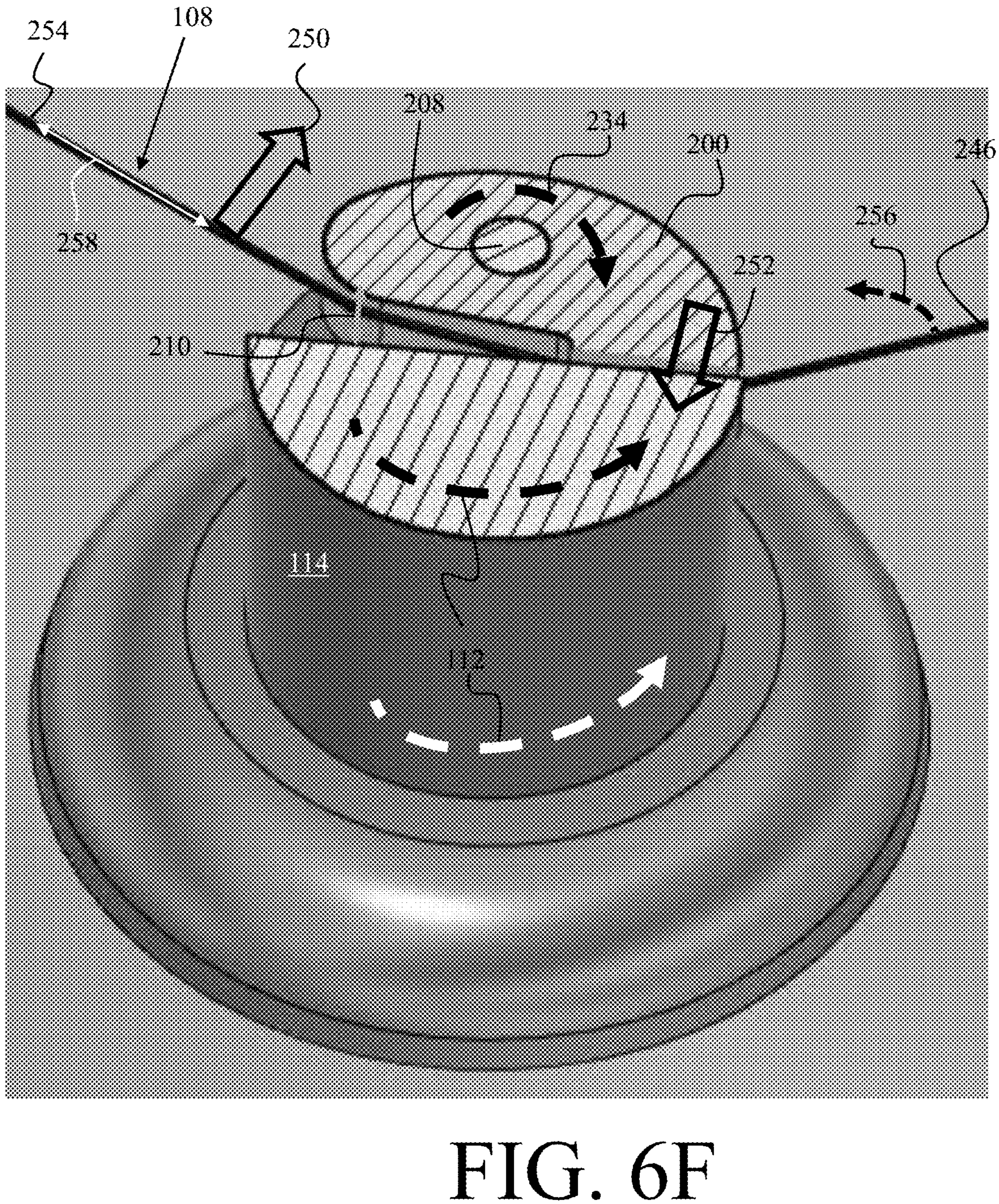
Figure 6G:
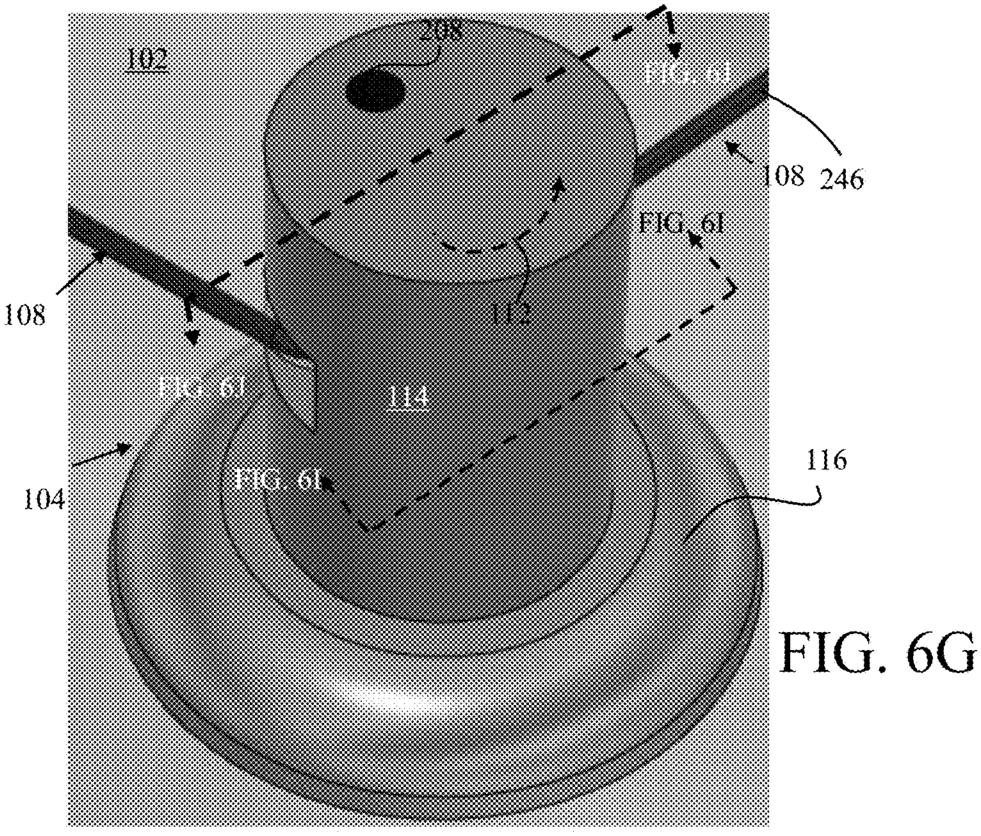
Figure 6H:
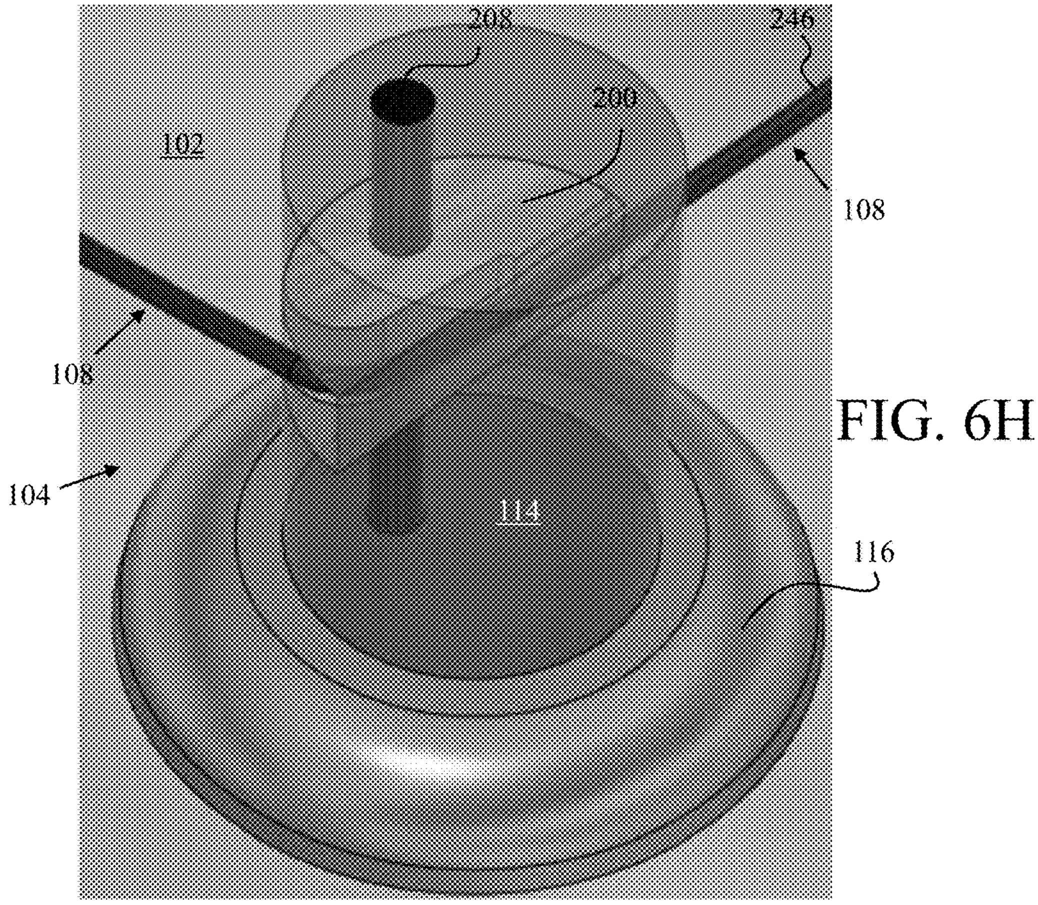
Figure 6I:
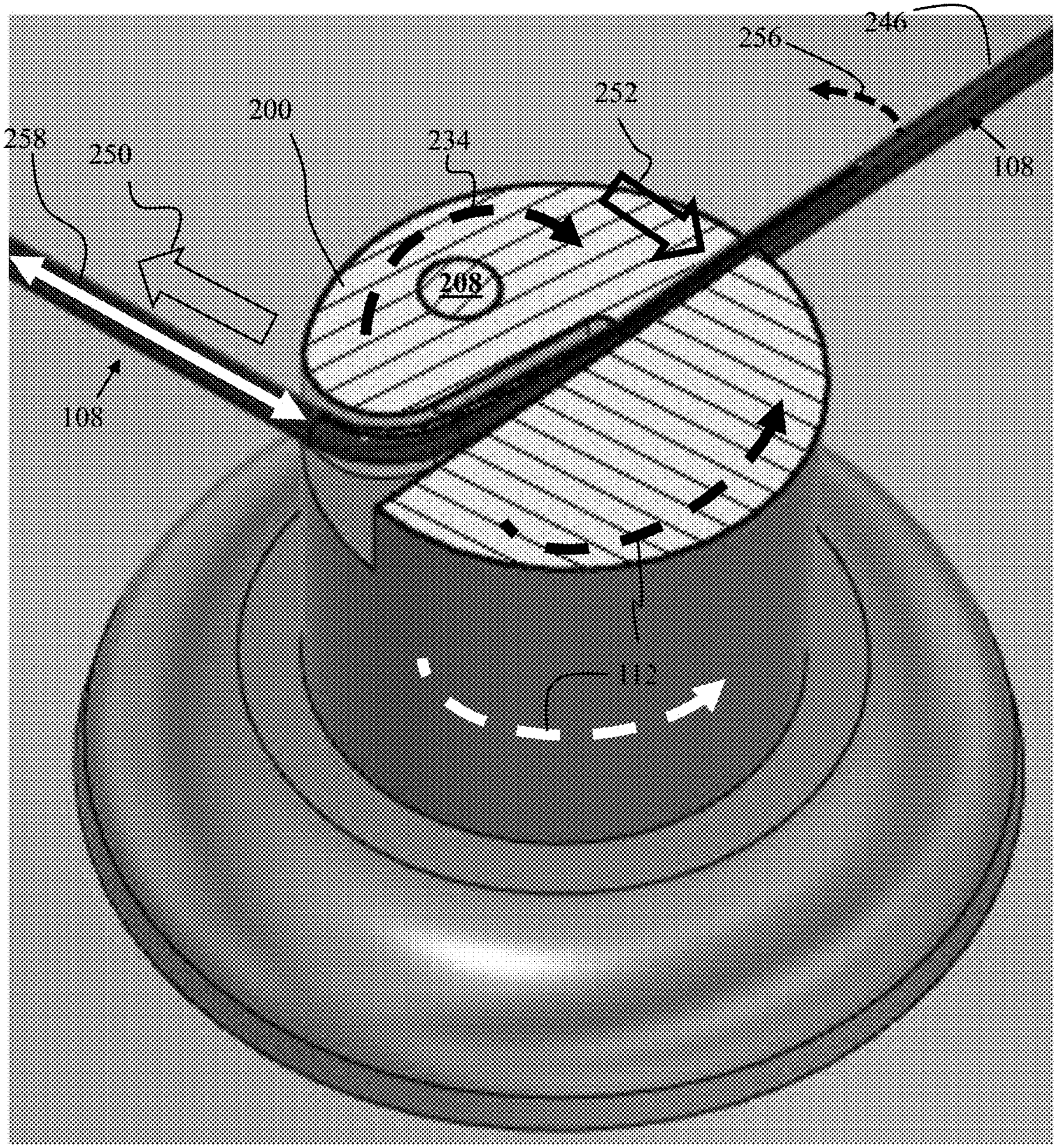
Figure 6J:
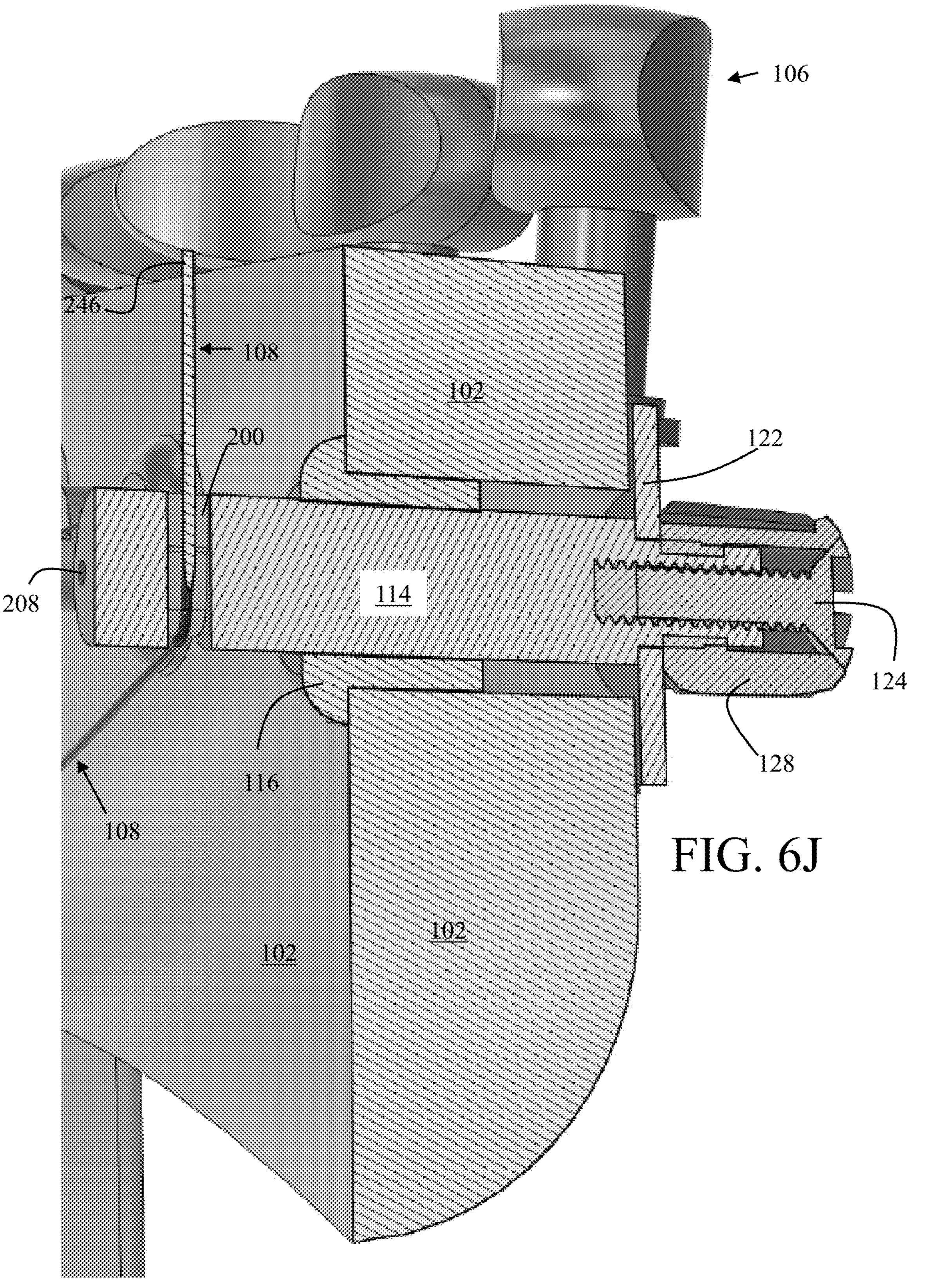
Figure 6K:
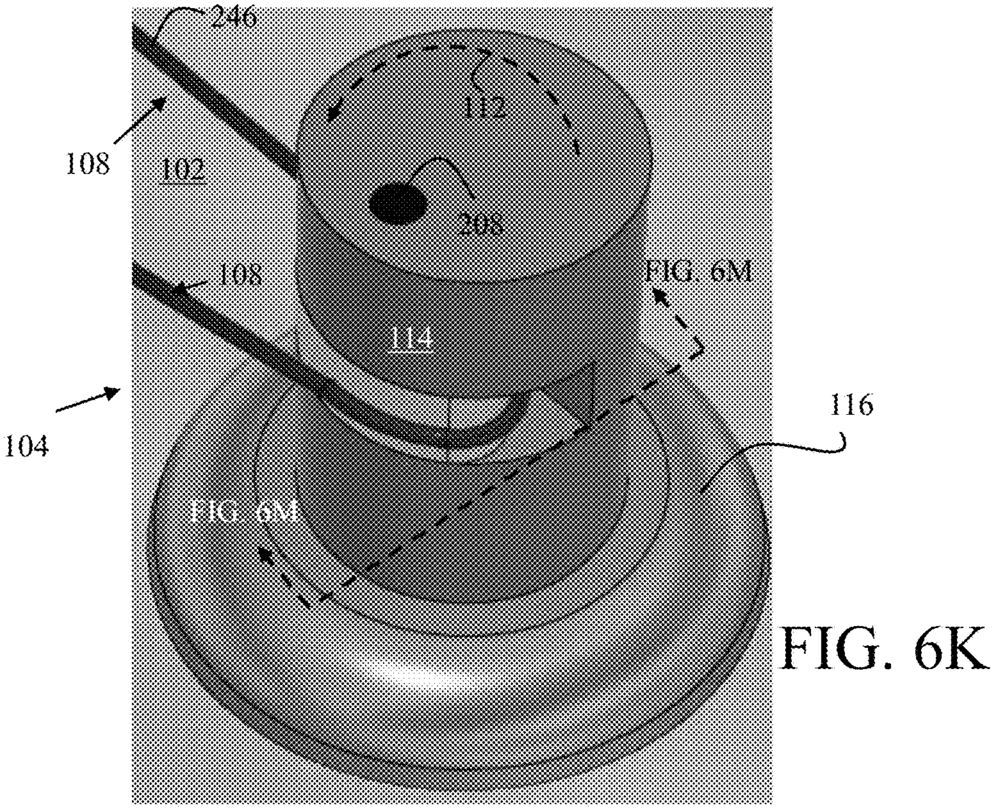
Figure 6L:
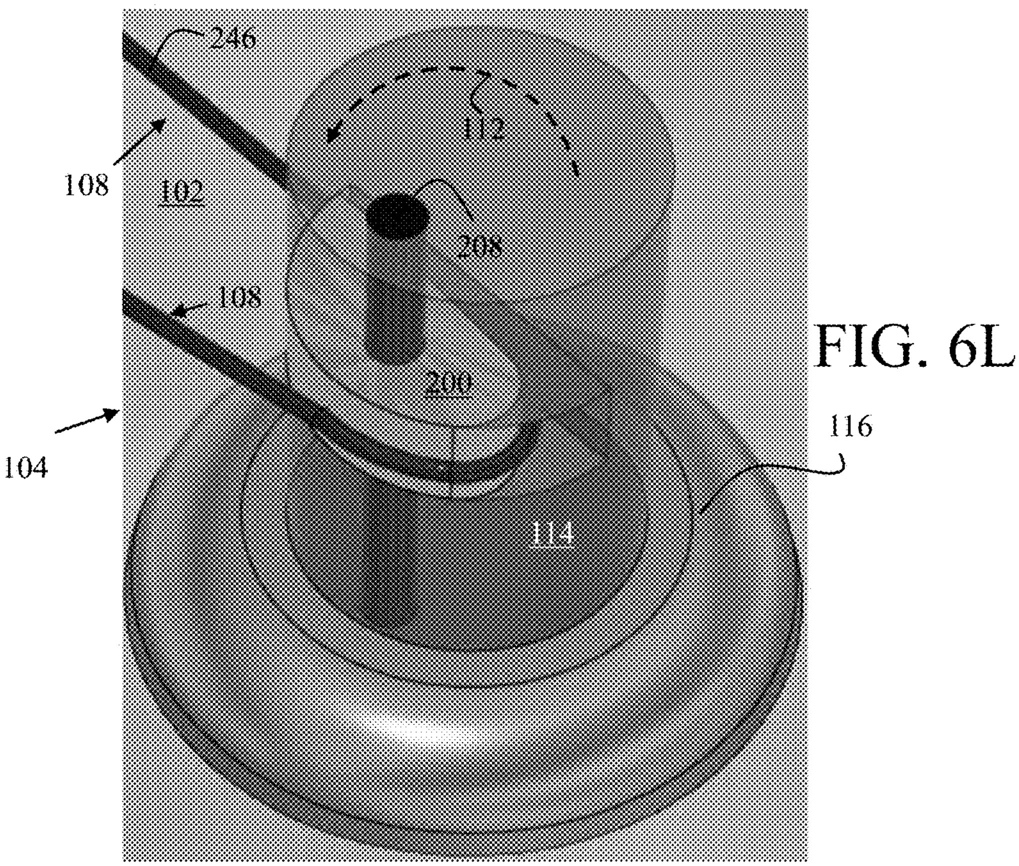
Figure 6M:
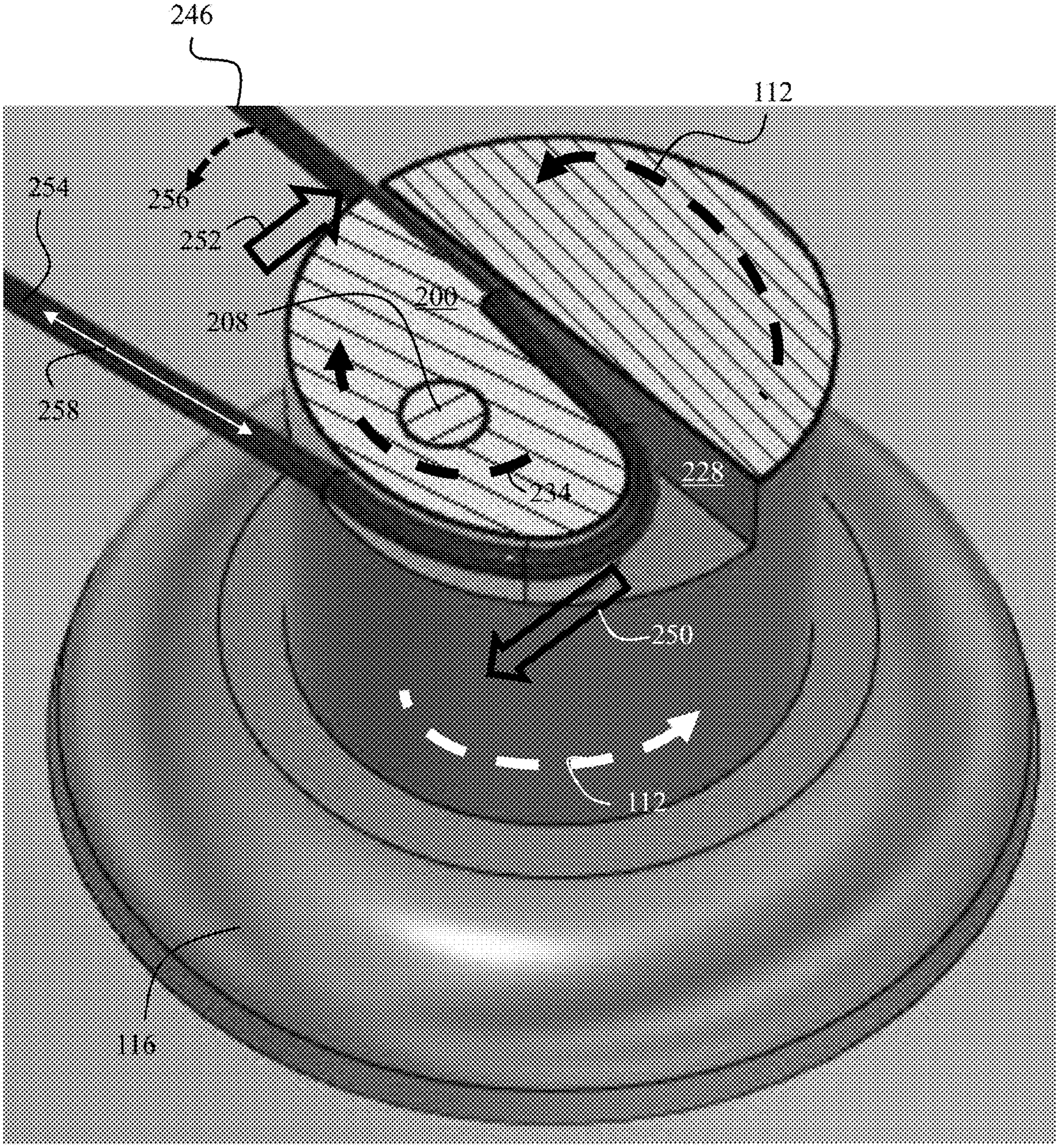
Figure 6N:
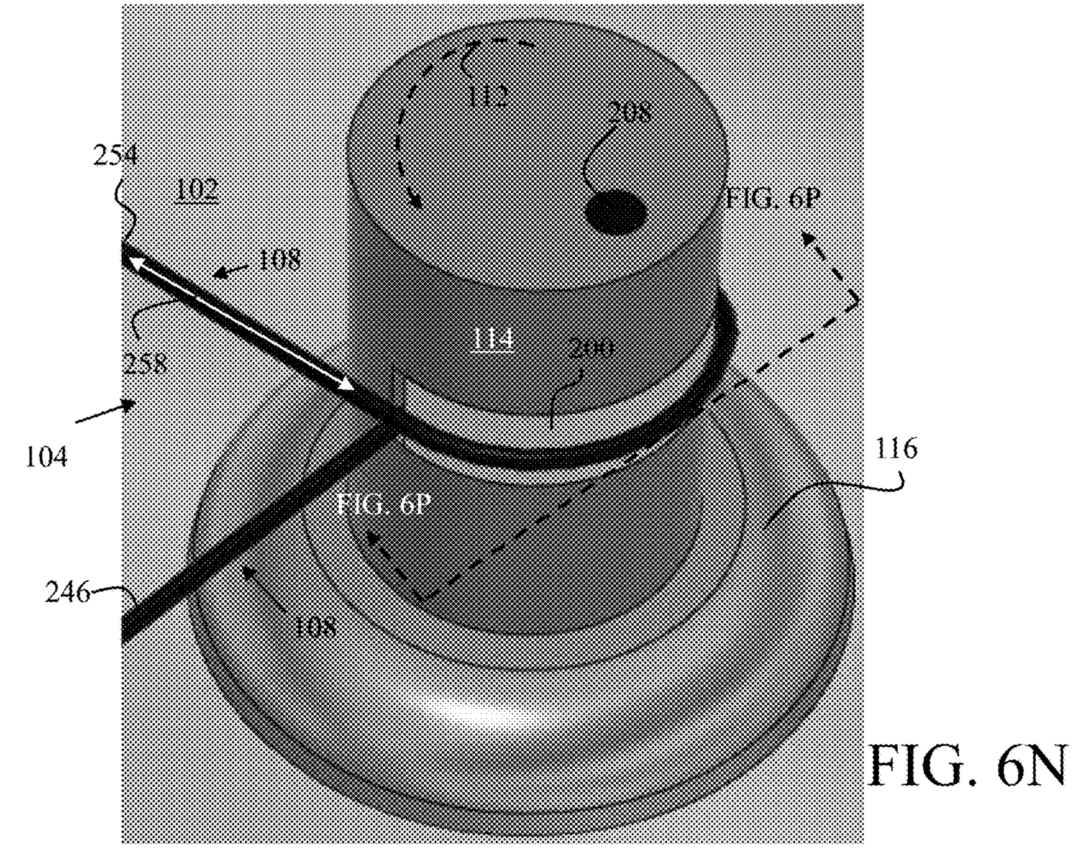
Figure 6O:
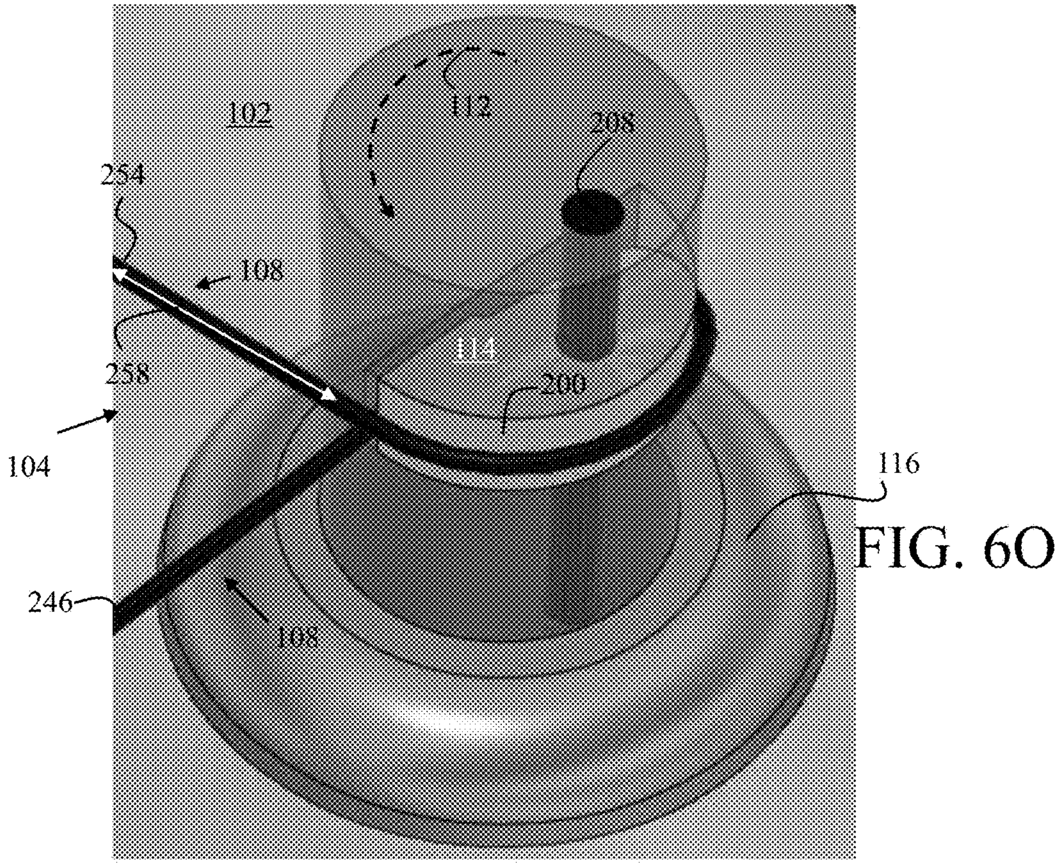
Figure 6P:
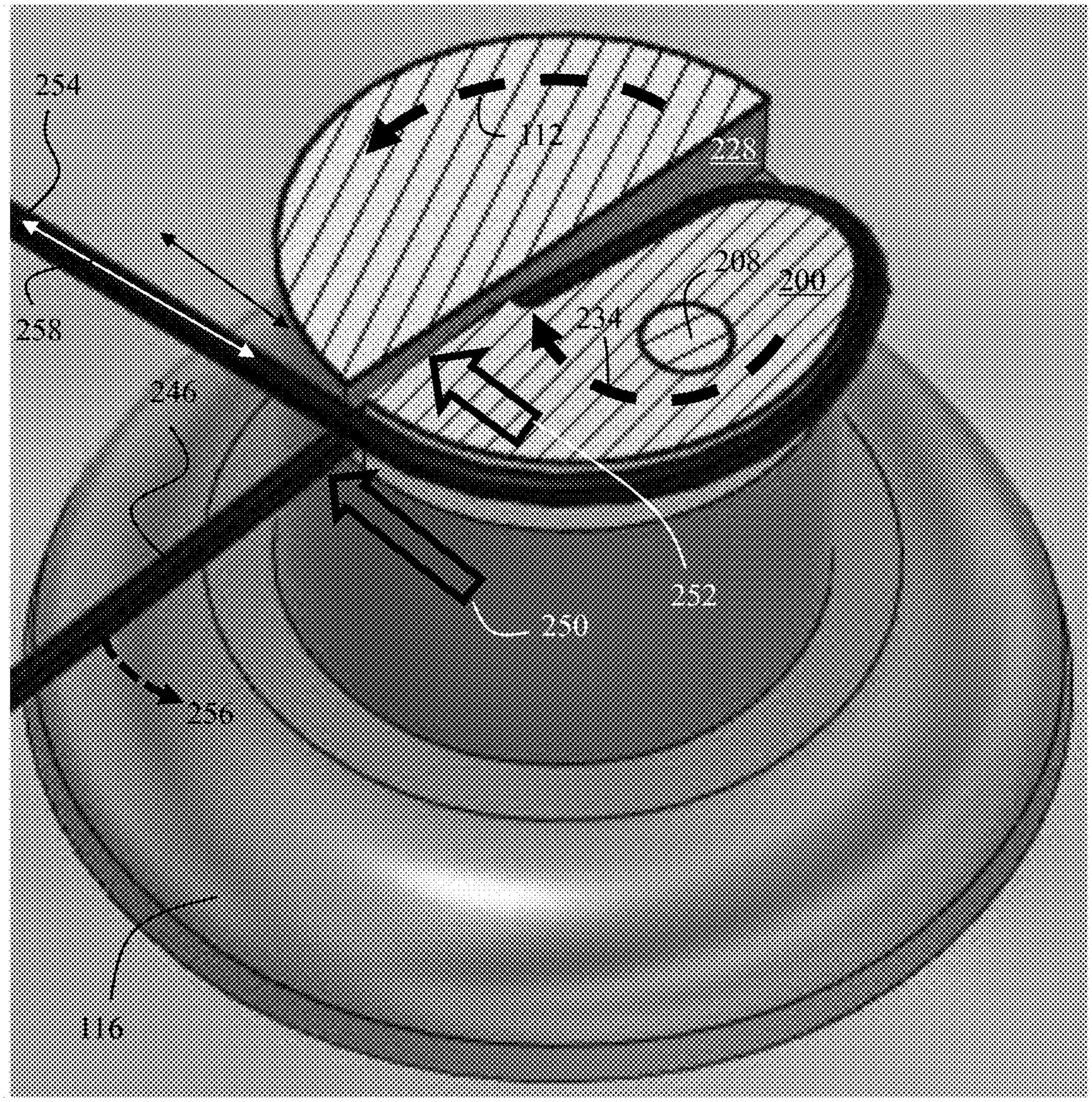
Figure 6Q:
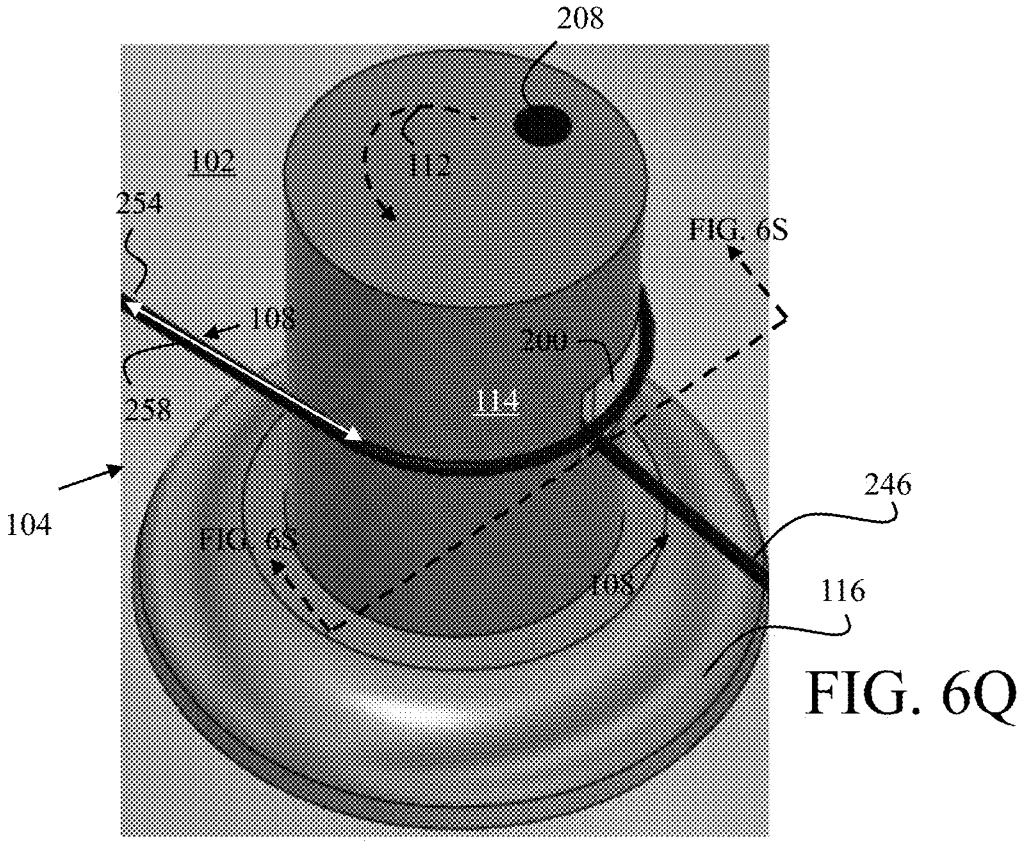
Figure 6R:
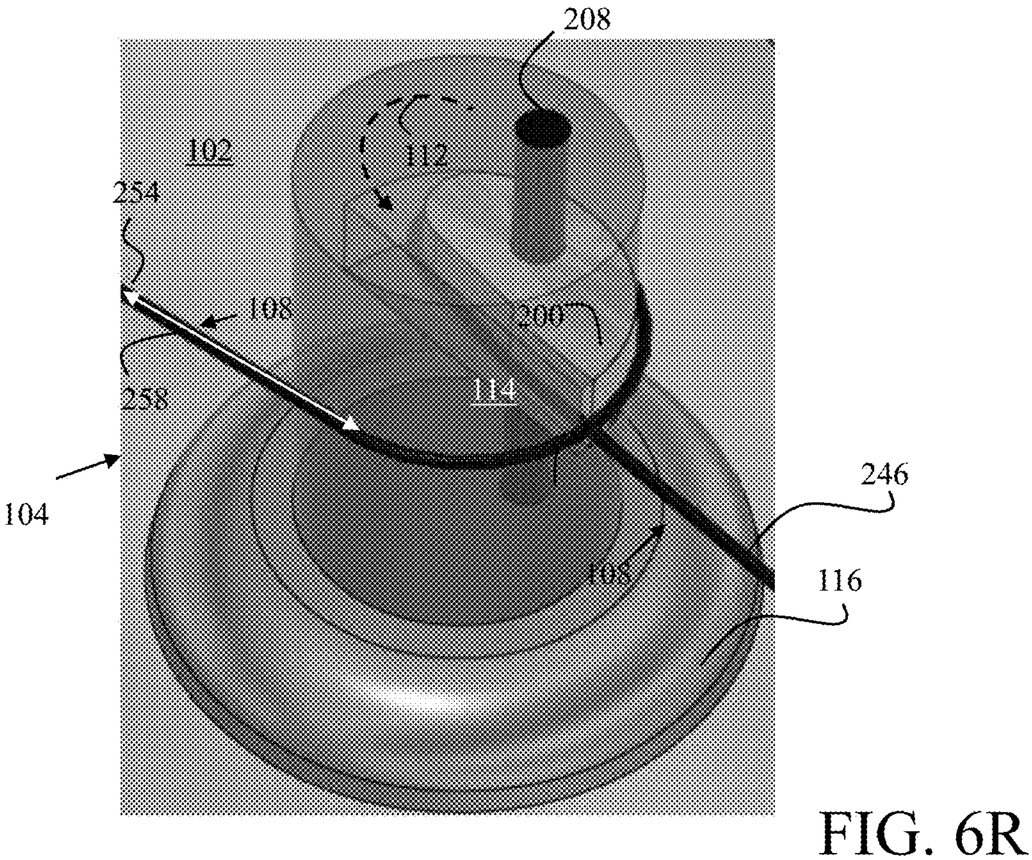
Figure 6S:
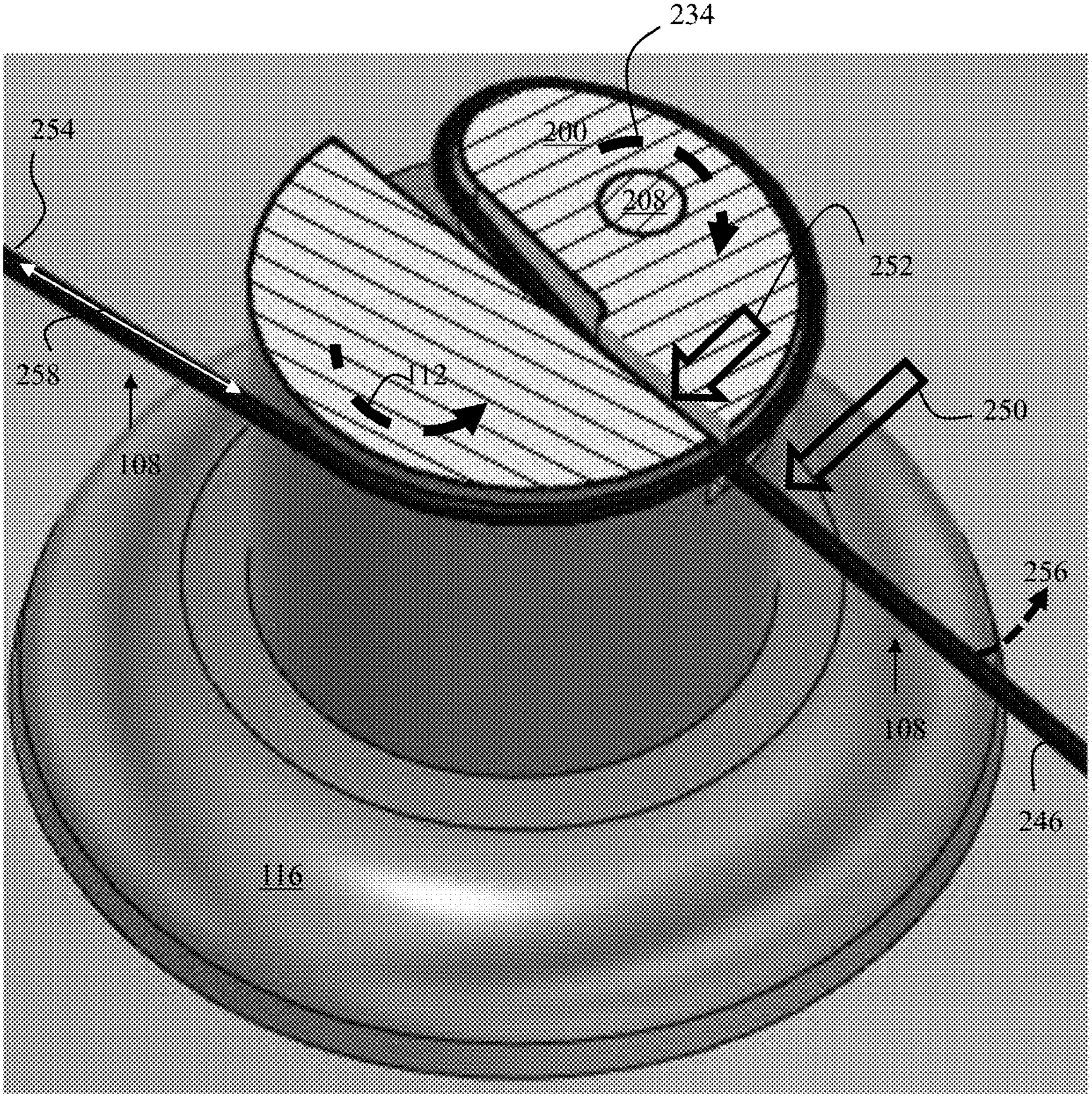
Figure 6T:
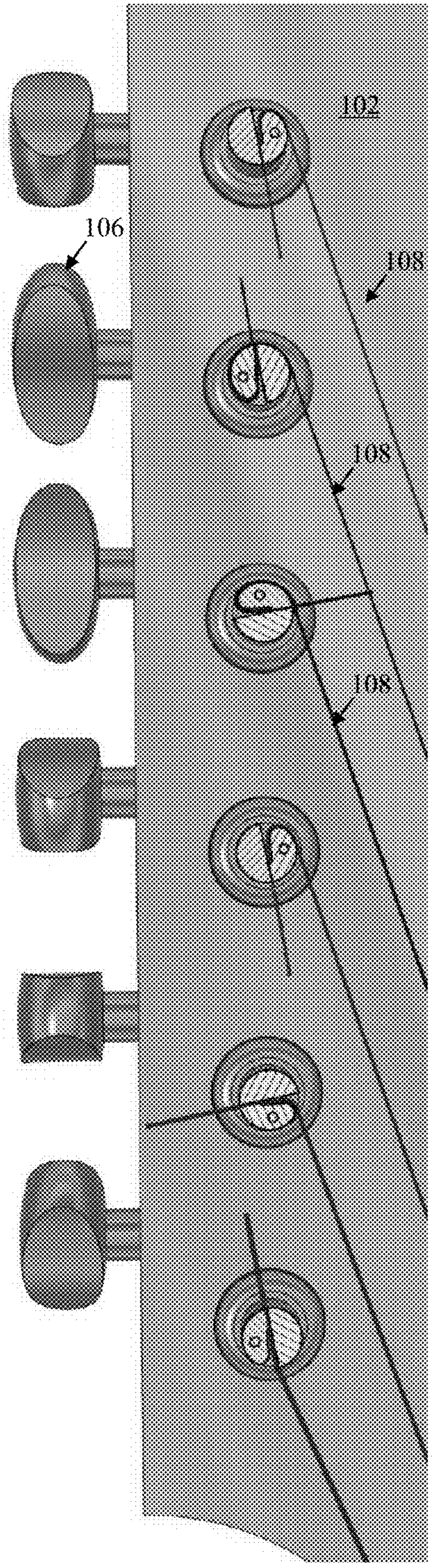
Figure 7A:
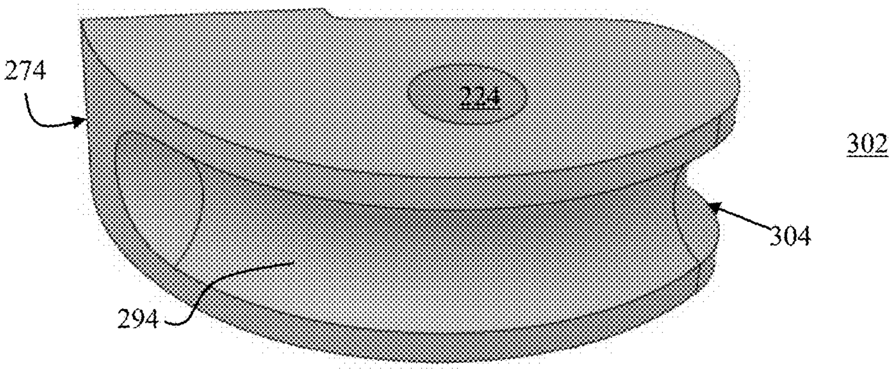
FIGS. 7A to 7D are non-limiting, exemplary illustrations of an engagement member in accordance with another embodiment of the present invention.
Figure 7B:
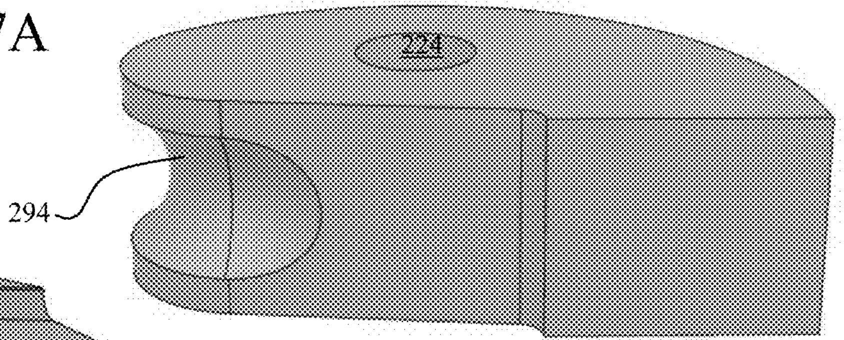
Figure 7C:
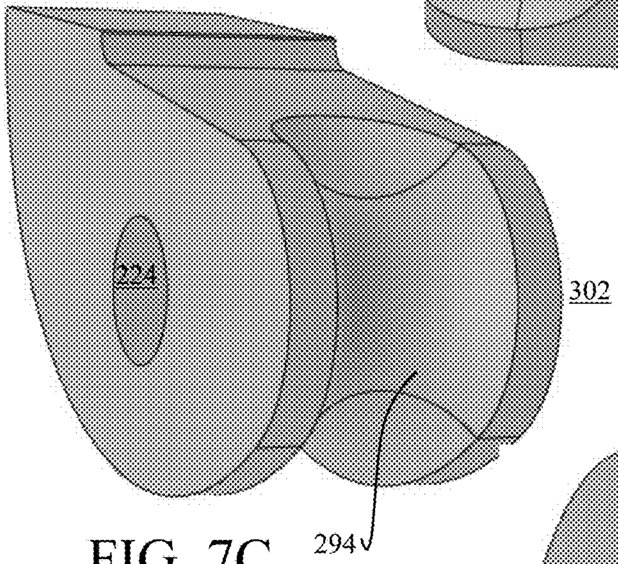
Figure 7D:
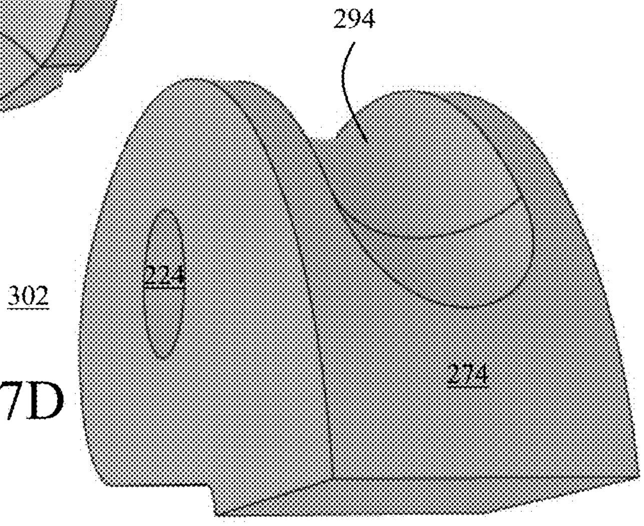
Figure 8A:
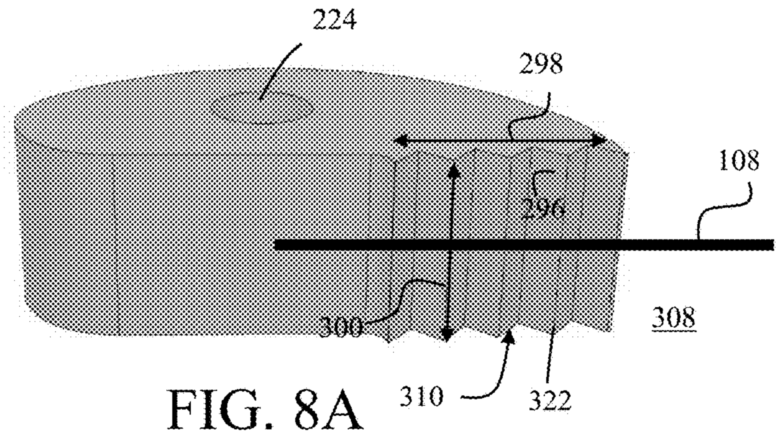
FIGS. 8A to 8D are non-limiting, exemplary illustrations of an engagement member in accordance with another embodiment of the present invention.
Figure 8B:
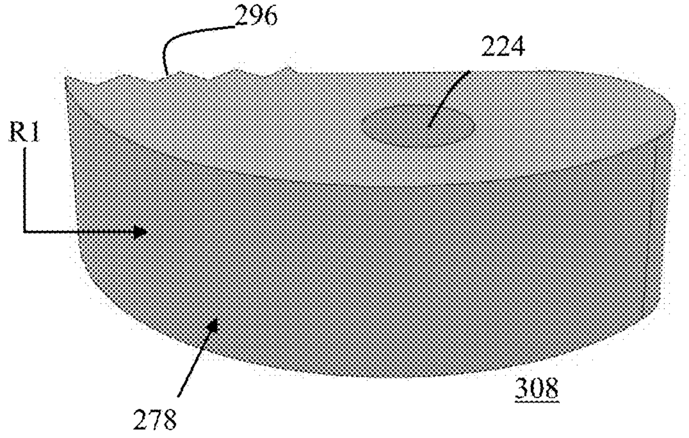
Figure 8C:
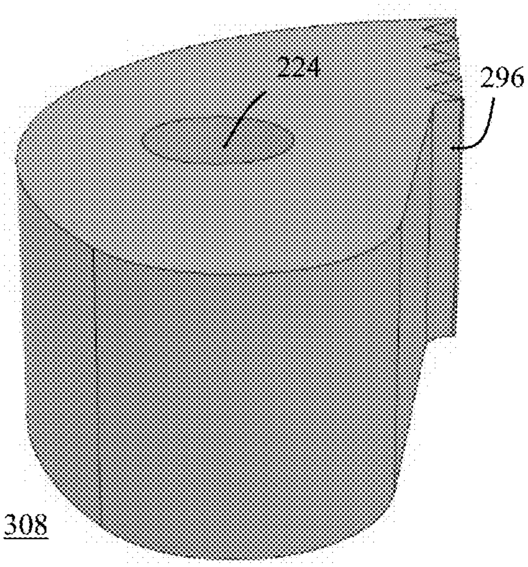
Figure 8D:
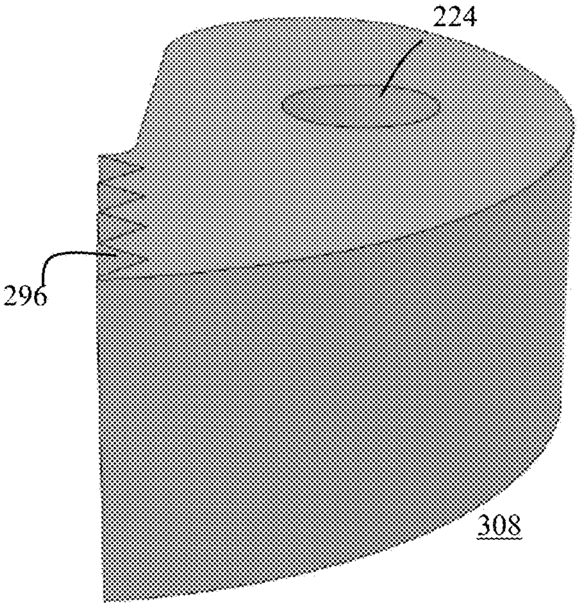

FIGS. 6A to 6T are non-limiting, exemplary illustrations progressively illustrating a non-limiting, exemplary method of loading and tuning a string using the locking string tuner illustrated in FIGS. 1A to 5F in accordance with one or more embodiments of the present invention. It should be noted that in this non-limiting, exemplary instance for discussion purposes only, it may be assumed that tension is applied to string 108 when string post 114 is rotated counterclockwise for left-handed tuner. Similar clockwise operations may be used to apply tension to string 108 for right-handed tuner.

As illustrated in FIGS. 6A to 6C, string 108 is loaded (inserted) onto locking string tuner 104 by insertion of free end 246 of string 108 through an ingress end 240 of an opening (or gap or channel) 210 between ingress end 248 of engagement member 200 and engagement surface 228 of recessed-slot 214 of string post 114.

Since engagement member 200 is moveably associated with string post 114 (as shown by in-plane rotational motion 234), free end 246 of string 108 may easily move ingress end 248 of engagement member 200 away from engagement surface 228 (rotating engagement member in a first direction), if free end 246 contacts engagement member 200. This movement of ingress end 248 of engagement member 200 away from engagement surface 228 further widens ingress end 240 of gap 210, eliminating potential obstruction of string 108 during loading. Additionally, as string 108 is further inserted through gap 210, free end 246 of string 108 will pass by relief surface 282 and may also easily move egress end 274 of engagement member 200 away from engagement surface 228 (rotating engagement member 200 in a second, opposite direction), if free end 246 contacts transverse rise edge 288 of engagement member 200. This movement of egress end 274 of engagement member 200 away from engagement surface 228 further widens egress end 240 of gap 210, eliminating potential obstruction of string 108 during loading. Free end 246 of string 108 is finally extended out through an egress end 242 of gap 210, passed egress end 274 of engagement member 200.

As illustrated, the wider ingress end 240 of gap 210 (especially when ingress end 248 of engagement member 200 is moved away from engagement surface 228) provides an intuitive indexing for distinction from the narrower egress end 242 of gap 210 from which free end 246 of string 108 extends. Further, the filleted side 292 of engagement member 210 provides additional visual aid in identifying ingress side 240 of gap 210.

As illustrated in FIGS. 6D to 6F, once free end 246 of string 108 is extended out of egress end 242 of gap 210, string post 114 may be rotated as described above to apply tension 258 to string 108.

As string post 114 is rotated along path 112 (e.g., counterclockwise), engagement surface 228 of recessed-slot 214 of string post 114 at egress end 242 of gap 210 is moved towards grip surface 280 of engagement side 276 of engagement member 200. Free end 246 of string 108 rotates along path 256 as string post 114 rotates along path 112.

As string post 114 is further rotated along path 112, tension (or tensile force) 258 is applied to string 108. It should be noted that tensile force 258 is along string 108, resulting in tensioned portion 254 of string 108.

As string post 114 is further rotated, tensioned portion 254 of string 108 abuts against and pushes relief surface 282 of engagement side 276 at ingress end 248 of the engagement member 200 along path 250. As detailed below, the "push" along path 250 may be thought of as the "effort" or input force of a lever.

The applied force along path 250 to ingress end 248 of engagement member 200 generates a force 252 at an egress end 274 of engagement side 276 of engagement member 200 due to free, in-plane rotational motion 234 of engagement member 200 around pivot pin 208.

The movement of grip surface 280 allows for a tighter engagement with string 108, generating a tighter grip or clamping force on string 108 position in between the engagement surface 228 and grip surface 280.

As will be appreciated by those skilled in the art, engagement member 200 may be thought of as a lever, with pivot pin 208 as the fulcrum of the lever. Effort (input force) 250 at ingress end 248 of engagement member 200 generates load (output force) 252 at egress end 274 of engagement side 276 of engagement member 200 due to free, in-plane rotational motion 234 of engagement member 200 at fulcrum (pivot pin 208).

More specifically, as with any lever, ingress end 248 of engagement member 200 at the position illustrated in FIG. 6F receives the "effort" (or input force 250) of the lever action as result of tensile force 258 along string 108 as string post 114 is rotated. The egress end 274 of engagement member 200 may be considered as "load" (or output force 252) of the lever that is moved towards engagement surface 228 of string post 114, closing-in on gap 210.

Tensile force 258 along string 108 creates a resistance in string 108 against bending (at the tensioned portion 254), which when accompanied with rotation 112 of string post 114, enables tensioned portion 254 to generate effort (or input force) 250 to move and rotate engagement member 200 along path 234. Effort (or input force) 250, in turn, generates a load (output force) 252 at egress end 274 of engagement member 200. Load (output force) 252 is directly applied to egressing free end 246 of string 108 located in between grip surface 280 of engagement member 200 and engagement surface 228 of string post 114. This applied force (load or output force) 252, allows grip surface 280 and engagement surface 228 to securely grip onto string 108.

As illustrated in FIGS. 6G to 6J, as string post 114 is further rotated 112 to further tune string 108, the direction and the strength of effort (or input force) 250 varies (depending on the rotational direction-clockwise or counterclockwise of string post 114). Further, load (or output force) 252 also varies as string post 114 is rotated, resulting in either tighter or looser grip or clamp of the free end 246 of string 108 at egress side 274 of engagement member 200.

It should be noted that by this turn (shown in FIGS. 6G to 6J, string 108 may be perfectly tuned as desired without having to further apply additional tensile force 258 to tensioned side 254 of string 108. However, further tuning of string 108 is illustrated in FIGS. 6K to 6S for mere discussion purposes to illustrate at least one full rotation of string post 114.

As further illustrated in FIGS. 6K to 6S, as string post 114 is further rotated along direction 112, the direction of effort (or input force) 250 changes, including an increase in the applied effort (input force) 250 due to rotation of string post 114 and the greater tensile force 258 on string 108 as a result.

As best shown in FIGS. 6N to 6S, as string post 114 is further rotated along direction 112, the lever action of engagement member 200 becomes a class B type lever where load (output force) 252 is between the effort (input force) 250 and fulcrum 208. In this case, the effort (input force) 250 is applied to the very outer edge 286 of egress end 274 of engagement member 200 by tensioned portion 254 of string 108, with load (output force) 252 applied to grip surface 280 of engagement side 276 of engagement member 200, which is between fulcrum 208 and the effort 250. FIG. 6T is a non-limiting, exemplary illustration of a sectional view of string posts 114 shown in FIG. 1B, illustrating the various tuning positions of each string post 114 for each string 108 in accordance with one or more embodiments of the present invention. As illustrated, a string post 114 need not be turned 360° to tune a string 108 to a desired pitch.

FIGS. 7A to 7D are non-limiting, exemplary illustrations of an engagement member in accordance with another embodiment of the present invention. The engagement member 302 illustrated in FIGS. 7A to 7D includes similar corresponding or equivalent components, methods, interconnections, functional, operational, and or cooperative relationships as the engagement member 200 that is shown in FIGS. 1A to 6T, and described above. Therefore, for the sake of brevity, clarity, convenience, and to avoid duplication, the general description of FIGS. 7A to 7D will not repeat every corresponding or equivalent component, methods, interconnections, functional, operational, and or cooperative relationships that has already been described above in relation to engagement member 200 that is shown in FIGS. 1A to 6T but instead, are incorporated by reference herein.

As illustrated in FIGS. 7A to 7D, in this non-limiting, exemplary embodiment, engagement member 302 may comprise of a reeling side 304 that includes a groove (or channel) 294 that dictates the direction of travel and alignment of string 108 on engagement member 302.

Groove 294 is circumferentially oriented around part of reeling side 304 of engagement member 302, extending partially onto engagement side 306 with the opposite end of groove 294 ending near egress end 274 of reeling side 304 of engagement member 302. Egress end 274 of reeling side 304 of engagement member 302 has no groove, allowing reeling side 304 of engagement member 302 near egress end 274 to be circumferentially flush with string post 114. This flush configuration leads string 108 onto circumferential surface of cylindrical string post 114, generating a stronger grip or clamping force (load force 252).

FIGS. 8A to 8D are non-limiting, exemplary illustrations of an engagement member in accordance with another embodiment of the present invention. The engagement member 308 illustrated in FIGS. 8A to 8D includes similar corresponding or equivalent components, methods, interconnections, functional, operational, and or cooperative relationships as engagement member 200 and 302 that are shown in FIGS. 1A to 7D, and described above. Therefore, for the sake of brevity, clarity, convenience, and to avoid duplication, the general description of FIGS. 8A to 8D will not repeat every corresponding or equivalent component, methods, interconnections, functional, operational, and or cooperative relationships that has already been described above in relation to engagement members 200 and 302 that are shown in FIGS. 1A to 7D but instead, are incorporated by reference herein.

As illustrated in FIGS. 8A to 8D, in this non-limiting, exemplary embodiment, engagement member 308 may comprise of reeling side 278 that is identical to engagement member 200, but has a grip surface 310 that is serrated 296 for better grip of string 108. Serrations 296 are transversely oriented along a longitudinal axis 298, but parallel transverse axis 300 of grip surface 310, having an apex 322 transversely engaging string 108. The serrated grip surface 310 reduces contact area with string 108, increasing the applied pressure (i.e., load or output force 252) at apex 322 point of contact of serrations 296 with string 108.

FIGS. 9A to 9E are non-limiting, exemplary illustrations of an engagement member in accordance with another embodiment of the present invention. The engagement member 314 illustrated in FIGS. 9A to 9E includes similar corresponding or equivalent components, methods, interconnections, functional, operational, and or cooperative relationships as engagement member 200, 302, and 308 that are shown in FIGS. 1A to 8D, and described above. Therefore, for the sake of brevity, clarity, convenience, and to avoid duplication, the general description of FIGS. 9A to 9E will not repeat every corresponding or equivalent component, methods, interconnections, functional, operational, and or cooperative relationships that has already been described above in relation to engagement members 200, 302, and 308 that are shown in FIGS. 1A to 8D but instead, are incorporated by reference herein.

As illustrated in FIGS. 9A to 9E, in this non-limiting, exemplary embodiment, engagement member 314 may comprise of a combination of features of engagement member 302 and 308, with reeling side 304 that has a groove 294 and a grip surface 310 with serrations 296.

FIGS. 10A to 12W are non-limiting, exemplary illustrations of locking string tuner in accordance with another embodiment of the present invention. Locking string tuner 104*a* illustrated in FIGS. 10A to 12W includes similar corresponding or equivalent components, methods, interconnections, functional, operational, and or cooperative relationships as locking string tuner 104 that is shown in FIGS. 1A to 9E, and described above. Therefore, for the sake of brevity, clarity, convenience, and to avoid duplication, the general description of FIGS. 10A to 12W will not repeat every corresponding or equivalent component, methods, interconnections, functional, operational, and or cooperative relationships that has already been described above in relation to locking string tuner 104 that is shown in FIGS. 1A to 9E but instead, are incorporated by reference herein.

As illustrated in FIGS. 10A to 12W, in this non-limiting, exemplary embodiment, locking string tuner 104*a* is comprised of string post 114*a* that includes a string engagement section 202*a* having a recessed slot 214*a* for housing an engagement member 316.

Recessed slot 214*a* is comprised of a bottom surface 226*a*, an engagement surface 228*a*, and a top surface 230*a*. Engagement surface 228*a* of recessed slot 214*a* of string engagement section 202*a* of string post 114*a* is curved and more particularly, has a convex curve configuration.

Figure 10H:
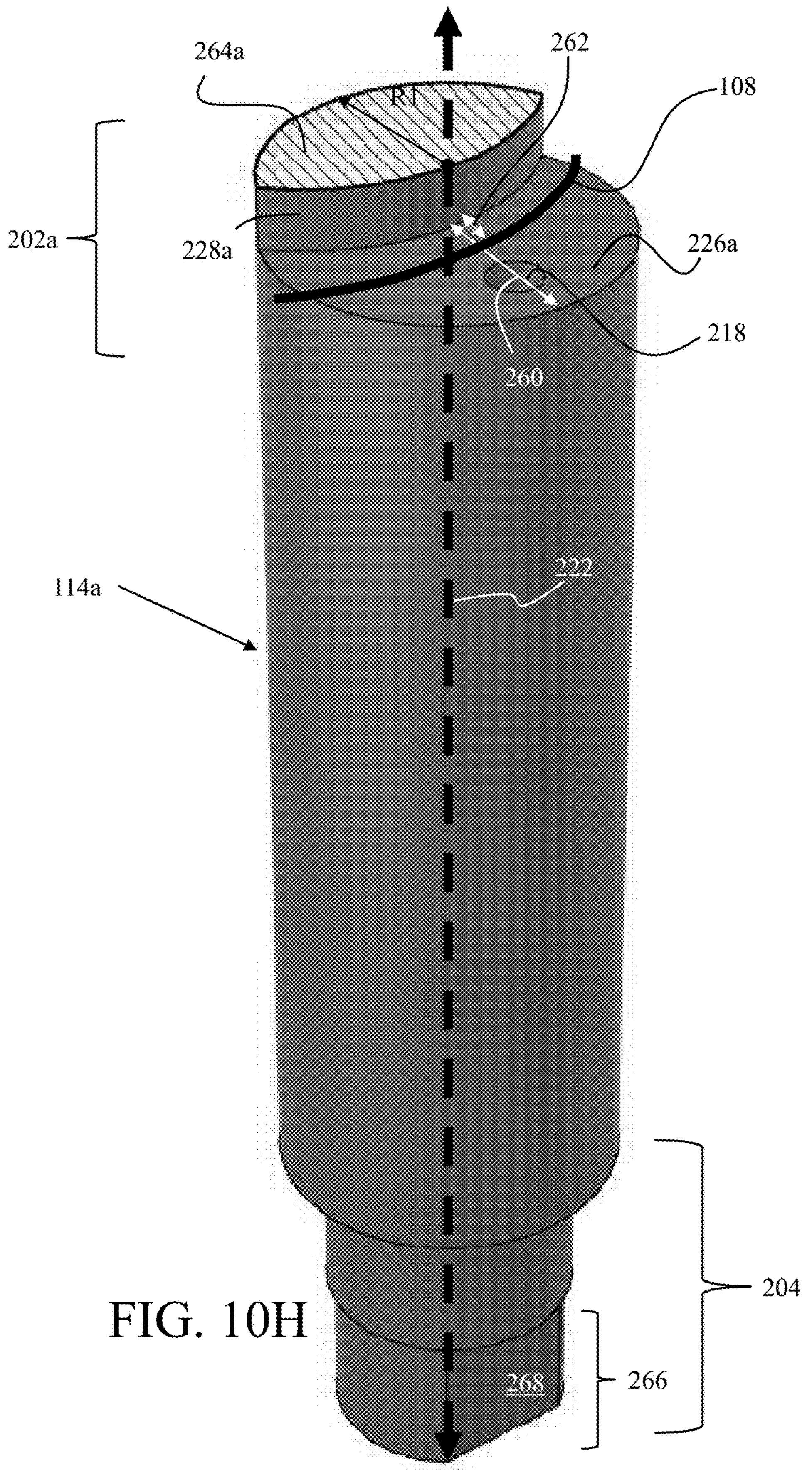
Figure 10I:
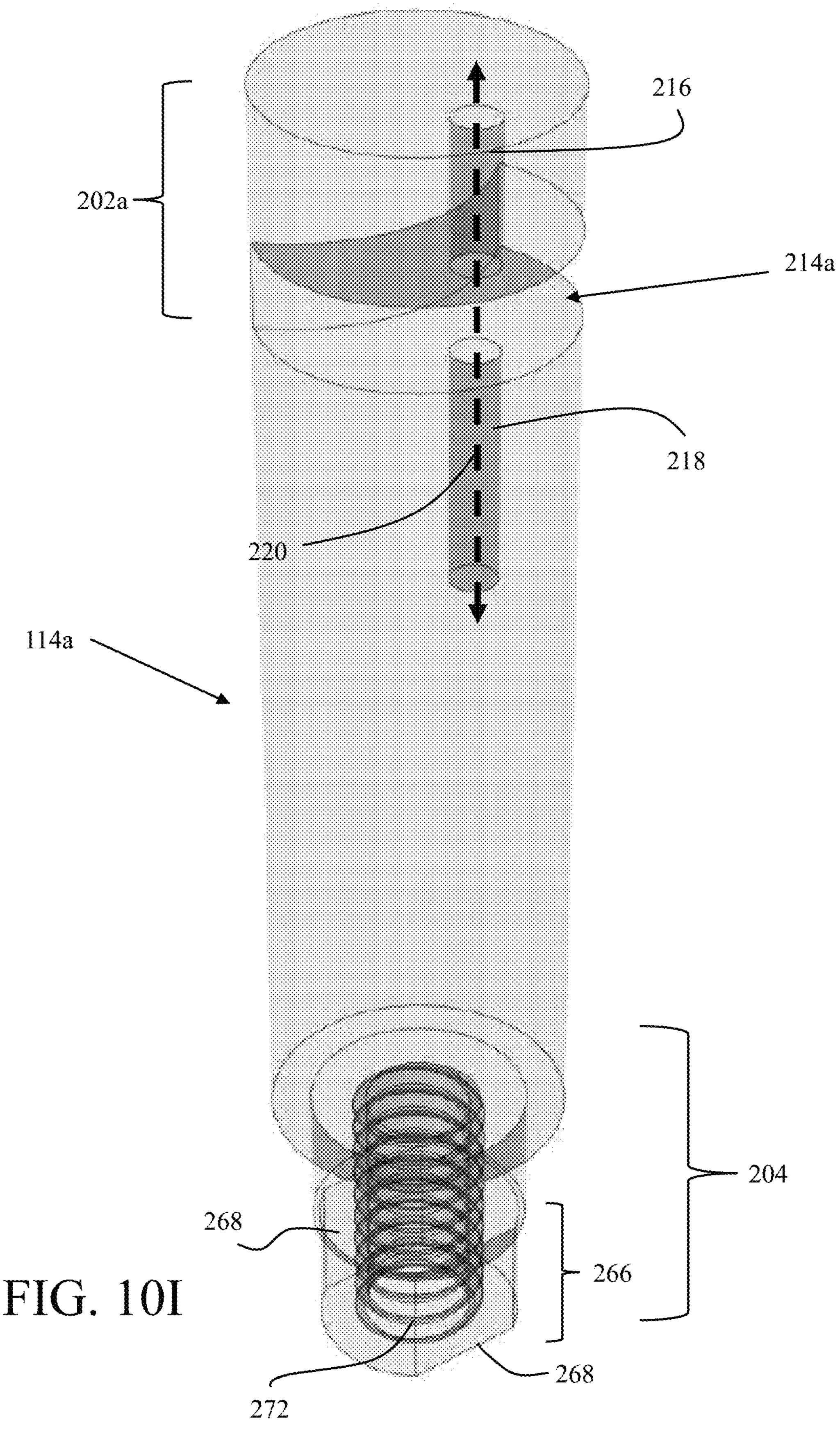
Figure 11A:
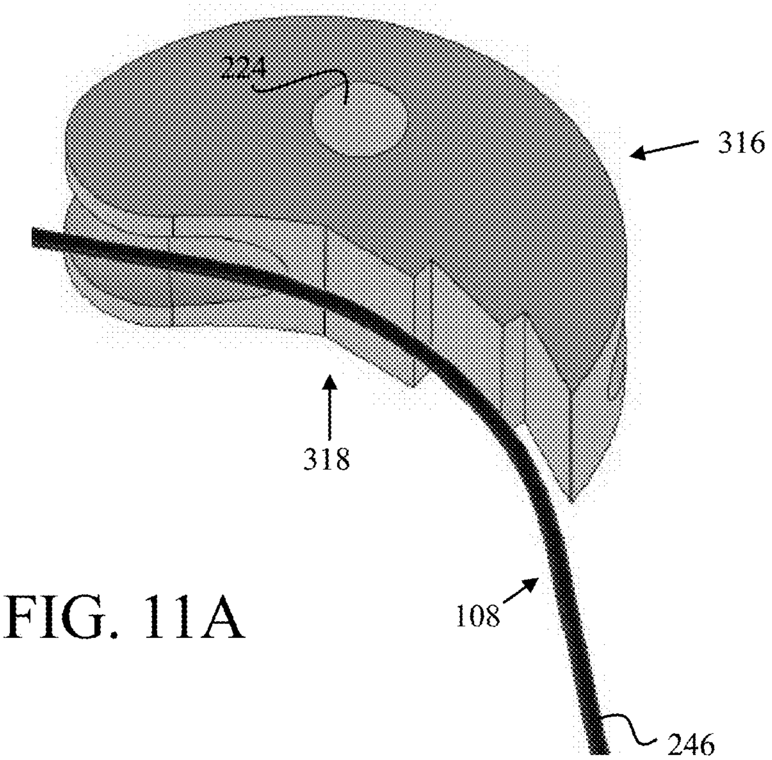
Figure 11B:
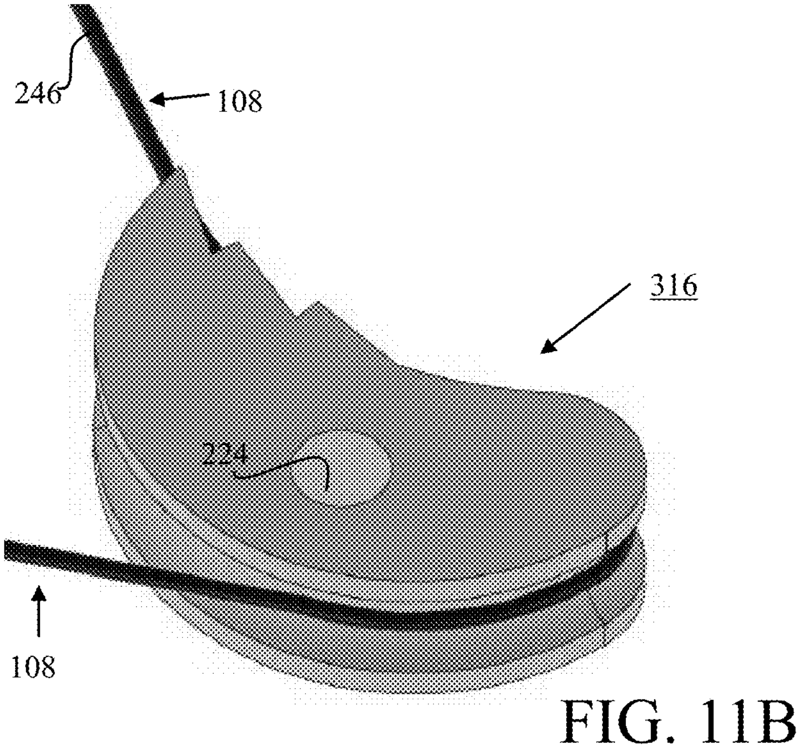
Figure 11C:
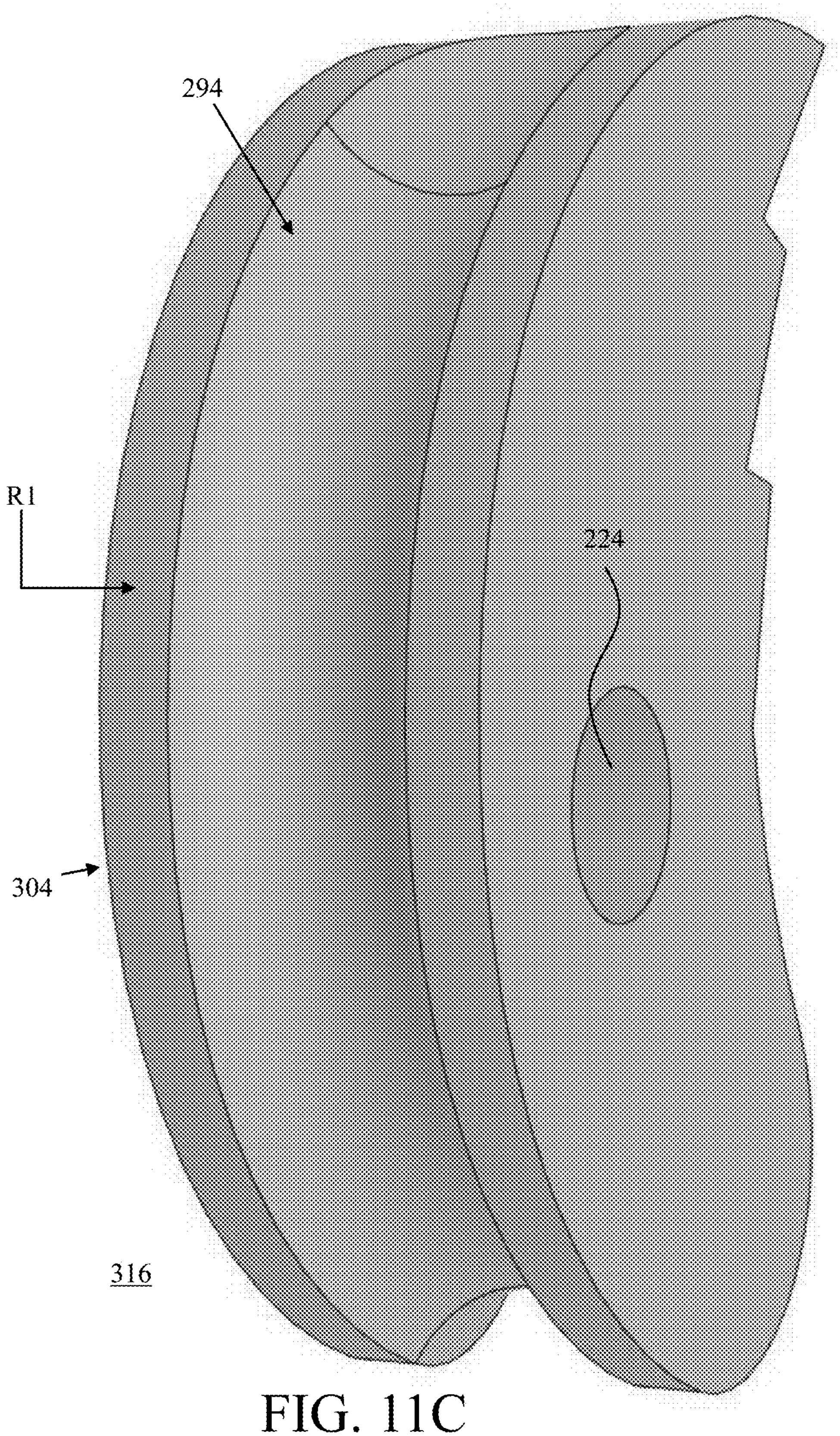
Figure 11D:
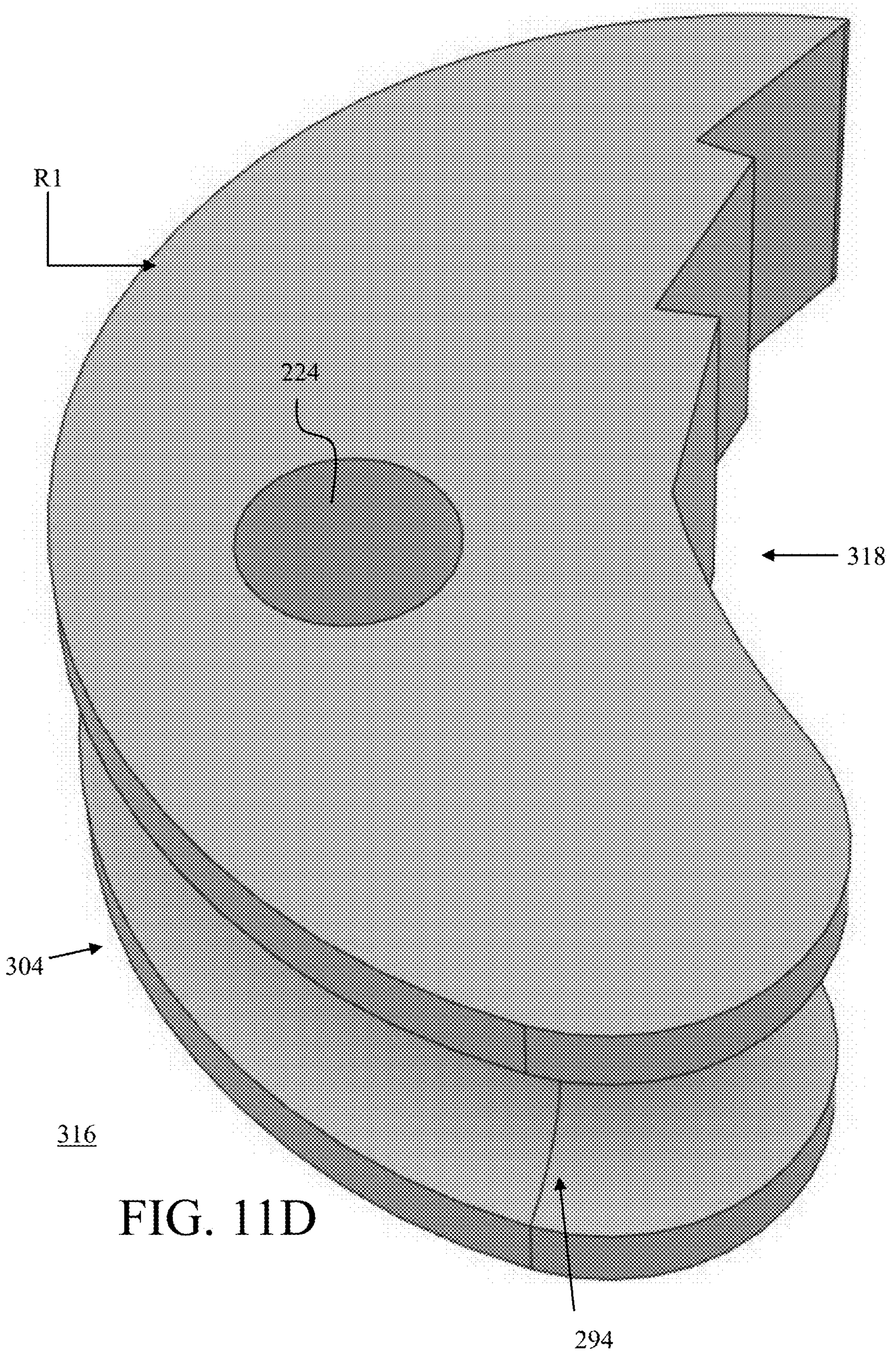
Figure 11E:
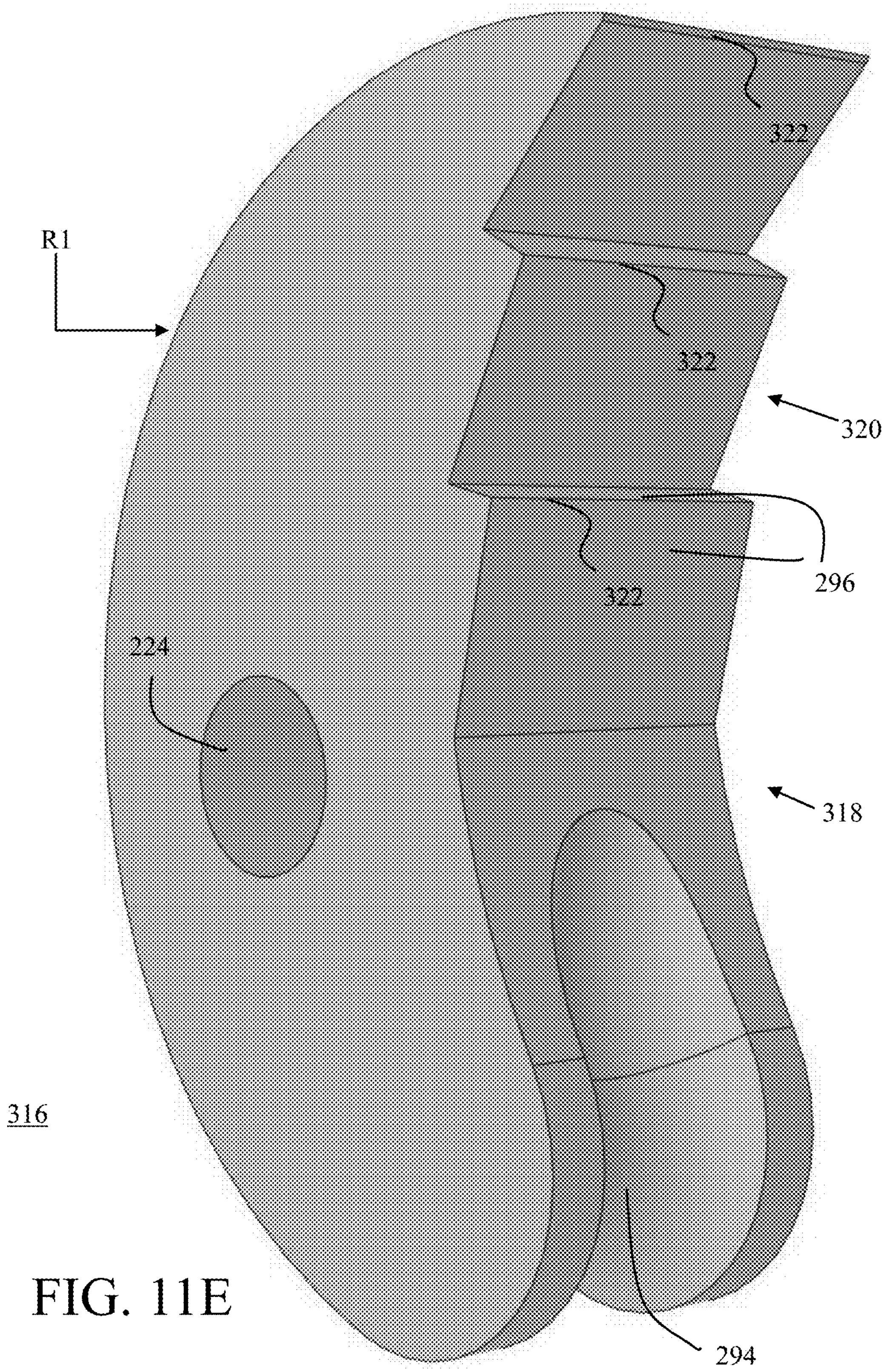
Figure 11F:
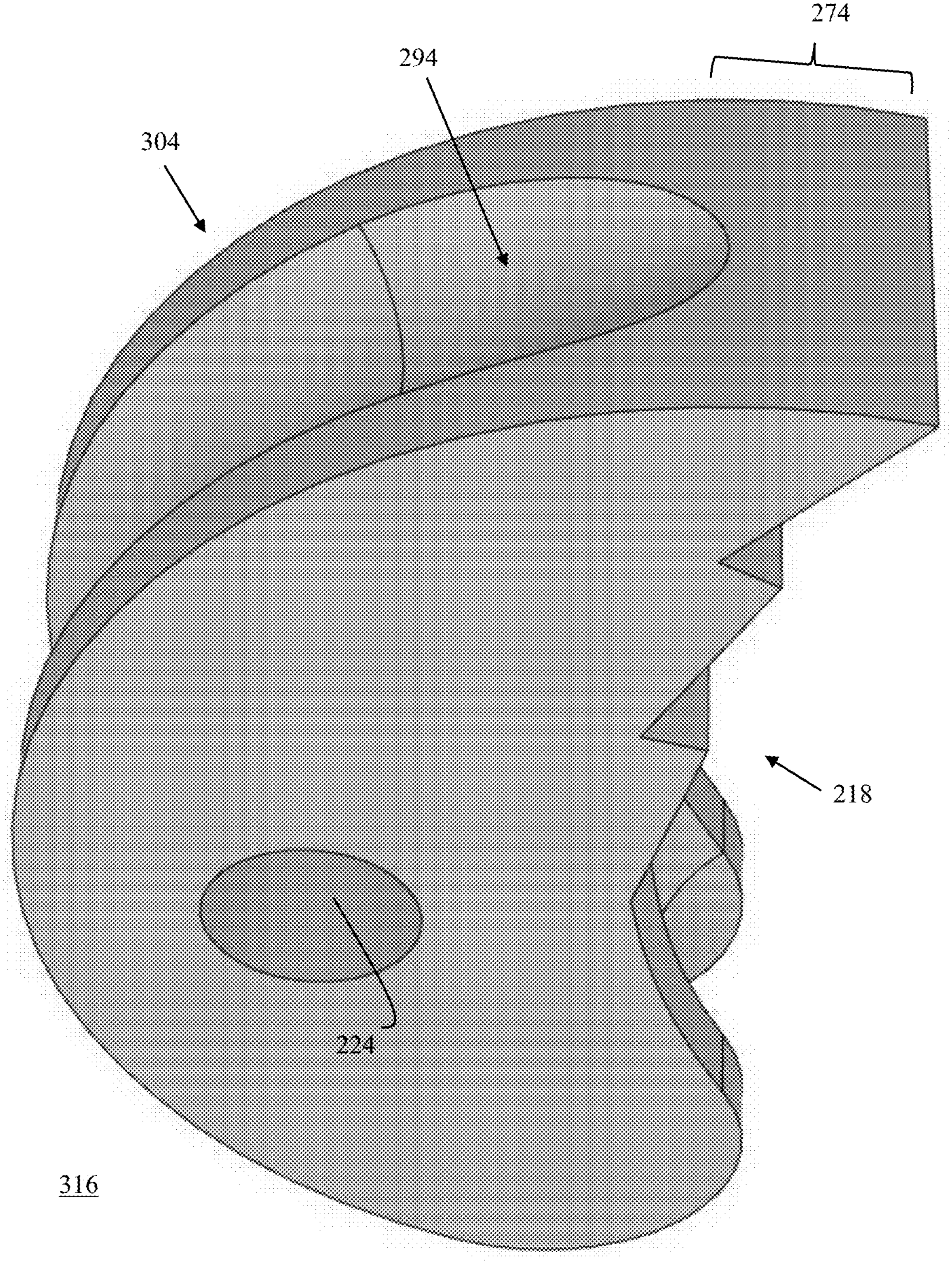

As best illustrated in FIG. 10H, in this non-limiting, exemplary instance, distance 260 by which engagement surface 228*a* is carved out and set back is greater than radius R1 (measured from central longitudinal axis 222) of string post 114*a* by an offset 262. This arrangement makes the area of bottom surface 226*a* larger than the remaining surface area 264*a* to accommodate both engagement member 316 and different sized strings 108.

As best illustrated in FIGS. 11A to 11F, locking string tuner 104*a* includes engagement member 316 that has an engagement side 318 that has a concave configuration. The curved concaved configuration provides a greater surface area, facilitating larger contact surface with different sized strings 108.

The larger contact surface in combination with the curved configuration increase friction between the bent string 108 and concave engagement side 318 of engagement member 316 for better grip.

Serrated grip surface 320 reduces contact area with string 108, but increases the applied pressure (i.e., load or output force 252) at each apex point 322 of contact with string 108.

It should be noted that due to the curved serrated concaved grip surface 320, the applied loads (output forces 252) at apex 322 of each serration point near egress end 274 of engagement member 316 may be varied due in part to the physical characteristics (e.g., thickness, material, etc.) of string 108.

Figure 12A:
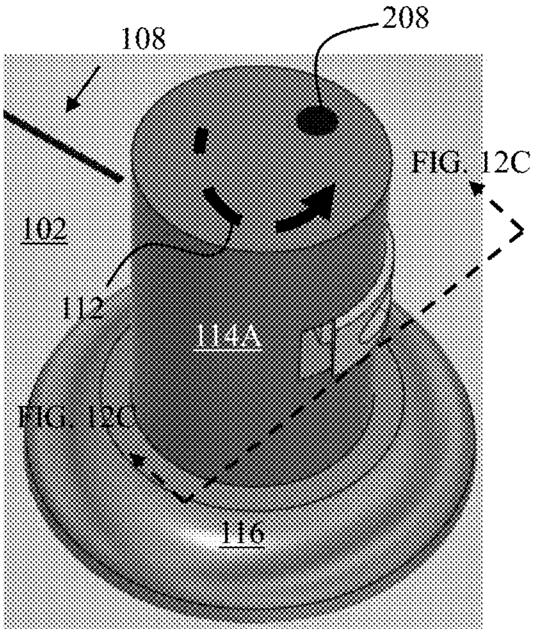
Figure 12B:
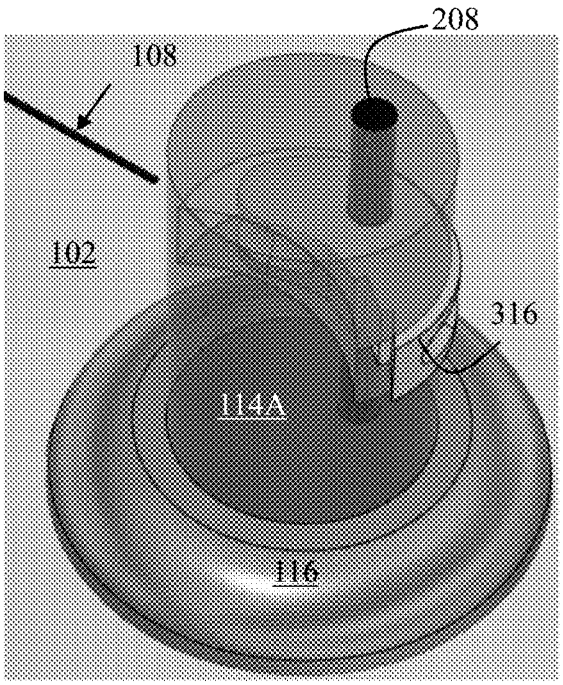
Figure 12C:
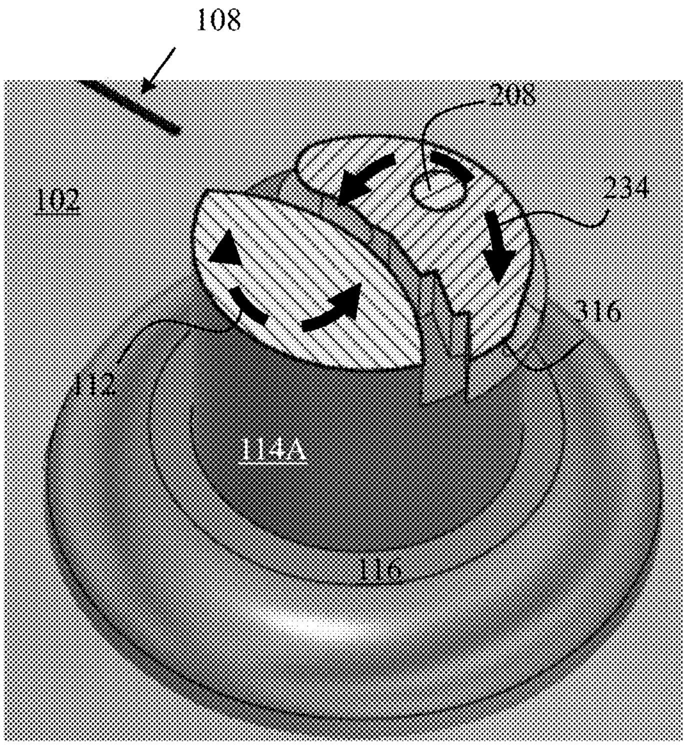
Figure 12D:
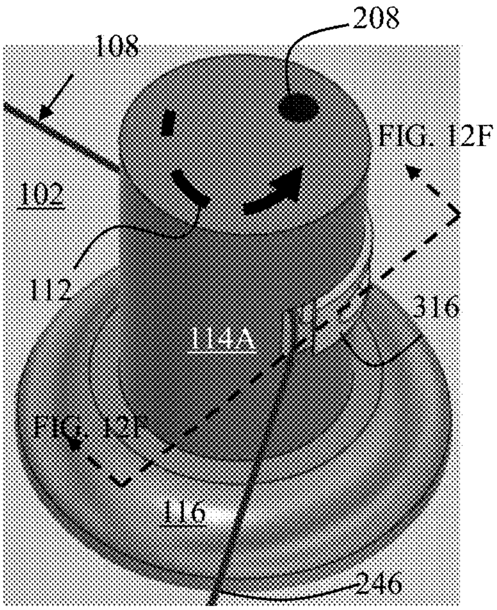
Figure 12E:
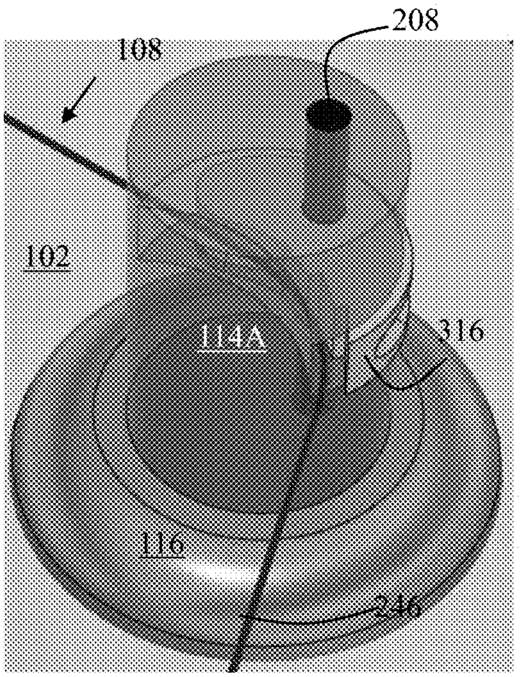
Figure 12F:
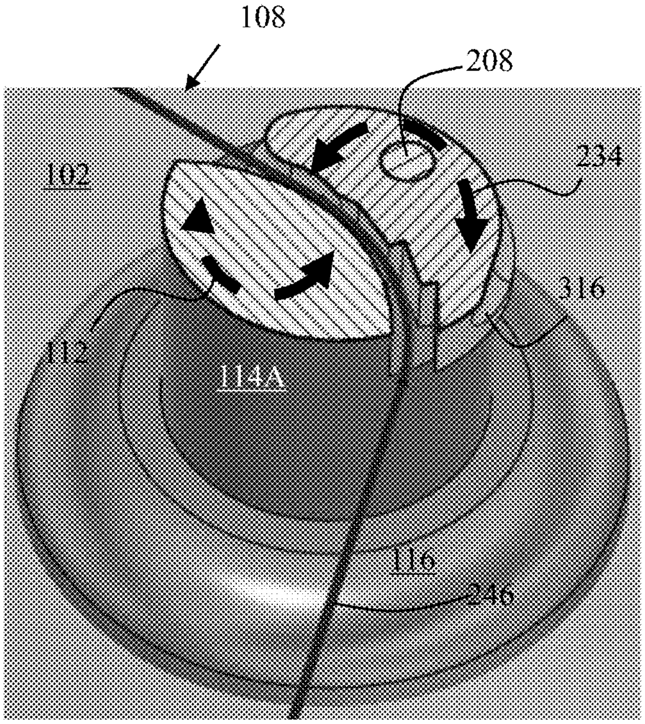
Figure 12G:
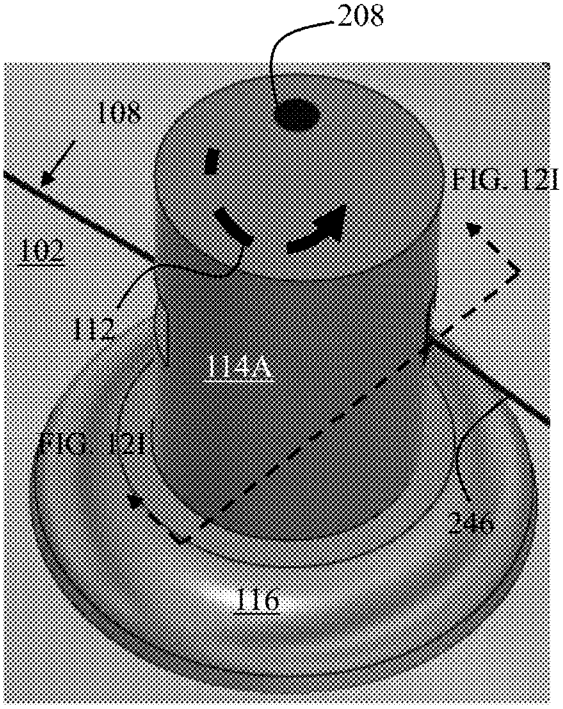
Figure 12H:
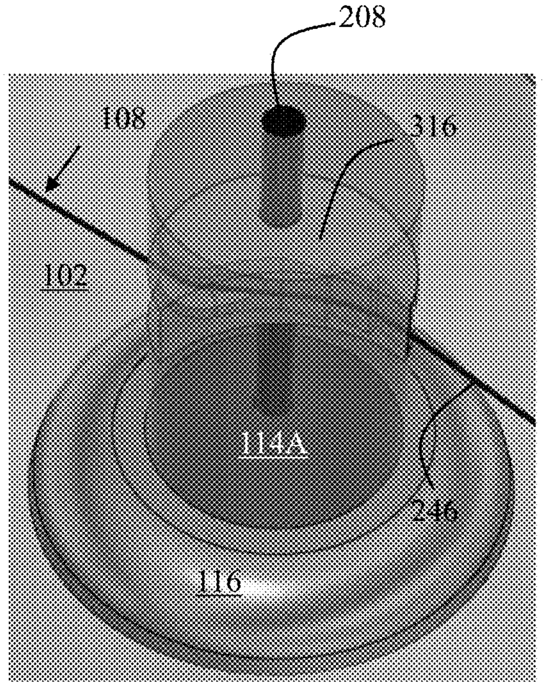
Figure 12I:
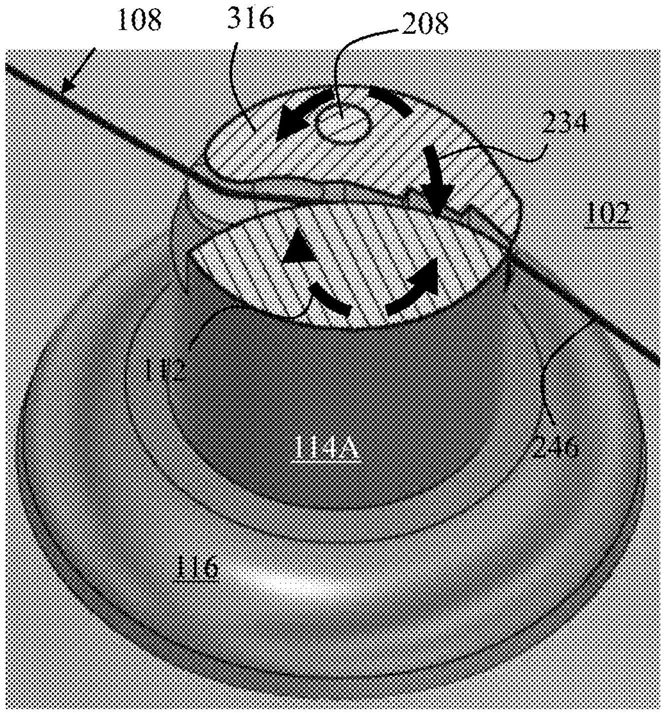
Figure 12J:
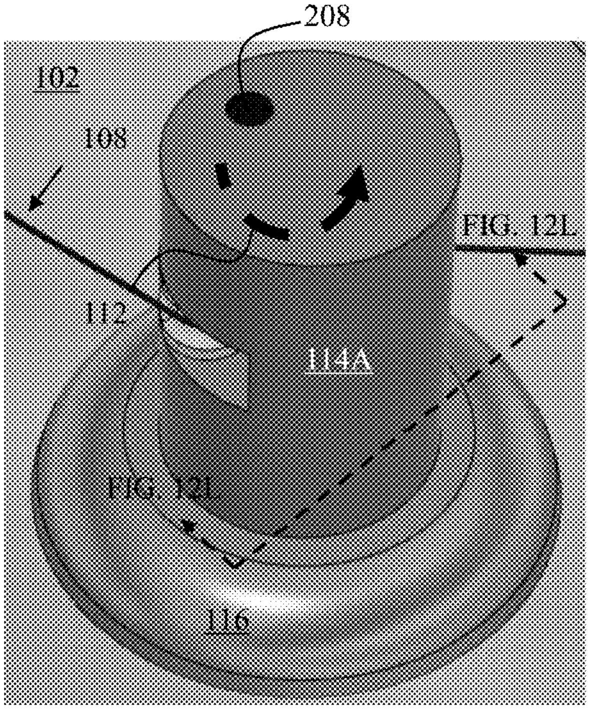
Figure 12K:
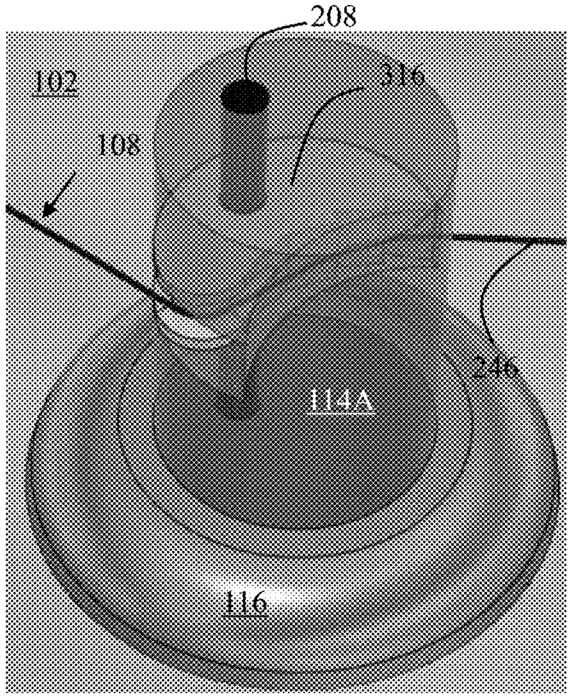
Figure 12L:
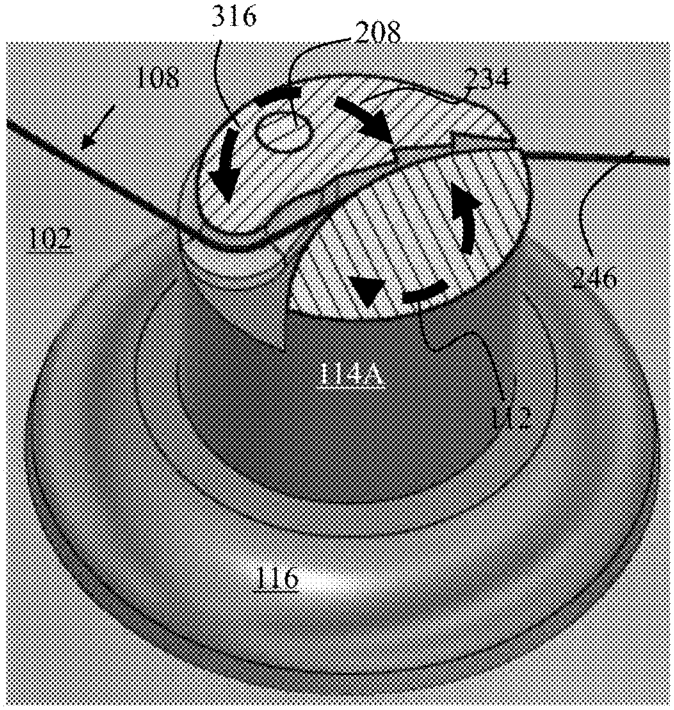
Figure 12M:
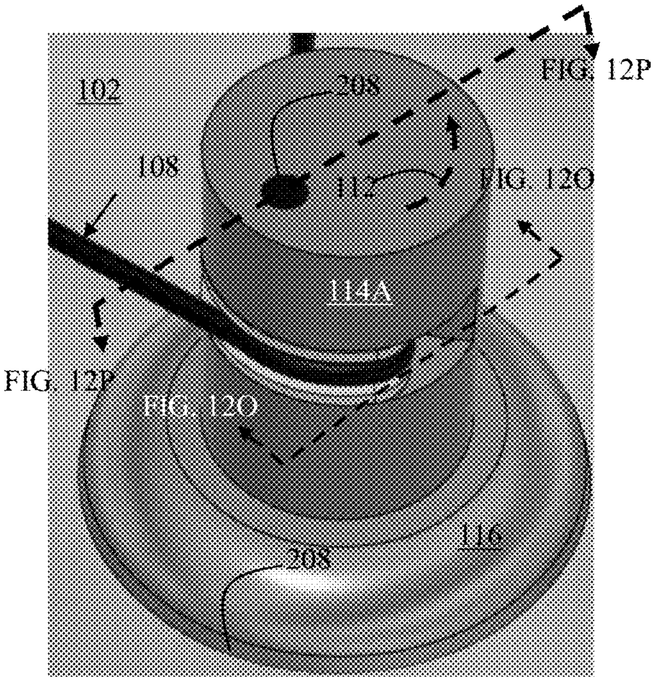
Figure 12N:
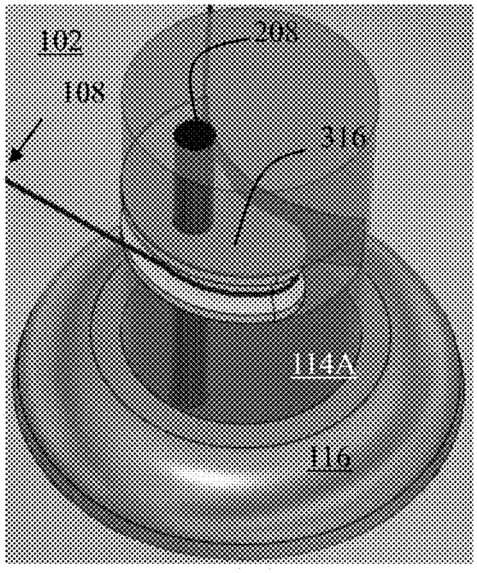
Figure 12O:
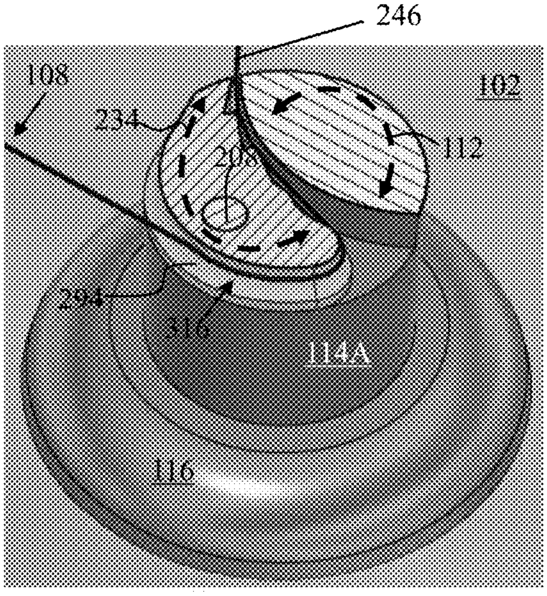
Figure 12P:
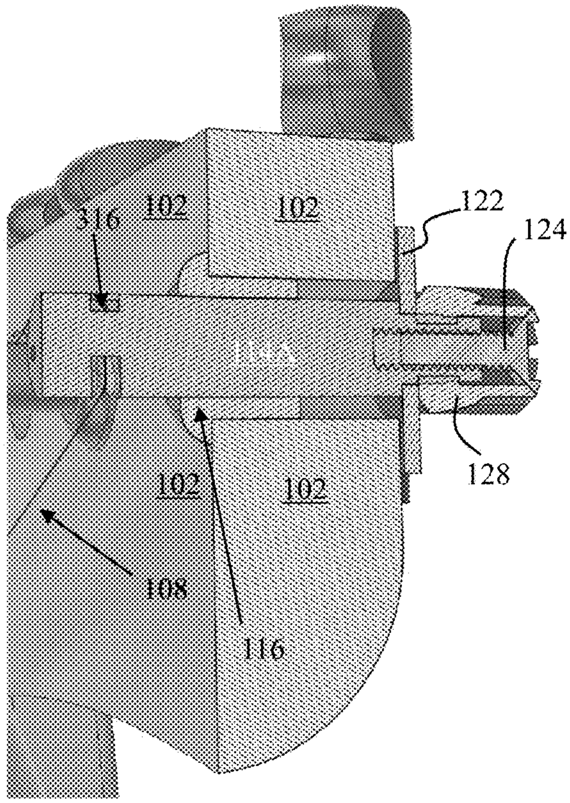
Figure 12Q:
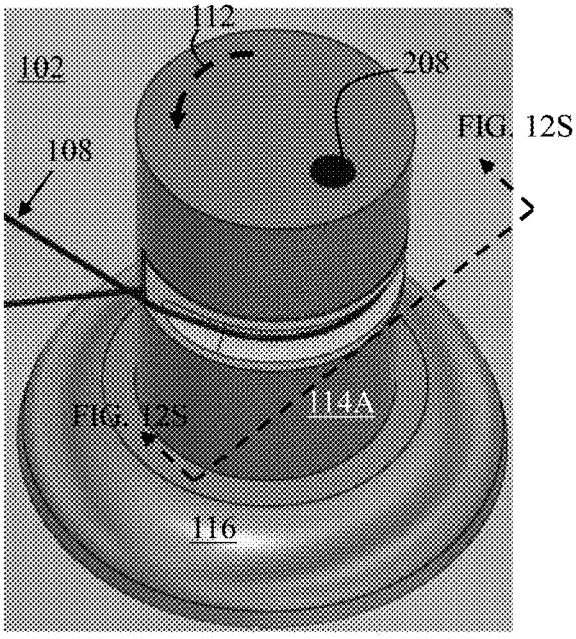
Figure 12R:
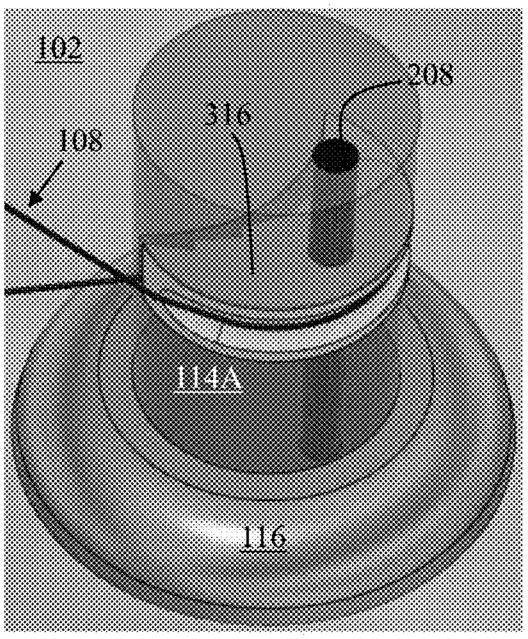
Figure 12S:
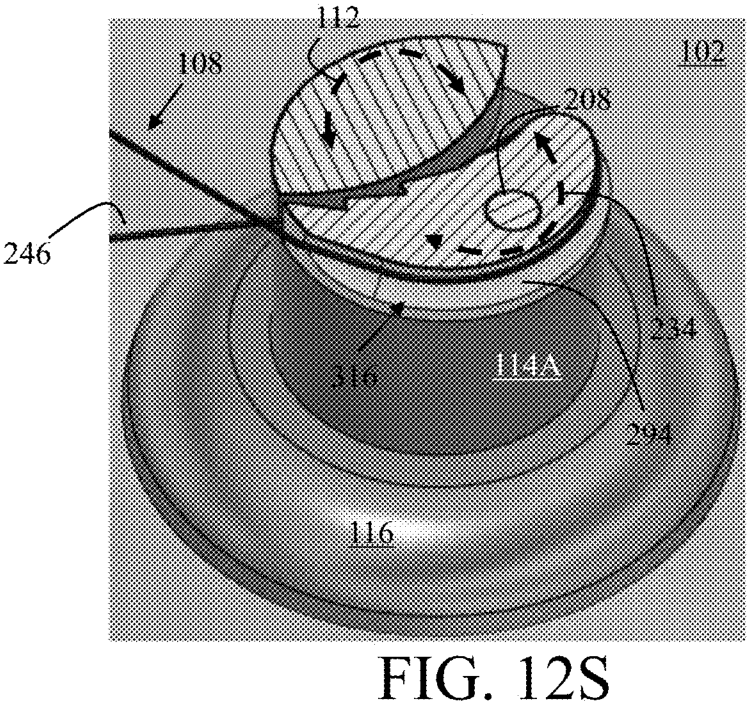
Figure 12T:
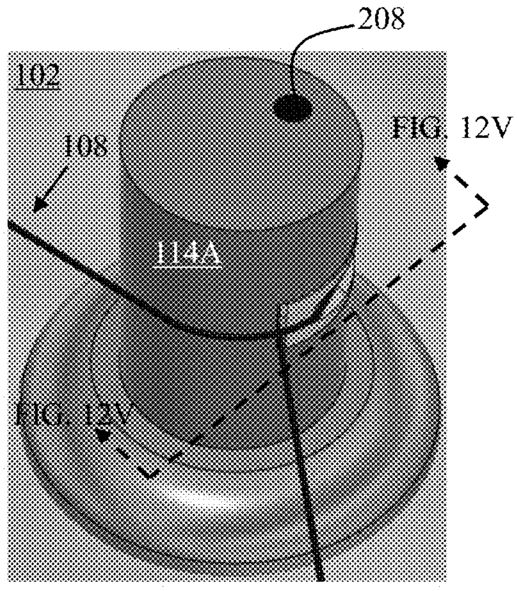
Figure 12U:
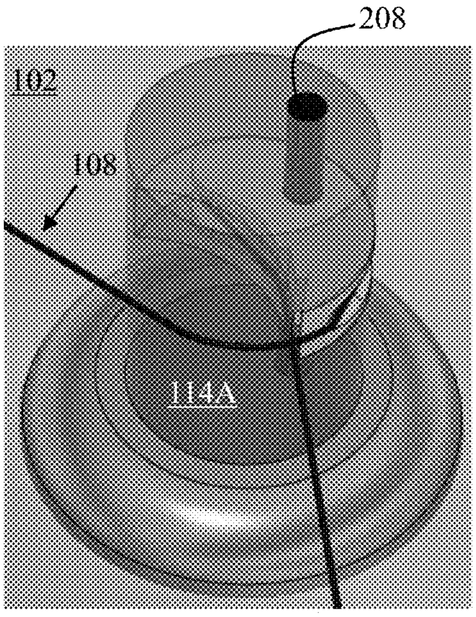
Figure 12V:
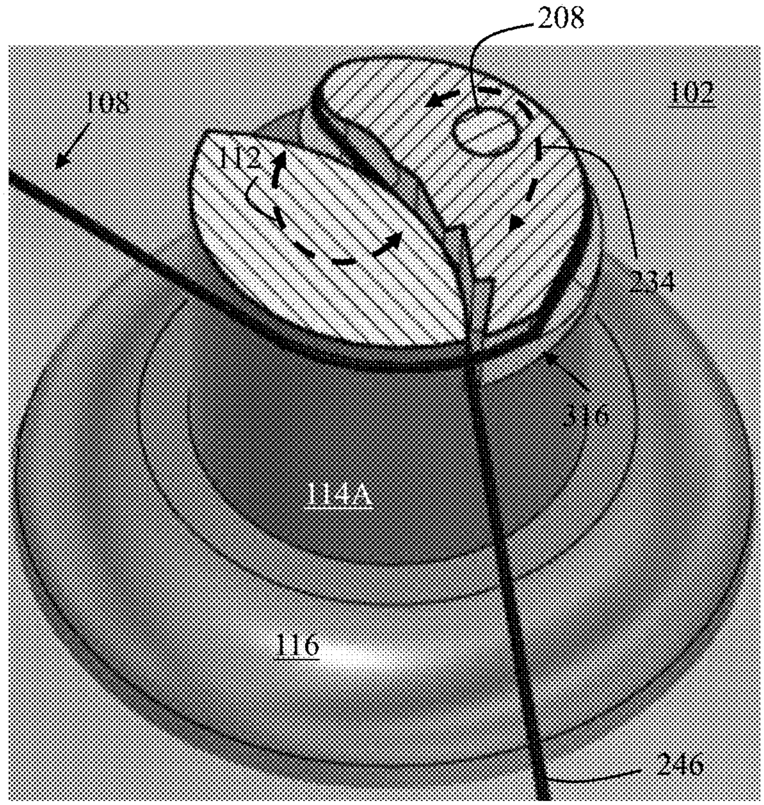
Figure 12W:
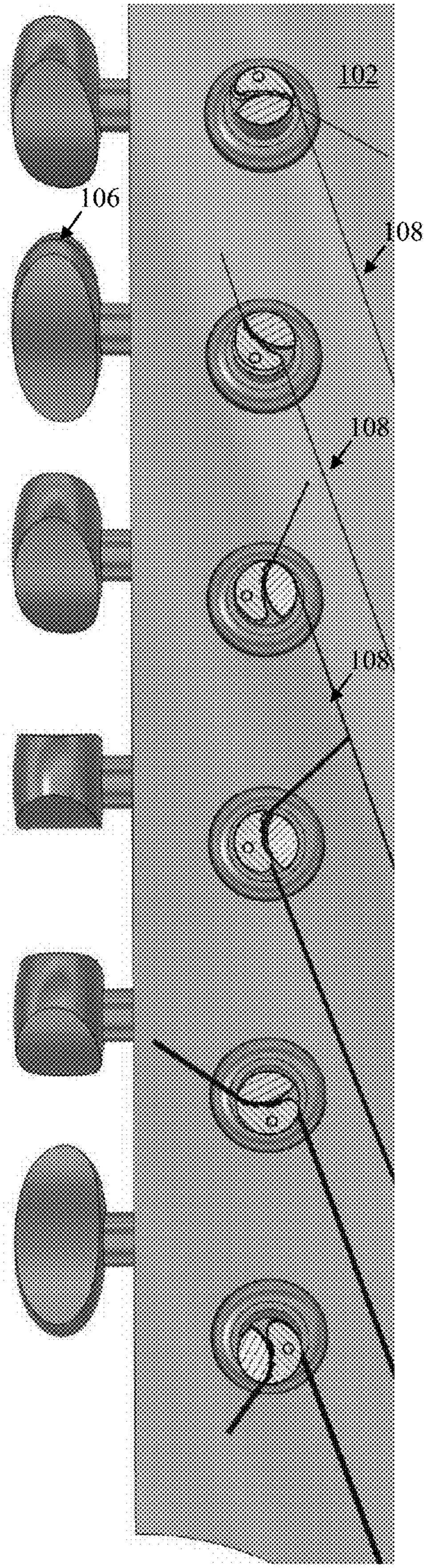

FIGS. 12A to 12W are non-limiting, exemplary illustrations progressively illustrating a non-limiting, exemplary method of loading and tuning a string using the locking string tuner illustrated in FIGS. 10A to 11F in accordance with one or more embodiments of the present invention. It should be noted that in this non-limiting, exemplary instance for discussion purposes only, it may be assumed that tension is applied to string 108 when string post 114*a* is rotated counterclockwise.

As illustrated in FIGS. 12A to 12W, the method of loading and tuning a string using locking string tuner 114*a* is similar to the method described and shown in FIGS. 1A to 9E. However, curved engagement surface 228*a* and curved engagement side 318 with curved serrated concaved grip surface 320 provide the advantages in terms of better grip of string 108, detailed above in relation to FIGS. 10A to 11F.

FIGS. 13A to 13D are non-limiting, exemplary illustrations of an engagement member in accordance with another embodiment of the present invention. The engagement member 324 illustrated in FIGS. 13A to 13D includes similar corresponding or equivalent components, methods, interconnections, functional, operational, and or cooperative relationships as engagement members 200, 302, 308, and 316 that are shown in FIGS. 1A to 12W, and described above. Therefore, for the sake of brevity, clarity, convenience, and to avoid duplication, the general description of FIGS. 13A to 13D will not repeat every corresponding or equivalent component, methods, interconnections, functional, operational, and or cooperative relationships that have already been described above in relation to engagement members 200, 302, 308, and 316 that are shown in FIGS. 1A to 12W but instead, are incorporated by reference herein.

As illustrated, engagement member 324 may comprise of an engagement side 326 that has a concave configuration, but with no serrations and no groove (or channel). The curved concaved configuration provides a greater surface area, facilitating larger contact surface with different sized strings 108.

The larger contact surface in combination with the curved configuration increase friction between the bent string 108 and concave engagement side 326 of engagement member 324 for better grip.

FIGS. 14A to 14D are non-limiting, exemplary illustrations of an engagement member in accordance with another embodiment of the present invention. The engagement member 328 illustrated in FIGS. 14A to 14D includes similar corresponding or equivalent components, methods, interconnections, functional, operational, and or cooperative relationships as engagement members 200, 302, 308, 316, 324 that are shown in FIGS. 1A to 13D, and described above. Therefore, for the sake of brevity, clarity, convenience, and to avoid duplication, the general description of FIGS. 14A to 14D will not repeat every corresponding or equivalent component, methods, interconnections, functional, operational, and or cooperative relationships that has already been described above in relation to engagement members 200, 302, 308, 316, 324 that are shown in FIGS. 1A to 13D but instead, are incorporated by reference herein.

As illustrated, engagement member 328 is similar to that of engagement member 326 shown in FIGS. 13A to 13D, but with the added groove or channel 294 at reeling side of engagement member 328.

Although the invention has been described in considerable detail in language specific to structural features and or method acts, it is to be understood that the invention defined in the appended claims is not necessarily limited to the specific features or acts described. Rather, the specific features and acts are disclosed a s exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, lateral, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

The use of the phrases "and or," "and/or" throughout the specification (if any used) indicate an inclusive "or" where for example, A and or B should be interpreted as "A," "B," or both "A and B."

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A locking string tuner, comprising:
a string post; and
an engagement member that is moveably associated with the string post;
the engagement member is moveably associated with the string post by a pivot pin that operates as a fulcrum member.

2. The locking string tuner as set forth in claim 1, wherein:
the string post is a single piece unit.

3. The locking string tuner as set forth in claim 1, wherein:
the string post includes:
a string engagement section that accommodates the engagement member, and
a gearing engagement section that is associated with a gearing mechanism.

4. The locking string tuner as set forth in claim 3, wherein:
the string engagement section is comprised of:
a recessed slot for housing the engagement member.

5. The locking string tuner as set forth in claim 4, wherein:
the engagement member is moveably housed within the recessed slot by a pivot pin.

6. The locking string tuner as set forth in claim 4, wherein:
the recessed slot is comprised of:
a bottom surface,
an engagement surface, and
a top surface.

7. The locking string tuner as set forth in claim 6, wherein:
a top distal end of the string engagement section of the string post includes an eccentrically positioned upper through-hole oriented parallel a central longitudinal axis of the string post, with the upper through-hole leading into the recessed slot via the top surface of the recessed slot; and
the bottom surface of the recessed slot of the string engagement section of the string post includes an eccentrically positioned, lower blind-hole oriented parallel the longitudinal axis of the string post;
the lower blind-hole is aligned with the upper through-hole.

8. The locking string tuner as set forth in claim 7, wherein:
the pivot pin is inserted through upper through-hole, an eccentrically positioned through-hole of the engagement member, and into the lower blind-hole.

9. The locking string tuner as set forth in claim 6, wherein:
the engagement surface of the recessed slot of the string engagement section of the string post has one of a flat and convex curve configuration.

10. The locking string tuner as set forth in claim 5, wherein:

the engagement member is moveably housed within the recessed-slot by a pivot pin that functions as a fulcrum to allow the engagement member to operate as a freely moveable lever with an in-plane rotational motion.

11. The locking string tuner as set forth in claim 5, wherein:
the engagement member is comprised of an ingress end and an egress end;
the engagement member has:
an engagement side, and
a reeling side.

12. The locking string tuner as set forth in claim 11, wherein:
the engagement side of the engagement member is comprised of:
a grip surface and
a relief surface.

13. The locking string tuner as set forth in claim 12, wherein:
the grip surface of the engagement side is offset, forming the relief surface of the engagement side.

14. The locking string tuner as set forth in claim 12, wherein:
the grip surface and the relief surface form parallel, but offset planes.

15. The locking string tuner as set forth in claim 14, wherein:
the grip surface is sloped at an angle Φ, slanted, and tapered towards a transverse egress edge of the grip surface, with a transverse rise edge of the rise at the grip surface at a higher level than transverse egress edge;
the relief surface is sloped at an angle Ω, slanted, and tapered towards an ingress end of the engagement member, with a transverse run-edge of the rise of the relief surface at a higher level than ingress end;
the transverse egress edge is at a higher level than ingress end of the engagement member.

16. The locking string tuner as set forth in claim 14, wherein:
the ingress end of the engagement member has reduced mass configured as a fillet edge that forms as relief surface to facilitate insertion of the string;
the fillet edge of the ingress end has a rounded convex curved configuration that facilitates winding of the string around the reeling side of the engagement member to thereby prevent severing of the wound string.

17. The locking string tuner as set forth in claim 11, wherein:
the engagement member further includes:
an eccentrically positioned through-hole.

18. A locking string tuner, comprising:
an engagement member having an ingress end and an egress end;
the engagement member has:
an engagement side that includes a grip surface and a relief surface; and
a reeling side;
wherein: the grip surface has serrations;
wherein: the serrations are transversely oriented along a longitudinal axis of the grip surface, pointing towards the egress end of the engagement member, and transversely engaging the string.

19. The locking string tuner as set forth in claim 18, wherein:
the reeling side includes a groove that forms a channel that dictates the direction of travel and alignment of the string on the engagement member.

20. The locking string tuner as set forth in claim 19, wherein:
the groove is circumferentially oriented around part of the reeling side of the engagement member, ending near egress end of the reeling side of the engagement member, with egress end of the reeling side of the engagement member having no groove, allowing the reeling side of the engagement member near the egress end to be circumferentially flush with string post, leading the string onto circumferential surface of the cylindrical string post.

21. The locking string tuner as set forth in claim 18, wherein:
the engagement side has a concave configuration.

* * * * *